US012049099B2

(12) United States Patent
Iijima et al.

(10) Patent No.: US 12,049,099 B2
(45) Date of Patent: Jul. 30, 2024

(54) PROJECTABLE AND RETRACTABLE WRITING TOOL

(71) Applicant: KABUSHIKI KAISHA PILOT CORPORATION, Tokyo (JP)

(72) Inventors: Tatsuya Iijima, Tokyo (JP); Yuki Arisaka, Tokyo (JP)

(73) Assignee: KABUSHIKI KAISHA PILOT CORPORATION, Tokyo (JP)

( * ) Notice: Subject to any disclaimer, the term of this patent is extended or adjusted under 35 U.S.C. 154(b) by 0 days.

(21) Appl. No.: 18/258,615

(22) PCT Filed: Dec. 20, 2021

(86) PCT No.: PCT/JP2021/046938
§ 371 (c)(1),
(2) Date: Jun. 21, 2023

(87) PCT Pub. No.: WO2022/138533
PCT Pub. Date: Jun. 30, 2022

(65) Prior Publication Data

US 2024/0042790 A1 Feb. 8, 2024

(30) Foreign Application Priority Data

Dec. 21, 2020 (JP) ................................ 2020-211780

(51) Int. Cl.
*B43K 24/08* (2006.01)
*B43K 7/12* (2006.01)

(52) U.S. Cl.
CPC ................ *B43K 24/08* (2013.01); *B43K 7/12* (2013.01); *B43K 24/084* (2013.01)

(58) Field of Classification Search
CPC .......... B43K 24/08; B43K 7/12; B43K 24/00; B43K 24/02; B43K 24/026; B43K 24/084
USPC .................................................. 401/109–112
See application file for complete search history.

(56) References Cited

U.S. PATENT DOCUMENTS 6,095,706 A * 8/2000 Hashimoto .......... B43K 24/082 401/110
2020/0331285 A1 10/2020 Kozaki
2022/0126623 A1* 4/2022 Fukumoto .............. B43K 7/005

FOREIGN PATENT DOCUMENTS

| | | |
|---|---|---|
| JP | H05-85683 U | 11/1993 |
| JP | H05-93884 U | 12/1993 |
| JP | 2013-220602 A | 10/2013 |

(Continued)

*Primary Examiner* — David J Walczak
(74) *Attorney, Agent, or Firm* — Renner, Kenner; Arthur M. Reginelli

(57) ABSTRACT

A shaft cylinder having an opening at a front end thereof, a tip holder movable in an axial direction of the shaft cylinder, a tip projectable and retractable in conjunction with a movement of the tip holder, an annular member loosely fitted onto an inner periphery of the opening of the shaft cylinder to be movable in an axial direction of the shaft cylinder with respect to the shaft cylinder, and an elastic member capable of connecting the tip holder and the annular member such that the tip holder and the annular member are movable relatively to each other. A contact surface tapered toward the front end is formed on at least a part of an outer periphery of the annular member. A cutout is formed on the annular member such that an inner diameter of the annular member is reduced when a load is received by the contact surface.

22 Claims, 40 Drawing Sheets

(56) References Cited

FOREIGN PATENT DOCUMENTS

| | | |
|---|---|---|
| JP | 2019-111657 A | 7/2019 |

* cited by examiner (a)

(b)

PROJECTABLE AND RETRACTABLE WRITING TOOL

TECHNICAL FIELD

The present invention pertains to a projectable and retractable writing tool in which a tip is projectable and retractable through an opening of a shaft cylinder in conjunction with a movement of a tip holder.

BACKGROUND ART

Patent Document 1 (JP-U-H05-85683) discloses an anti-sway device for a leading edge of a writing tool. In the structure of the anti-sway device, a concave groove is provided at a suitable position of the leading edge of the writing tool, and an elastic O-ring, whose outer diameter is almost the same as an inner diameter of a leading edge of a shaft cylinder, is fitted into the concave groove. According to this anti-sway device, in a pencil type or knock type of writing tool, rattling sound, which may be caused by a contact between the leading edge of the writing tool and a leading-edge hole of the leading edge of the shaft cylinder at the time of writing, can be prevented.

Patent Document 2 (JP-U-H05-93884) also discloses an anti-sway device for a leading edge of a writing tool. In the structure of the anti-sway device, an engagement step is provided at a leading edge of a shaft cylinder, and an elastic ring, whose inner diameter is slightly smaller than an outer diameter of the leading edge of the writing tool, is engaged with the engagement step. According to this anti-sway device, since the elastic ring locks the leading edge of the writing tool, rattling at the time of writing can be prevented even if there is a gap between a leading-edge inner diameter of the shaft cylinder and the leading edge of the writing tool.

Patent Document 3 (JP-A-2013-220602) discloses a writing tool in which a writing element is slidable in a front and rear direction with respect to a shaft cylinder and a writing tip of the writing element is projectable through an opening of the shaft cylinder. An annular member is arranged around an outer periphery of a leading edge portion of the writing element, and an inside surface of the shaft cylinder in the vicinity of the opening is provided with a substantially spherical surface with which the annular member can come into contact. The annular member is fixed to the writing element via a spring, and thus is biased forward. When the writing element is projected, the annular member closely contacts with the inside surface of the shaft cylinder because of an elastic force of the spring. Thus, rattling at the time of writing can be prevented.

Patent Document 4 (JP-A-2019-111657), which has been filed by the present applicant, discloses four types of structure as a projectable and retractable writing tool which can prevent rattling of a tip.

<First Type of Patent Document 4>

FIG. 11 is a schematic longitudinal section view showing a projectable and retractable writing tool 110 according to the first type of Patent Document 4 under a state wherein a tip 114 (writing element) is not projected. FIG. 12(*a*) is an enlarged longitudinal section view of a leading edge portion of the projectable and retractable writing tool 110 according to the first type, and FIG. 12(*b*) is a section view taken along line A-A of FIG. 12(*a*). FIG. 13(*a*) is an enlarged longitudinal section view of the leading edge portion of the projectable and retractable writing tool 110 according to the first type, under a state wherein the tip 114 (writing element) has been projected, and FIG. 13(*b*) is a section view taken along line B-B of FIG. 13(*a*).

In addition, FIG. 14(*a*) is a perspective view of an annular member 115 of the projectable and retractable writing tool 110 according to the first type, FIG. 14(*b*) is a side view of the annular member 115, FIG. 14(*c*) is a section view taken along line C-C of FIG. 14(*b*), FIG. 14(*d*) is a front view (a view seen from the leading edge side) of the annular member 115, and FIG. 14(*e*) is a rear view of the annular member 115.

In addition, FIG. 15 is a schematic view showing the projectable and retractable writing tool 110 according to the first type, under a state wherein the tip holder 113 has been removed for replacement or the like.

The projectable and retractable writing tool 110 according to the first type shown in FIGS. 11 to 15 includes a shaft cylinder 111, which has an opening at a front end thereof and has a cylindrical shape. As shown in FIGS. 11 to 13, according to the first type, the shaft cylinder 111 has a rear portion 111*a*, an inner cylindrical portion 111*b*, a front portion 111*c* and a mouthpiece portion 111*d*. The rear portion 111*a* and the inner cylindrical portion 111*b* are threadedly removably fixed to each other. The inner cylindrical portion 111*b* and the front portion 111*c* are integrally formed by two-color molding. On the other hand, the mouthpiece portion 111*d* is threadedly detachably fixed to the inner cylindrical portion 111*b*.

A tip holder 113, which is movable in an axial direction of the shaft cylinder 111, is contained in an inside of the shaft cylinder 111. A tip 114 as a writing element is fixed to a front end of the tip holder 113. The tip 114 is projectable and retractable through the opening of the shaft cylinder 111 in conjunction with a movement of the tip holder 113, as shown in FIGS. 12(*a*) and 13(*a*).

As shown in FIG. 15, the tip holder 113 includes: a proximal portion 113*a*, a first collar portion 113*b*, a second collar portion 113*c*, a spring fixation assisting portion 113*f* and a distal portion 113*d*, in this order from a proximal side thereof toward a distal side thereof. Each of the proximal portion 113*a*, the first collar portion 113*b*, the second collar portion 113*c*, the spring fixation assisting portion 113*f* and the distal portion 113*d* has a cylindrical shape. The relationship between their cross-sectional diameters is as follows: the proximal portion 113*a*>the first collar portion 113*b*>the second collar portion 113*c*>the spring fixation assisting portion 113*f*>the distal portion 113*d*.

In particular as shown in FIG. 12(*b*), an annular member 115 made of resin or metal is loosely fitted on an outer periphery of the distal portion 113*d* of the tip holder 113. The annular member 115 is fixed to a second collar portion 113*c* of the tip holder 113 via a coil spring 16 (an example of an elastic member), which surrounds the outer periphery of the distal portion 113*d* of the tip holder 113 in a loosely fitted state (with a slight gap). In this manner, as shown in FIGS. 12(*a*) and 13(*a*), the annular member 115 is movable in an axial direction of the tip holder 113 with respect to the distal portion 113*d* of the tip holder 113, in conjunction with expansion and contraction of the coil spring 116.

The tip holder 113 is provided with the spring fixation assisting portion 113*f* in order to assist in fixing the coil spring 116 to the second collar portion 113*c*.

In addition, in particular as shown in FIGS. 14(*a*) to 14(*e*), a frustoconical contact surface 115*t* is formed on a front region of an outer periphery of the annular member 115, as a contact surface having a tapered shape toward the front end side. A large outer diameter cylindrical portion 115*a* is provided continuously on a rear side of the contact surface 115*t*. A small outer diameter cylindrical portion 115*b* is provided on a further rear side thereof via a step (diameter difference).

The annular member 115 is provided with four slits (cutout elements) 115*s* as a cutout. As shown in FIGS. 14(*a*) to 14(*e*), the four slits 115*s* are arranged at regular intervals (by every 90 degrees) in a circumferential direction of the annular member 115. Each of the four slits 115*s* extends from a front end of the annular member 115 to a substantially center of the small outer diameter cylindrical portion 115*b* in an axial direction of the annular member 115. Thus, when a load is received by the contact surface 115*t*, an inner diameter of the annular member 115 is configured to be reduced flexibly, and when the load is released, the inner diameter of the annular member 115 is configured to be elastically returned to an original dimension thereof.

In addition, as shown in FIGS. 12(*a*) and 13(*a*), a concave frustoconical guide surface 111*t* is formed on a part of an inside surface of the mouthpiece portion 111*d* of the shaft cylinder 111, as a guide surface having a tapered shape toward the front end side. Thus, in conjunction with a movement of the tip holder 113 toward a front end side thereof (FIG. 12(*a*)→FIG. 13(*a*)), the contact surface 115*t* is configured to receive the load from the guide surface 111*t*.

Furthermore, the projectable and retractable writing tool 110 according to the first type is provided with a second coil spring 112 (second elastic member) in order to automatically retract the tip holder 113 when a retracting operation for the tip 114 (for example, a pushing operation of a push button provided on a rear end portion of the writing tool in order to release a locking mechanism that can maintain a projected state of the tip 114) is carried out. The second coil spring 112 is fitted into between a shoulder portion provided on the inside surface of the mouthpiece portion 111*d* and the first collar 113*b* of the tip holder 113 such that the second coil spring 112 surrounds an outer periphery of the coil spring 116.

The second coil spring 112 may be fixed to the inside surface of the mouthpiece portion 111*d* or may be free (in a state wherein neither member is fixed thereto). Alternatively, the second coil spring 112 may be fixed to the first collar 113*b* of the tip holder 113.

The projectable and retractable writing tool 110 of the first type as described above operates as follows.

When not in use, the tip 114 (writing element) of the projectable and retractable writing tool 110 is retracted as shown in FIG. 12(*a*). At this time, a length of the coil spring 116 in an axial direction thereof is 8.2 mm and a length of the second coil spring 112 in an axial direction thereof is 16.4 mm. When a projecting operation for the tip 114 (for example, a pushing operation of a push button provided on the rear end portion of the writing tool) is carried out, the tip 114 (writing element) of the projectable and retractable writing tool 110 is projected as shown in FIG. 13(*a*). Usually, a position of the tip holder 113 is locked in this projected state. The projected state of the tip 114 is maintained until a retracting operation for the tip 114 is carried out thereafter. At this time, the length of the coil spring 116 in the axial direction thereof is 5.6 mm (shortened by 2.6 mm) and the length of the second coil spring 112 in the axial direction thereof is 9.4 mm (shortened by 7.0 mm).

During a transition from the retracted state shown in FIG. 12(*a*) to the projected state shown in FIG. 13(*a*), in conjunction with the movement of the tip holder 113 toward the front end side, the contact surface 115*t* of the annular member 115 receives a load from the guide surface 111*t* of the mouthpiece portion 111*d*. At this time, the inner diameter of the annular member 115 is reduced due to existence of the four slits 115*s* of the annular member 115 (FIG. 12(*b*)→FIG. 13(*b*)). As a result, as shown in FIG. 13(*b*), the mouthpiece portion 111*d* and the annular member 115 cooperate with each other such that the distal portion 113*d* of the tip holder 113 can be grasped in a rattling-free (play-free) manner.

In addition, since the tip holder 113 and the annular member 115 are connected via the coil spring 116 such that the tip holder 113 and the annular member 115 are movable relatively to each other, it can be assured that the distal portion 113*d* of the tip holder 113 can be effectively grasped in a rattling-free (play-free) manner even if no high-precision dimension management is applied to a degree of reduction of the inner diameter of the annular member 115 or the like.

Thereafter, when a retracting operation for the tip 114 (for example, a subsequent pushing operation of the push button provided on the rear end portion of the writing tool) is carried out, a locking mechanism not shown is released, so that the tip 114 (writing element) of the projectable and retractable writing tool 110 is returned to a retracted state shown in FIG. 12(*a*) by means of an action of the second coil spring 112.

During a transition from the projected state shown in FIG. 13(*a*) to the retracted state shown in FIG. 12(*a*), in conjunction with a movement of the tip holder 113 toward a rear end side, the load received by the contact surface 115*t* of the annular member 115 from the guide surface 111*t* of the mouthpiece portion 111*d* disappears. Thereby, the inner diameter of the annular member 115 that has been reduced is returned to an original dimension thereof (FIG. 13(*b*)→FIG. 12(*b*)).

<Second Type of Patent Document 4>

FIG. 16 is an enlarged longitudinal section view of a leading edge portion of the projectable and retractable writing tool 120 according to the second type of Patent Document 4, and FIG. 17 is an enlarged longitudinal section view of the leading edge portion of the projectable and retractable writing tool 120 according to the second type, under a state wherein the tip 124 (writing element) has been projected. In addition, FIG. 18 is a schematic view showing the projectable and retractable writing tool 120 according to the second type, under a state wherein a tip holder 123 (a proximal portion 123*a*, a first collar portion 123*b*, a second collar portion 123*c* and a distal portion 123*d*) has been removed for replacement or the like.

The projectable and retractable writing tool 120 of the second type is provided with a cylindrical resin spring part 126*e*, instead of the coil spring 116 in the projectable and retractable writing tool 110 of the first type. In the resin spring part 126*e*, six pairs of substantially semicircular slits facing up and down and six pairs of substantially semicircular slits facing left and right are formed alternately in the axial direction. Thus, the resin spring part 126*e* can expand and contract in the axial direction.

The resin spring part 126*e* is integrally molded with an annular member 125. The annular member 125 is provided with four slits 125*s* as a cutout, in substantially the same way as the annular member 115 in the projectable and retractable writing tool 110 of the first type.

According to the projectable and retractable writing tool 120 of the second type, substantially the same functions and effects are achieved as according to the projectable and retractable writing tool 110 of the first type. That is to say, the mouthpiece portion 111*d* and the annular member 125 (the contact surface 125*t*) cooperate with each other such that the distal portion 123*d* of the tip holder 123 can be grasped in a rattling-free (play-free) manner.

<Third Type of Patent Document 4>

FIG. 19 is an enlarged longitudinal section view of a leading edge portion of the projectable and retractable writing tool 130 according to the third type of Patent Document 4, and FIG. 20 is an enlarged longitudinal section view of the leading edge portion of the projectable and retractable writing tool 130 according to the third type, under a state wherein the tip 134 (writing element) has been projected. In addition, FIG. 21 is a schematic view showing the projectable and retractable writing tool 130 according to the third type, under a state wherein a tip holder 133 (a proximal portion 133*a*, an intermediate collar portion 133*m* and a distal portion 133*d*) has been removed for replacement or the like.

In the projectable and retractable writing tool 130 of the third type, a collar member 132 (a first collar portion 133*b* and a second collar portion 133*c*) is fixed to a rear end of the coil spring 112 (a second elastic member) of the projectable and retractable writing tool 110 of the first type, and a rear end of the coil spring 116 (an elastic member), whose front end is connected to the annular member 115, is fixed to the collar member 132, instead of the second collar portion 113*c* of the tip holder 113. According to the projectable and retractable writing tool 130 of the third type as well, substantially the same functions and effects are achieved as according to the projectable and retractable writing tool 110 of the first type. That is to say, the mouthpiece portion 111*d* and the annular member 115 cooperate with each other such that the distal portion 133*d* of the tip holder 133 can be grasped in a rattling-free (play-free) manner.

In addition, according to the projectable and retractable writing tool 130 of the third type, the annular member 115 need not to be fixed to the tip holder 133, and thus existing refills for replacement including conventional tip holders may be used as well.

<Fourth Type of Patent Document 4>

FIG. 22 is an enlarged longitudinal section view of a leading edge portion of the projectable and retractable writing tool 140 according to the fourth type of Patent Document 4, and FIG. 23 is an enlarged longitudinal section view of the leading edge portion of the projectable and retractable writing tool 140 according to the fourth type, under a state wherein the tip 144 (writing element) has been projected. In addition, FIG. 24 is a schematic view showing the projectable and retractable writing tool 140 according to the fourth type, under a state wherein a tip holder 143 (a proximal portion 143*a*, an intermediate collar portion 143*m* and a distal portion 143*d*) has been removed for replacement or the like.

In the projectable and retractable writing tool 140 of the fourth type, a collar member 142 (a first collar portion 143*b* and a second collar portion 143*c*) is fixed to a rear end of the resin spring part 126*e* (a second elastic member) of the projectable and retractable writing tool 120 of the second type, and a rear end of the resin spring part 126*e* (an elastic member), whose front end is integrated with the annular member 125, is fixed to the collar member 142, instead of the second collar portion 123*c* of the tip holder 123.

According to the projectable and retractable writing tool 140 of the fourth type as well, substantially the same functions and effects are achieved as according to the projectable and retractable writing tool 120 of the second type. That is to say, the mouthpiece portion 111*d* and the annular member 125 cooperate with each other such that the distal portion 143*d* of the tip holder 143 can be grasped in a rattling-free (play-free) manner.

In addition, according to the projectable and retractable writing tool 140 of the fourth type, the annular member 125 need not to be fixed to the tip holder 143, and thus existing refills for replacement including conventional tip holders may be used as well.

PRIOR ART DOCUMENT

Patent Document List

Patent Document 1 recited in the present specification is JP-U-H05-85683. Patent Document 2 recited in the present specification is JP-U-H05-93884. Patent Document 3 recited in the present specification is JP-A-2013-220602. Patent Document 4 recited in the present specification is JP-A-2019-111657.

SUMMARY OF INVENTION

Technical Problem

According to the technique disclosed in Patent Document 1 (JP-U-H05-85683) and Patent Document 2 (JP-U-H05-93884), the O-ring or ring is so radially deformable that the effect of preventing the rattling may be not sufficient. In addition, the writing tip may stick to the O-ring or ring, which may deteriorate a smooth retracting movement of the writing tip that has been projected.

On the other hand, according to the technique disclosed in Patent Document 3 (JP-A-2013-220602), in order to enhance the effect of preventing the rattling at the time of writing, it is necessary to properly manage a dimensional relationship between an inside surface of the annular member and an outer periphery surface of the writing tip. For example, if a gap size between the outer periphery surface of the writing tip and the inside surface of the annular member is larger than a gap size between the outer periphery surface of the writing tip and an inside surface of a leading edge portion of the shaft cylinder, the effect of preventing the rattling at the time of writing cannot be obtained. Thus, high dimensional precision is required, which may be a problem in productivity.

In addition, in the structures of the first and fourth types of Patent Document 4, the two kinds of coil springs 112, 116 are used in combination. These coil springs 112, 116 may be hooked on each other during an assembly operation and/or a replacement operation for a refill, which may impair the smoothness of these operations. Furthermore, when the coil springs 112, 116 are contracted in conjunction with a projecting or retracting operation of the tip holder 113, 143, the coil springs 112, 116 may become entangled, which may result in operational failure.

On the other hand, in the structures of the second and third types of Patent Document 4, it is difficult to increase the degree of expansion and contraction (amount of deflection) of the resin spring part 126*e*, which may result in less design flexibility.

The present invention has been made based on the above findings. The object of the present invention is to provide a projectable and retractable writing tool which can prevent rattling of a tip at the time of writing and thus can achieve a stable writing feeling while there is less fear of operational failure.

Solution to Problem

The present invention is a projectable and retractable writing tool including: a shaft cylinder having an opening at a front end thereof, a tip holder contained in an inside of the shaft cylinder and movable in an axial direction of the shaft cylinder, a tip fixed to a front end of the tip holder to be projectable and retractable through the opening of the shaft cylinder in conjunction with a movement of the tip holder, an annular member loosely fitted onto an inner periphery of the opening of the shaft cylinder to be movable in an axial direction of the shaft cylinder with respect to the shaft cylinder, and an elastic member capable of connecting the tip holder and the annular member such that the tip holder and the annular member are movable relatively to each other, wherein a contact surface is formed on at least a part of an outer periphery of the annular member, the contact surface being configured to come into contact with a part of an inside surface of the shaft cylinder in conjunction with a movement of the tip holder toward a front end side thereof, a cutout is formed at a part of the annular member such that an inner diameter of the annular member is reduced when a load is received by the contact surface, a guide surface is formed on the part of the inside surface of the shaft cylinder, the guide surface being configured to come into contact with the contact surface in conjunction with the movement of the tip holder toward the front end side, and the contact surface is configured to receive the load from the guide surface in conjunction with the movement of the tip holder toward the front end side.

According to the present invention, the contact surface of the annular member receives the load from the guide surface of the shaft cylinder in conjunction with the movement of the tip holder toward the front end side, which reduces the inner diameter of the annular member due to existence of the cutout of the annular member. In this manner, the shaft cylinder and the annular member cooperate with each other such that the tip or the tip holder can be grasped in a rattling-free (play-free) manner.

In addition, according to the present invention, since the elastic member can function as a "knock spring," it is not necessary to use a separate coil spring for the knock spring in combination. According to this feature, the number of parts can be reduced, an assembly operation can be facilitated, and the fear of operational failure can be remarkably reduced.

A grasping portion of the annular member that can grasp the tip or the tip holder is located more forward than the contact surface of the annular member (there is no grasping portion located radially inward of the contact surface). According to this feature, the tip or the tip holder can be grasped on the more forward side, and thus the tip or the tip holder can be grasped more effectively in a rattling-free (play-free) manner.

Preferably, a stopper element is provided on the shaft cylinder and/or the annular member and is configured to define a movement limit of the annular member on a rear side thereof. In this case, an excessive movement (in particular, a dropout) of the annular member can be effectively prevented.

Preferably, the cutout is a plurality of cutout elements arranged at regular intervals in a circumferential direction of the annular member, and each of the plurality of cutout elements is a slit extending in an axial direction of the annular member. In this case, the inner diameter of the annular member can be reduced in a circumferentially well-balanced manner.

In addition, in this case, it is more preferable that a rear end of the slit is located more forward than the elastic member. According to this feature, even if the annular member is deflected due to existence of the slits, it is possible to maintain a stable connection between the elastic member and the annular member.

Preferably, the contact surface has a tapered shape toward the front end side, and the guide surface also has a tapered shape toward the front end side. Preferably, the contact surface has a frustoconical surface, for example. In this case, preferably, the guiding surface is a concave frustoconical surface. Alternatively, preferably, the contact surface has a convex curved surface which is rotationally symmetric about an axis. In this case, preferably, the guiding surface is a concave curved surface or a concave frustoconical surface which is also rotationally symmetric about an axis but has a curvature gentler than that of the convex curved surface.

In addition, preferably, the elastic member is a coil spring.

In addition, preferably, the annular member and the elastic member are fixed to each other, the elastic member is capable of connecting to an annular collar of the tip holder, and the elastic member is also capable of moving away from the annular collar of the tip holder. In this case, the annular member and the elastic member are held only by the shaft cylinder, and thus existing refills for replacement including conventional tip holders may be used.

In addition, preferably, the contact surface and the guide surface are always in contact with each other. In this case, it is avoided that the annular member and the inner surface of the shaft cylinder repeatedly contact with and separate from each other every time the projecting or retracting operation for the tip is carried out. Therefore, the projecting or retracting operation is stable, which offers a smooth feeling of operation (no discomfort) to the user.

In addition, preferably, the annular member is projected from the opening of the shaft cylinder in a front direction thereof. In this case, the tip or the tip holder can be grasped with a longer range, and thus the tip or the tip holder can be grasped more effectively in a rattling-free (play-free) manner.

In addition, in this case, it is more preferable that a projection amount (length) of the annular member from the opening of the shaft cylinder in the front direction is smaller than a movable range of the annular member in the axial direction. According to this feature, even when the annular member is pushed to be retracted into the opening of the shaft cylinder, the annular member is still within the movable range in the axial direction, and thus it is prevented that the annular member is undesirably dropped out or the like.

In addition, preferably, an operation part for the projecting or retracting operation of the tip or a rear portion of the shaft cylinder is provided with a soft material member. When the conventional structure is adopted for a thermochromic writing tool, the tip or the tip holder may rattle due to vibration at the time of rubbing a written brushstroke, which may result in fear of generating noise. However, according to the above feature of the present invention, there is no such fear. Thus, it is recommendable that the structure of the present invention is adopted for a thermochromic writing tool.

In addition, preferably, a knock member is provided in a slidable manner in a front and rear direction with respect to the shaft cylinder, wherein the tip is configured to be moved in a front and rear direction to be projected from or retracted into the opening of the shaft cylinder alternately whenever the knock member is moved in a front direction thereof, and wherein the annular member is configured to be rotated with respect to the shaft cylinder whenever the knock member is moved in the front direction thereof. According to this feature, the annular member is rotated in conjunction with the movement (operation) of the knock member in the front direction thereof, i.e., the user can visually recognize the rotation of the annular member. Thereby, the user can be offered a visual fun.

In addition, the present invention is also applicable to only a shaft cylinder for the above projectable and retractable writing tool. That is to say, the present invention is a shaft cylinder for a projectable and retractable writing tool, the shaft cylinder being capable of containing a tip holder such that the tip holder is movable in an axial direction, a tip being fixed to a front end of the tip holder, the shaft cylinder having an opening at a front end thereof, through which the tip is projectable and retractable in conjunction with a movement of the tip holder, the shaft cylinder including: an annular member loosely fitted onto an inner periphery of the opening of the shaft cylinder to be movable in an axial direction of the shaft cylinder with respect to the shaft cylinder, and an elastic member capable of connecting the tip holder and the annular member such that the tip holder and the annular member are movable relatively to each other, wherein a contact surface is formed on at least a part of an outer periphery of the annular member, the contact surface being configured to come into contact with a part of the inside surface of the shaft cylinder in conjunction with the movement of the tip holder toward the front end side, a cutout is formed at a part of the annular member such that an inner diameter of the annular member is reduced when a load is received by the contact surface, a guide surface is formed on the part of the inside surface of the shaft cylinder, the guide surface being configured to come into contact with the contact surface in conjunction with the movement of the tip holder toward the front end side, and the contact surface is configured to receive the load from the guide surface in conjunction with the movement of the tip holder toward the front end side.

Advantageous Effects of Invention

According to the present invention, the contact surface of the annular member receives the load from the guide surface of the shaft cylinder in conjunction with the movement of the tip holder toward the front end side, which reduces the inner diameter of the annular member due to existence of the cutout of the annular member. In this manner, the shaft cylinder and the annular member cooperate with each other such that the tip or the tip holder can be grasped in a rattling-free (play-free) manner. In addition, according to the present invention, since the elastic member can function as a "knock spring," it is not necessary to use a separate coil spring for the knock spring in combination. According to this feature, the number of parts can be reduced, an assembly operation can be facilitated, and the fear of operational failure can be remarkably reduced.

BRIEF DESCRIPTION OF DRAWINGS

FIG. 3(*b*) is a plan view of the annular member shown in FIG. 3(*a*);

FIG. 3(*c*) is a side view of the annular member shown in FIG. 3(*a*);

FIG. 3(*d*) is a bottom view of the annular member shown in FIG. 3(*a*);

FIG. 3(*e*) is a section view taken along line A-A of FIG. 3(*c*);

FIG. 3(*f*) is a front view (a view seen from the leading edge side) of the annular member shown in FIG. 3(*a*);

FIG. 3(*g*) is a rear view of the annular member shown in FIG. 3(*a*);

FIG. 8(*b*) is a plan view of the annular member shown in FIG. 8(*a*);

FIG. 8(*c*) is a side view of the annular member shown in FIG. 8(*a*);

FIG. 8(*d*) is a bottom view of the annular member shown in FIG. 8(*a*);

FIG. 8(*e*) is a section view taken along line A-A of FIG. 8(*b*);

FIG. 8(*f*) is a front view (a view seen from the leading edge side) of the annular member shown in FIG. 8(*a*);

FIG. 8(*g*) is a rear view of the annular member shown in FIG. 8(*a*);

FIG. 10(*b*) is a plan view of the annular member shown in FIG. 10(*a*);

FIG. 10(*c*) is a side view of the annular member shown in FIG. 10(*a*);

FIG. 10(*d*) is a bottom view of the annular member shown in FIG. 10(*a*);

FIG. 10(*e*) is a section view taken along line A-A of FIG. 10(*b*);

FIG. 10(*f*) is a front view (a view seen from the leading edge side) of the annular member shown in FIG. 10(*a*);

FIG. 10(*g*) is a rear view of the annular member shown in FIG. 10(*a*);

FIG. 12(*b*) is a section view taken along line A-A of FIG. 12(*a*);

FIG. 13(*b*) is a section view taken along line B-B of FIG. 13(*a*);

FIG. 14(*b*) is a side view of the annular member shown in FIG. 14(*a*);

FIG. 14(*c*) is a section view taken along line C-C of FIG. 14(*b*);

FIG. 14(*d*) is a front view (a view seen from the leading edge side) of the annular member shown in FIG. 14(*a*);

FIG. 14(*e*) is a rear view of the annular member shown in FIG. 14(*a*);

FIG. 15 is a schematic view showing the projectable and retractable writing tool shown according to the first type of Patent Document 4, under a state wherein the tip holder has been removed for replacement or the like;

FIG. 18 is a schematic view showing the projectable and retractable writing tool shown according to the second type of Patent Document 4, under a state wherein the tip holder has been removed for replacement or the like;

FIG. 21 is a schematic view showing the projectable and retractable writing tool shown according to the third type of Patent Document 4, under a state wherein the tip holder has been removed for replacement or the like;

FIG. 24 is a schematic view showing the projectable and retractable writing tool shown according to the fourth type of Patent Document 4, under a state wherein the tip holder has been removed for replacement or the like;

FIG. 41(*b*) is a plan view of the annular member shown in FIG. 41(*a*);

FIG. 41(*c*) is a side view of the annular member shown in FIG. 41(*a*);

FIG. 41(*d*) is a bottom view of the annular member shown in FIG. 41(*a*);

FIG. 41(*e*) is a section view taken along line A-A of FIG. 41(*c*);

FIG. 41(*f*) is a front view (a view seen from the leading edge side) of the annular member shown in FIG. 41(*a*); and FIG. 41(*g*) is a rear view of the annular member shown in FIG. 41(*a*).

DESCRIPTION OF EMBODIMENTS

With reference to the attached drawings, we explain three embodiments of the present invention.

First Embodiment

Figure 1:
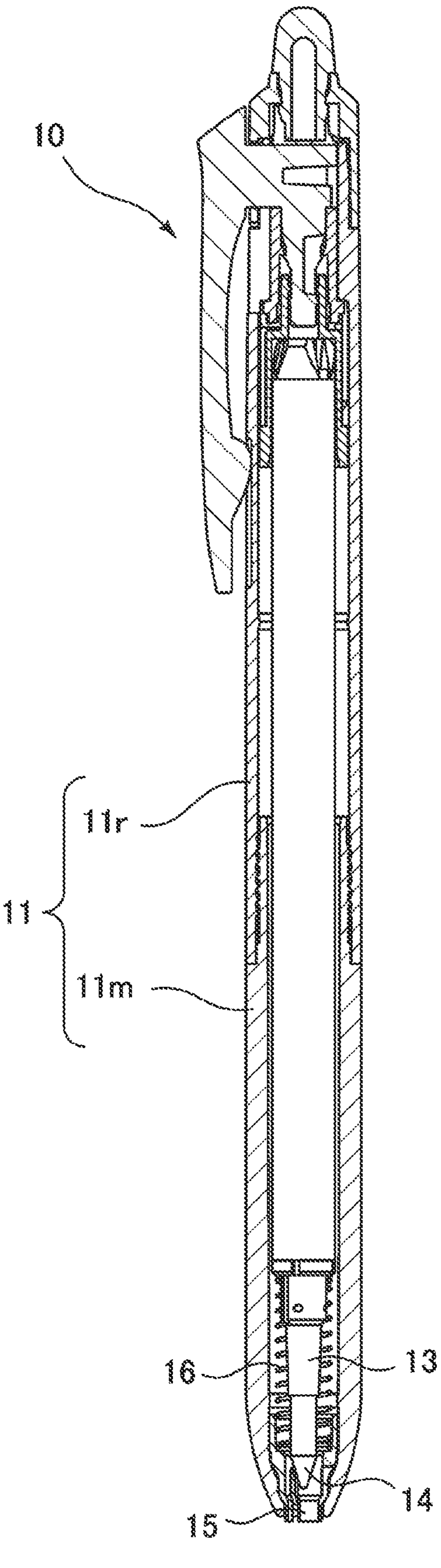
FIG. 1 is a schematic longitudinal section view showing a projectable and retractable writing tool according to a first embodiment of the present invention, under a state wherein a tip (writing element) has not been projected.
Figure 2:
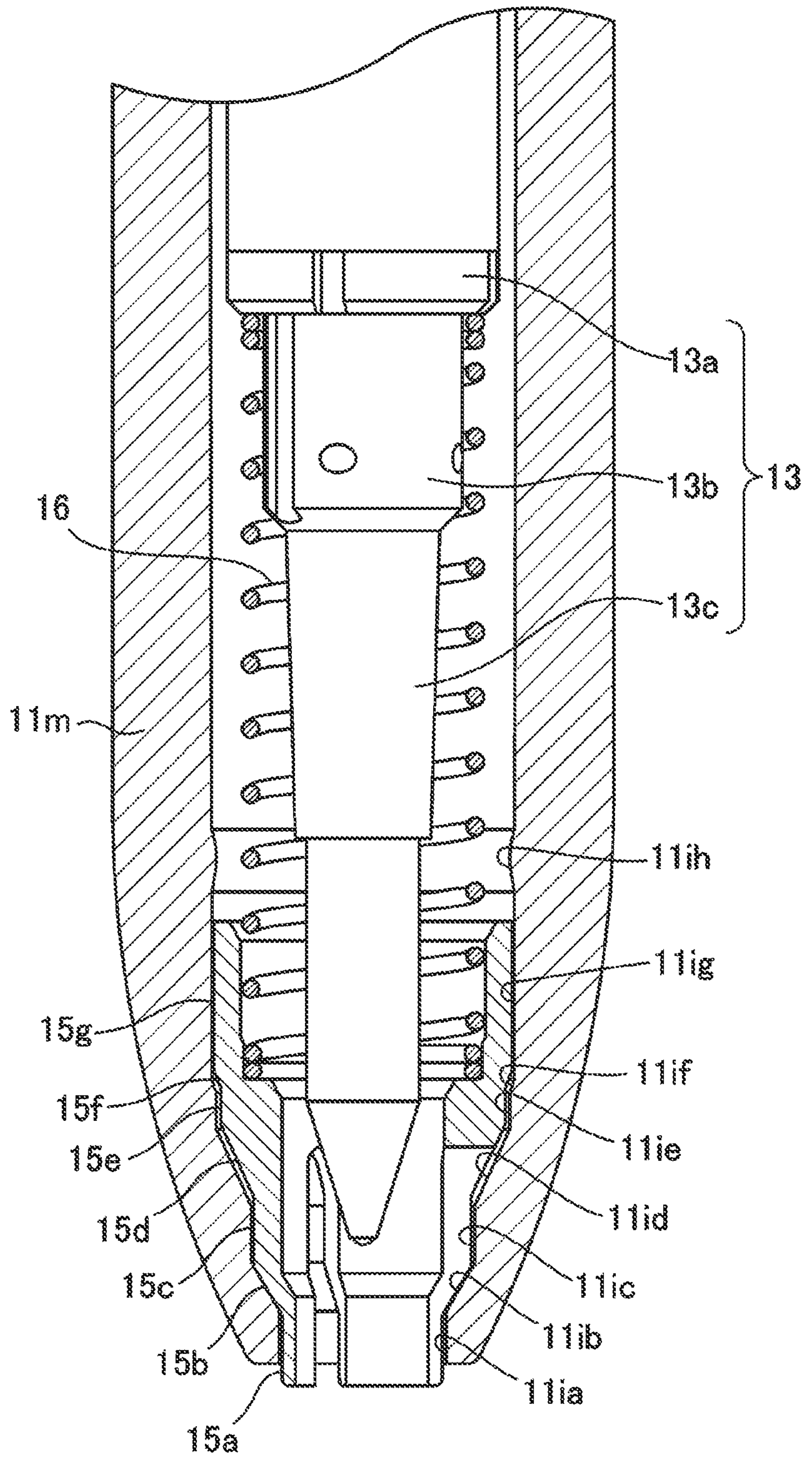
FIG. 2 is an enlarged longitudinal section view of a leading edge portion of the projectable and retractable writing tool shown in FIG. 1.

FIG. 1 is a schematic longitudinal section view showing a projectable and retractable writing tool 10 according to a first embodiment of the present invention, under a state wherein a tip 14 (writing element) has not been projected. FIG. 2 is an enlarged longitudinal section view of a leading edge portion of the projectable and retractable writing tool 10 of the present embodiment.

Figure 3:
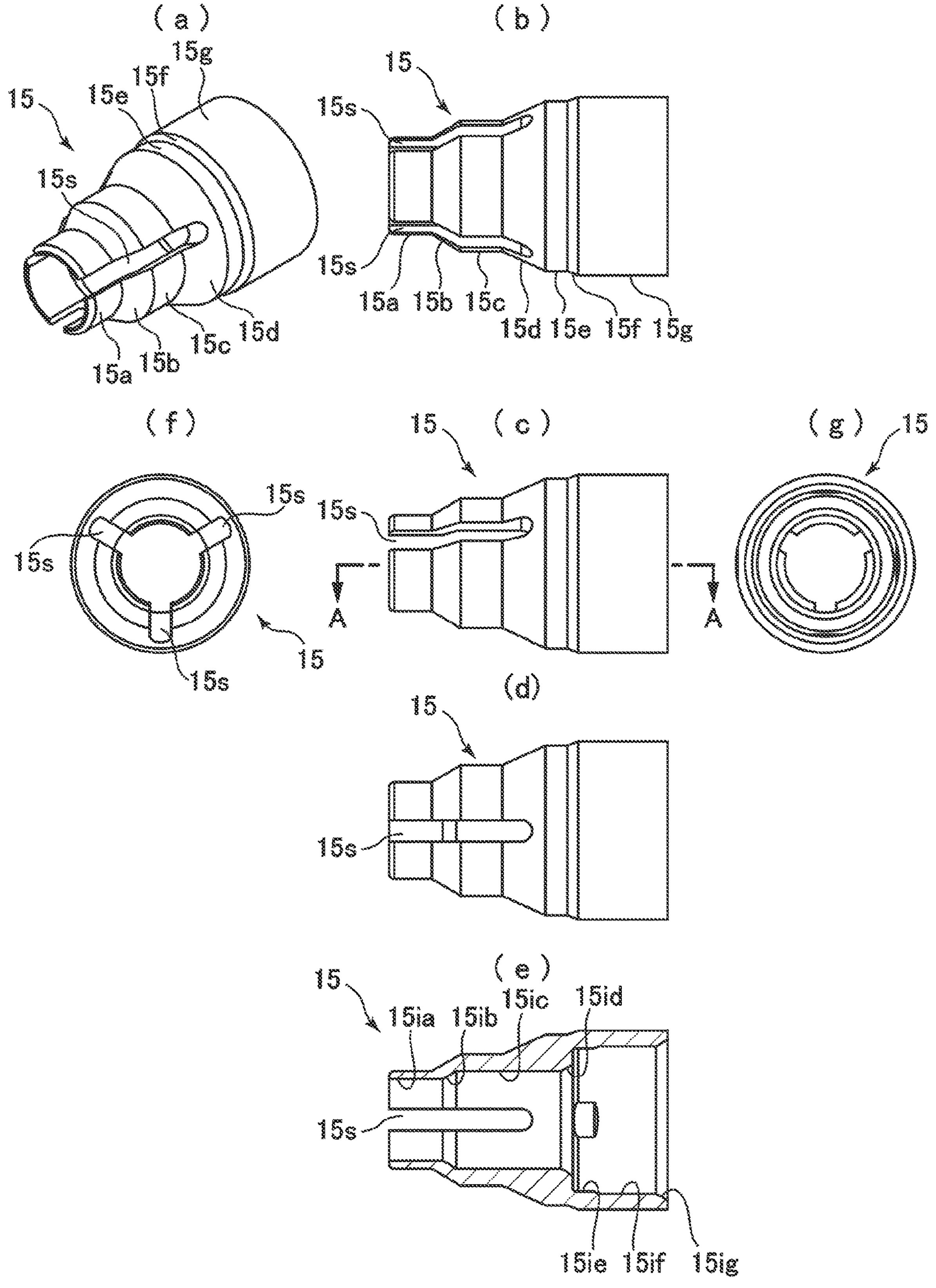
FIG. 3(*a*) is a perspective view of an annular member of the projectable and retractable writing tool shown in FIG. 1.

In addition, FIG. 3(*a*) is a perspective view of an annular member 15 of the projectable and retractable writing tool 10 according to the present embodiment, FIG. 3(*b*) is a plan view of the annular member 15 shown in FIG. 3(*a*), FIG. 3(*c*) is a side view of the annular member 15 shown in FIG. 3(*a*), FIG. 3(*d*) is a bottom view of the annular member 15 shown in FIG. 3(*a*), FIG. 3(*e*) is a section view taken along line A-A of FIG. 3(*c*), FIG. 3(*f*) is a front view (a view seen from the leading edge side) of the annular member 15 shown in FIG. 3(*a*), and FIG. 3(*g*) is a rear view of the annular member 15 shown in FIG. 3(*a*).

Figure 4:
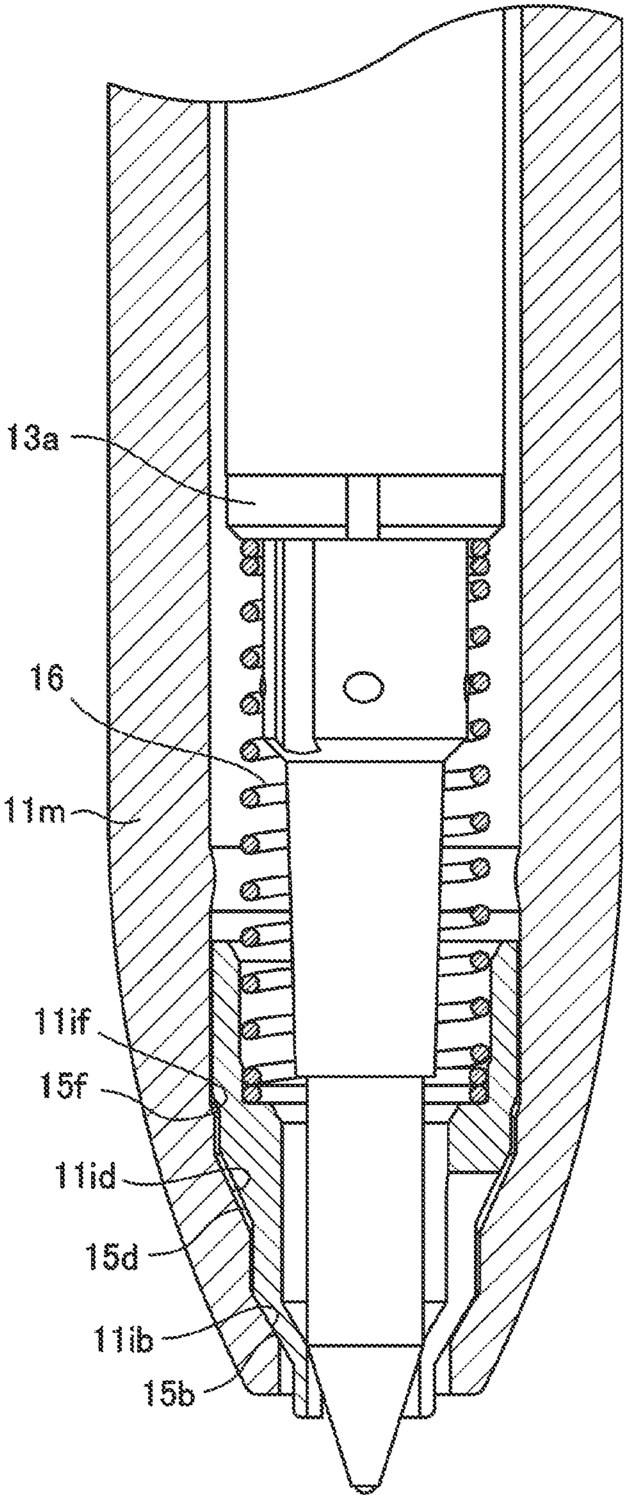
FIG. 4 is a schematic view of the projectable and retractable writing tool shown in FIG. 1, under a state wherein the tip has come in contact with the annular member in the course of a projecting operation of the tip.
Figure 5:
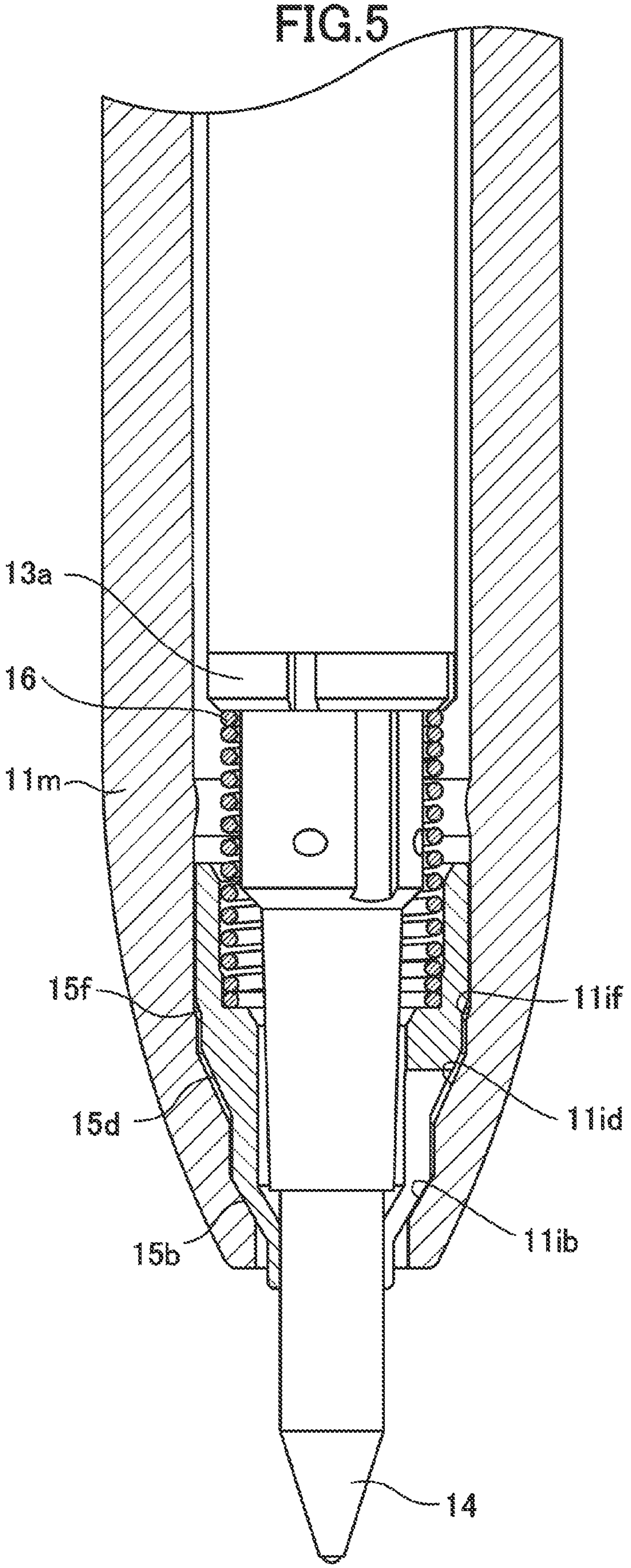
FIG. 5 is a schematic view of the projectable and retractable writing tool shown in FIG. 1, under a state wherein the tip has been projected the most in the course of the projecting operation of the tip.
Figure 6:
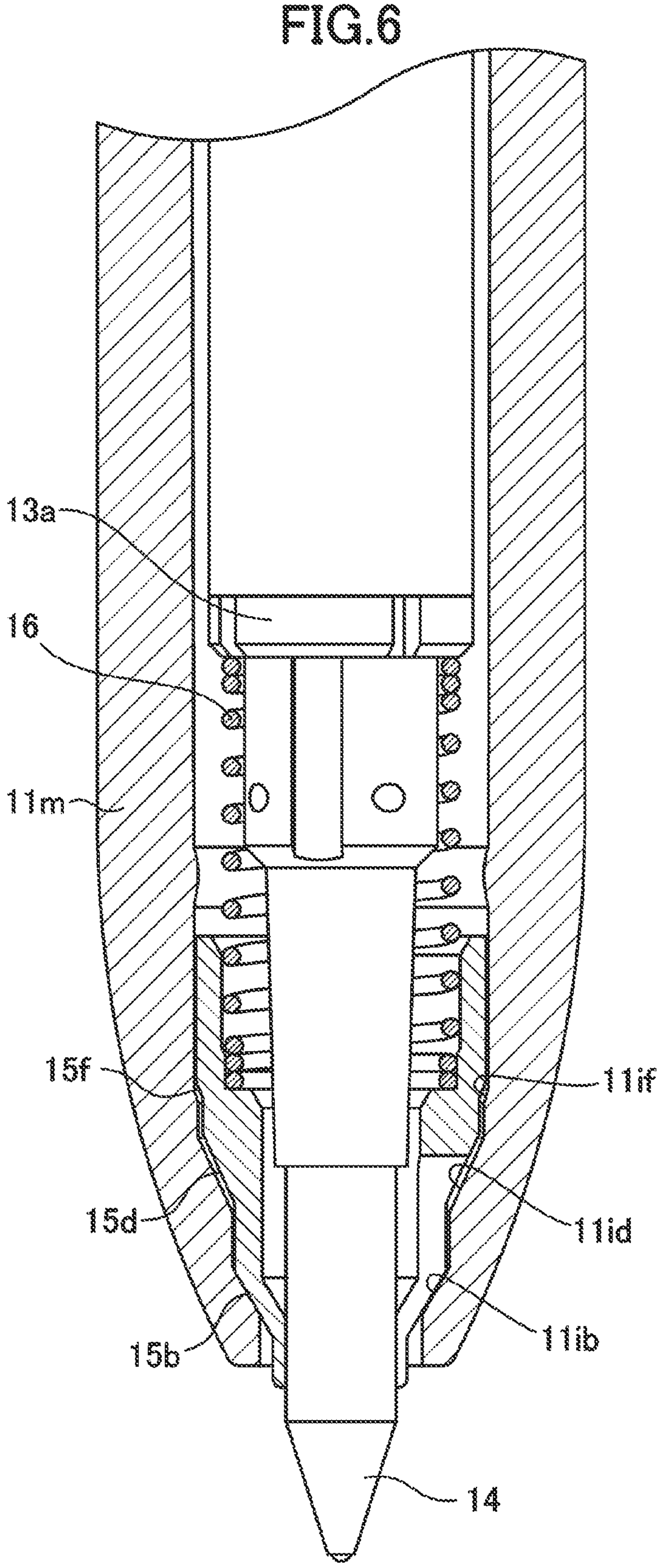
FIG. 6 is a schematic view of the projectable and retractable writing tool shown in FIG. 1, under a state wherein the tip has been projected after the projecting operation of the tip has been completed.

Furthermore, FIG. 4 is a schematic view of the projectable and retractable writing tool 10 according to the present embodiment, under a state wherein the tip 14 has come in contact with the annular member 15 in the course of a projecting operation of the tip 14. FIG. 5 is a schematic view of the projectable and retractable writing tool 10 according to the present embodiment, under a state wherein the tip 14 has been projected the most in the course of the projecting operation of the tip 14. FIG. 6 is a schematic view of the projectable and retractable writing tool 10 according to the present embodiment, under a state wherein the tip 14 has been projected after the projecting operation of the tip 14 has been completed.

The projectable and retractable writing tool 10 according to the first embodiment shown in FIGS. 1 to 6 includes a shaft cylinder 11, which has an opening at a front end thereof and has a cylindrical shape. As shown in FIGS. 1 to 3, according to the present embodiment, the shaft cylinder 11 has a rear portion 11*r* and a front portion 11*m*. The rear portion 11*r* and the front portion 11*m* are threadedly removably fixed to each other. Of course, the rear portion 11*a* and the front portion 11*m* may be fixed to each other by fitting connection or may be formed integrally.

A tip holder 13, which is movable in an axial direction of the shaft cylinder 11, is contained in an inside of the shaft cylinder 11. A tip 14 as a writing element is fixed to a front end of the tip holder 13. The tip 14 is projectable and retractable through the opening of the shaft cylinder 11 in conjunction with a movement of the tip holder 13, as shown in FIGS. 4 to 6.

As shown in FIG. 2, the tip holder 13 includes: a proximal portion 13*a*, a first collar portion 13*b* and a second collar portion 13*c*, in this order from a proximal side thereof toward a distal side thereof. In the present embodiment, each of the proximal portion 13*a* and the first collar portion 13*b* has a cylindrical shape, and the second collar portion 13*c* has a frustoconical shape. The relationship between their cross-sectional diameters is as follows: the proximal portion 13*a*>the first collar portion 13*b*>the second collar portion 13*c*.

In the present embodiment, as shown in FIG. 2, an annular member 15 is loosely fitted onto an inner periphery of the opening of the shaft cylinder 11 to be movable in an axial direction of the shaft cylinder 11 with respect to the shaft cylinder 11. A front end of the annular member 15 is located more forward than a front end of the shaft cylinder 11. On a rear side of the annular member 15, an outer diameter thereof and an inner diameter thereof are enlarged, so that the enlarged portion of the annular member 15 covers the tip 14 (whose diameter is Φ 2.5) in a non-contact manner.

In addition, the annular member 15 is fixed to a front end of a coil spring 16 (an example of an elastic member). The coil spring 16 surrounds the second collar portion 13*c* of the tip holder 13 and the tip 14 in a loosely fitted state (with a slight gap). A rear end of the coil spring 16 is always pressed by (not fixed to) the proximal portion 13*a* of the tip holder 13. Thereby, the coil spring 16 connects the tip holder 13 and the annular member 15 such that the tip holder 13 and the annular member 15 are movable relatively to each other. In addition, as shown in FIGS. 4 to 6, the annular member 15 is movable in the axial direction of the shaft cylinder 11 with respect to the shaft cylinder 11, in conjunction with a movement of the tip holder 13 and thus in conjunction with expansion and contraction of the coil spring 16.

The annular member 15 is made of resin (for example, polyacetal, polypropylene or polyethylene) or made of metal (for example, brass).

In addition, as shown in FIGS. 3(*a*) to 3(*g*), an outer periphery surface of the annular member 15 includes: a small outer diameter cylindrical surface 15*a* (Φ 3.6 mm, an axial length thereof being 1.6 mm); a first frustoconical outer surface 15*b* (an axial length thereof being 1.1 mm) as a contact surface having a tapered shape; a medium outer diameter cylindrical surface 15*c* (Φ 4.85 mm, an axial length thereof being 1.5 mm); a second frustoconical outer surface 15*d* (an axial length thereof being 1.6 mm) as a contact surface having a tapered shape; a first large outer diameter cylindrical surface 15*e* (Φ 6.3 mm, an axial length thereof being 0.8 mm); a third frustoconical outer surface 15*f* (an axial length thereof being 0.4 mm) as a contact surface having a tapered shape; and a second large outer diameter cylindrical surface 15*g* (Φ 6.6 mm, an axial length thereof being 3.3 mm); in this order from a front side thereof.

In addition, as shown in FIG. 3(*e*), an inner periphery surface of the annular member 15 includes: a small inner diameter cylindrical surface 15*ia* (Φ 3 mm, an axial length thereof being 2 mm); a first frustoconical inner surface 15*ib* (an axial length thereof being 0.5 mm); a medium inner diameter cylindrical surface 15*ic* (Φ 3.6 mm, an axial length thereof being 3.9 mm); a second frustoconical inner surface 15*id* (an axial length thereof being 0.4 mm); a square cylinder surface 15*ie* (an inscribed circle thereof being Φ 5.28 mm, an axial length thereof being 0.9 mm); a large inner diameter cylindrical surface 15*if* (Φ 5.43 mm, an axial length thereof being 2.1 mm); and a third frustoconical outer surface 15*ig* (an axial length thereof being 0.4 mm); in this order from a front side thereof. As shown in FIG. 2, in the present embodiment, the front end of the coil spring 16 is fixed (fittedly fixed) on the square cylinder surface 15*ie*.

In addition, the annular member 15 of the present embodiment is provided with three slits (cutout elements) 15*s* as a cutout. As shown in FIGS. 3(*a*) to 3(*e*), the three slits 15*s* are arranged at regular intervals (by every 120 degrees) in a circumferential direction of the annular member 15. Each of the three slits 15*s* has a width of 0.8 m, and extends from a front end of the annular member 15 to a substantially center of the second frustoconical outer surface 15*d* in an axial direction of the annular member 15 (an axial maximum length thereof being 5.5 mm).

Thus, when a load is received by the first frustoconical outer surface 15*b* (contact surface), an inner diameter of the annular member 15 is configured to be reduced flexibly, and when the load is released, the inner diameter of the annular member 15 is configured to be elastically returned to an original dimension thereof.

On the other hand, as shown in FIGS. 2, 5 and 6, an inner periphery surface of the shaft cylinder 11 in the vicinity of the opening thereof includes: a small inner diameter cylindrical surface 11 is (Φ 3.7 mm, an axial length thereof being 1.2 mm); a first frustoconical inner surface 11*ib* (an axial length thereof being 1.1 mm) as a guide surface having a tapered shape; a medium inner diameter cylindrical surface 11*ic* (Φ 4.95 mm, an axial length thereof being 1.3 mm); a second frustoconical inner surface 11*id* (an axial length thereof being 1.7 mm) as a guide surface having a tapered shape; a first large inner diameter cylindrical surface 11*ie* (Φ 6.5 mm, an axial length thereof being 0.8 mm); a third frustoconical inner surface 11 if (an axial length thereof being 0.3 mm) as a contact surface having a tapered shape; a second large inner diameter cylindrical surface 11*ig* (Φ 6.7 mm, an axial length thereof being 4.2 mm); and an annular protrusion 11*ih* (a minimum aperture diameter thereof being Φ 6.5 mm) as a regulatory element; in this order from a front side thereof.

Thus, in conjunction with a movement of the tip holder 13 toward a front end side thereof, the first frustoconical outer surface 15*b* (contact surface) is configured to receive a load from the first frustoconical inner surface 11*ib* (guide surface) and a load from the second frustoconical inner surface 11*id* (guide surface), respectively.

Herein, the coil spring 16 of the present embodiment has also a function of automatically retracting the tip holder 13 when a retracting operation for the tip 14 (for example, a sliding operation of an operational part provided on a lateral surface of the writing tool in order to release a locking mechanism that can maintain a projected state of the tip 14) is carried out. That is to say, the coil spring 16 is configured to function as a knock spring. (An operation load thereof is about 50 gf to 300 gf (about 0.49 N to 2.94 N). For example, an operation load from a state not in use (FIG. 2) is 68 gf, an operation load at a full stroke state (FIG. 5) is 288 gf, and an operation load from a state for writing (FIG. 6) is 227 gf. A spring constant thereof is 0.23 N/mm.)

The projectable and retractable writing tool 10 as described above operates as follows.

When not in use, the tip 14 (writing element) of the projectable and retractable writing tool 10 is retracted as shown in FIGS. 1 and 2. In this state, a length of the coil spring 16 in an axial direction thereof is 17 mm, and the inner diameter of the annular member 15 is not reduced. The small inner diameter cylindrical surface 15*ia* of the annular member 15 remains Φ 3.0 mm (>the outer diameter of the tip 14).

When a projecting operation for the tip 14 (for example, a sliding operation of an operational part provided on a lateral surface of the writing tool) is carried out, the tip 14 (writing element) of the projectable and retractable writing tool 10 is brought to a state shown in FIG. 4.

In the state shown in FIG. 4, because of the projecting operation for the tip 14, the second collar portion 13*c* of the tip holder 13 has been moved forward. Thereby, via the coil spring 16, the annular member 15 has also been moved forward and pressed toward the front side of the inside surface of the shaft cylinder 11. Then, the first frustoconical outer surface 15*b* (contact surface) receives a load from the first frustoconical inner surface 11*ib* (guide surface), and thus the inner diameter of the annular member 15 is reduced due to existence of the three slits 15*s* of the annular member 15.

The reduced inner diameter is adapted to correspond to the outer diameter of the tip 14. That is to say, the reduced minimum inner diameter (for example, about 2.35 mm to 2.45 mm) is of such a size that it allows a smooth sliding of the tip 14 (for example, Φ 2.5 mm) in a axial direction thereof while achieving an effective anti-vibration effect of the tip 14 in a radial direction thereof. In addition, even if the outer diameter of the tip 14 is smaller than Φ 2.5 mm (for example, Φ 2.4 mm) or larger than Φ 2.5 mm (for example, Φ 2.6 mm), the same (the same-sized) annular member 15 can achieve a similar effective anti-vibration effect. That is to say, the projectable and retractable writing tool 10 of the present embodiment is compatible to different types of refills having different refill diameters with regard to the anti-vibration effect, which can improve convenience for a user.

Herein, according to the present embodiment, a movement limit of the annular member on a front side thereof is defined by a contact between the second frustoconical outer surface 15*d* and the second frustoconical inner surface 11*id*. That is to say, in the present embodiment, the second frustoconical outer surface 15*d* of the annular member 15 and the second frustoconical inner surface 11*id* of the shaft cylinder 11 are configured to function as a stopper element for defining the movement limit of the annular member on the front side thereof. However, such a stopper element can be omitted.

Subsequently, when the projecting operation for the tip 14 (for example, the sliding operation of the operational part provided on the lateral surface of the writing tool) is continued, the tip 14 (writing element) of the projectable and retractable writing tool 10 is brought to a state shown in FIG. 5.

Thereafter, when the projecting operation for the tip 14 (for example, the sliding operation of the operational part provided on the lateral surface of the writing tool) is completed, the tip 14 (writing element) of the projectable and retractable writing tool is brought to a state shown in FIG. 6. Usually, a position of the tip holder 13 is locked in the state shown in FIG. 6. The projected state of the tip 14 is maintained until a retracting operation for the tip 14 is carried out thereafter. In this state, the length of the coil spring 16 in the axial direction thereof is 9.9 mm (shortened by 10.1 mm), and the reduced inner diameter of the annular member 15 is maintained by a restoring force of the coil spring 16. Thereby, the tip 14 can be grasped in a rattling-free (play-free) manner.

Herein, even when the stopper element for defining the movement limit of the annular member 15 on the front side thereof functions, if a dimension of the small inner diameter cylindrical surface 15*ia* of the inner periphery surface of the annular member is enough smaller than the outer diameter of the tip 14 (if a diameter difference therebetween is 0.05 mm or more (see paragraph 0081)), since the tip holder 13 and the annular member 15 are connected via the coil spring 16 such that the tip holder 13 and the annular member 15 are movable relatively to each other, it can be assured that the tip 14 is effectively grasped in a rattling-free (play-free) manner even if no high-precision dimension management is applied to a degree of reduction of the inner diameter of the annular member 15 or the like.

Thereafter, when a retracting operation for the tip 14 (for example, another sliding operation of the operational part provided on the lateral surface of the writing tool) is carried out, for example a locking mechanism not shown is released, so that the tip 14 (writing element) of the projectable and retractable writing tool 10 is brought again to the state shown in FIG. 5. Furthermore, by means of an action (restoring force) of the coil spring 16, the tip 14 is returned to the retracted state shown in FIG. 2 by way of the state shown in FIG. 4.

During a transition from the projected state shown in FIG. 4 to the retracted state shown in FIG. 2, since the tip holder 13 is moved toward a rear side thereof, the load received by the first frustoconical outer surface 15*b* (contact surface) from the first frustoconical inner surface 11*ib* (guide surface) disappears. Thereby, the inner diameter of the annular member 15 that has been reduced is returned to an original dimension thereof.

In addition, during the above course of the projecting operation and the retracting operation for the tip 14, the contact surface of the annular member 15 (the first frustoconical outer surface 15*b*) and the guide surface of the shaft cylinder 11 (the first frustoconical inner surface 11*ib*) are always in contact with each other.

As described above, according to the projectable and retractable writing tool 10 of the present embodiment, when the contact surface (the first frustoconical outer surface 15_b_) of the annular member 15 receives the load from the guide surface (the first frustoconical inner surface 11_ib_) of the shaft cylinder 11 in conjunction with the movement of the tip holder 13 toward the front end side, the inner diameter of the annular member 15 is reduced due to the existence of the slits 15_s_ of the annular member 15. In this manner, the shaft cylinder 11 and the annular member 15 cooperate with each other such that the tip 14 can be grasped in a rattling-free (play-free) manner. Furthermore, according to the projectable and retractable writing tool 10 of the present embodiment, although the stopper element for defining the movement limit of the annular member 15 on the front side thereof functions, due to the fact that the dimension of the small inner diameter cylindrical surface 15_ia_ of the inner periphery surface of the annular member 15 is enough smaller than the outer diameter of the tip 14 (due to the fact that the diameter difference therebetween is 0.05 mm or more (see paragraph 0081)), since the tip holder 13 and the annular member 15 are connected via the coil spring 16 such that the tip holder 13 and the annular member 15 are movable relatively to each other, it can be assured that the tip 14 can be effectively grasped in a rattling-free (play-free) manner even if no high-precision dimension management is applied to a degree of reduction of the inner diameter of the annular member 15 or the like.

In addition, according to the projectable and retractable writing tool 10 of the present embodiment, since the three slits 15_s_ as a cutout are arranged at regular intervals in a circumferential direction of the annular member 15 and each slit 15_s_ extends in the axial direction of the annular member 15, the inner diameter of the annular member 15 can be reduced in a circumferentially well-balanced manner.

In addition, the contact surface of the annular member 15 (the first frustoconical outer surface 15_b_) and the guide surface of the shaft cylinder 11 (the first frustoconical inner surface 11_ib_) are a frustoconical outer surface and a frustoconical inner surface which correspond to each other. Thus, the contact surface of the annular member 15 can receive the load in a circumferentially well-balanced manner, so that the inner diameter of the annular member 15 can be reduced in a circumferentially well-balanced manner. Like this, it is preferable that the contact surface of the annular member 15 (the first frustoconical outer surface 15_b_) and the guide surface of the shaft cylinder 11 (the first frustoconical inner surface 11_ib_) have tapered shapes toward the front end side. A tapered contact surface may have a convex curved surface which is rotationally symmetric about an axis, and a tapered guide surface may have a concave curved surface or a concave frustoconical surface which is also rotationally symmetric about the axis but has a curvature gentler than that of the convex curved surface.

In addition, it is possible to adjust elasticity (easiness of reduction of the inner diameter) of the annular member 15 by suitably changing the number of the slits 15_s_, the sizes of the slits 15_s_ and/or the shapes of the slits 15_s_. In addition, it is also possible to adjust elasticity (easiness of reduction of the inner diameter) of the annular member 15 by changing a material and/or a thickness of the annular member 15.

In addition, according to the projectable and retractable writing tool 10 of the present embodiment, the annular protrusion 11_ih_ is provided in the inner periphery surface of the shaft cylinder 11 in such a manner that the movement limit of the annular member 15 on the rear side thereof is defined. Thereby, an excessive movement (in particular, a dropout) of the annular member 15 on the rear side thereof can be effectively prevented.

In addition, according to the projectable and retractable writing tool 10 of the present embodiment, a grasping portion of the annular member 15 that can grasp the tip 14 (a portion having the reduced minimum inner diameter) is located more forward than the contact surface (the first frustoconical outer surface 15_b_) of the annular member 15 (there is no grasping portion located radially inward of the contact surface). According to this feature, the tip 14 can be grasped on the more forward side, and thus the tip 14 can be grasped more effectively in a rattling-free (play-free) manner.

In addition, according to the projectable and retractable writing tool 10 of the present embodiment, the rear end of each slit 15_s_ is located more forward than the coil spring 16. According to this feature, even if the annular member 15 is deflected due to existence of the slits 15_s_, it is possible to maintain a stable connection between the coil spring 16 and the annular member 15.

In addition, according to the projectable and retractable writing tool 10 of the present embodiment, the contact surface of the annular member 15 (the first frustoconical outer surface 15_b_) and the guide surface of the shaft cylinder 11 (the first frustoconical inner surface 11_ib_) are always in contact with each other. According to this feature, it is avoided that the contact surface of the annular member 15 and the guide surface of the shaft cylinder 11 repeatedly contact with and separate from each other every time the projecting or retracting operation for the tip 14 is carried out. Therefore, the projecting or retracting operation is stable, which offers a smooth feeling of operation (no discomfort) to the user.

In addition, according to the projectable and retractable writing tool 10 of the present embodiment, the annular member 15 is projected from the opening of the shaft cylinder 11 in a front direction thereof. According to this feature, the tip 14 can be grasped with a longer axial range, and thus it can be assured that the tip 14 is grasped more effectively in a rattling-free (play-free) manner. In addition, the feature that a part (annular member 15) for achieving an anti-vibration effect for the projectable and retractable writing tool 10 is provided can be visually appealed to users. Furthermore, with respect to appearance in the vicinity of the front end of the projectable and retractable writing tool 10 under the state wherein the tip 14 has been projected, a smooth shape can continue from a rear side toward a tip end, which can improve aesthetics thereof.

In addition, according to the projectable and retractable writing tool 10 of the present embodiment, a projection amount (length) of the annular member 15 from the opening of the shaft cylinder 11 in the front direction is smaller than a movable range of the annular member 15 in the axial direction. According to this feature, even when the annular member 15 is pushed to be retracted into the opening of the shaft cylinder 11, the annular member 15 is still within the movable range in the axial direction, and thus it can be effectively prevented that the annular member 15 is undesirably dropped out or the like.

In addition, in the projectable and retractable writing tool 10 of the present embodiment, it is preferable that a knock operation part for the projecting or retracting operation of the tip 14 or a rear portion of the shaft cylinder 11 is provided with a soft material member (rubbing member) for a thermochromic writing tool. When the conventional structure is adopted for a thermochromic writing tool, the tip (or the tip holder) may rattle due to vibration at the time of rubbing a written brushstroke, which may result in fear of generating noise. However, according to the structure of the present embodiment, there is no such fear. Thus, it is recommendable that the structure of the present embodiment is adopted for a thermochromic writing tool.

Second Embodiment

Figure 7:
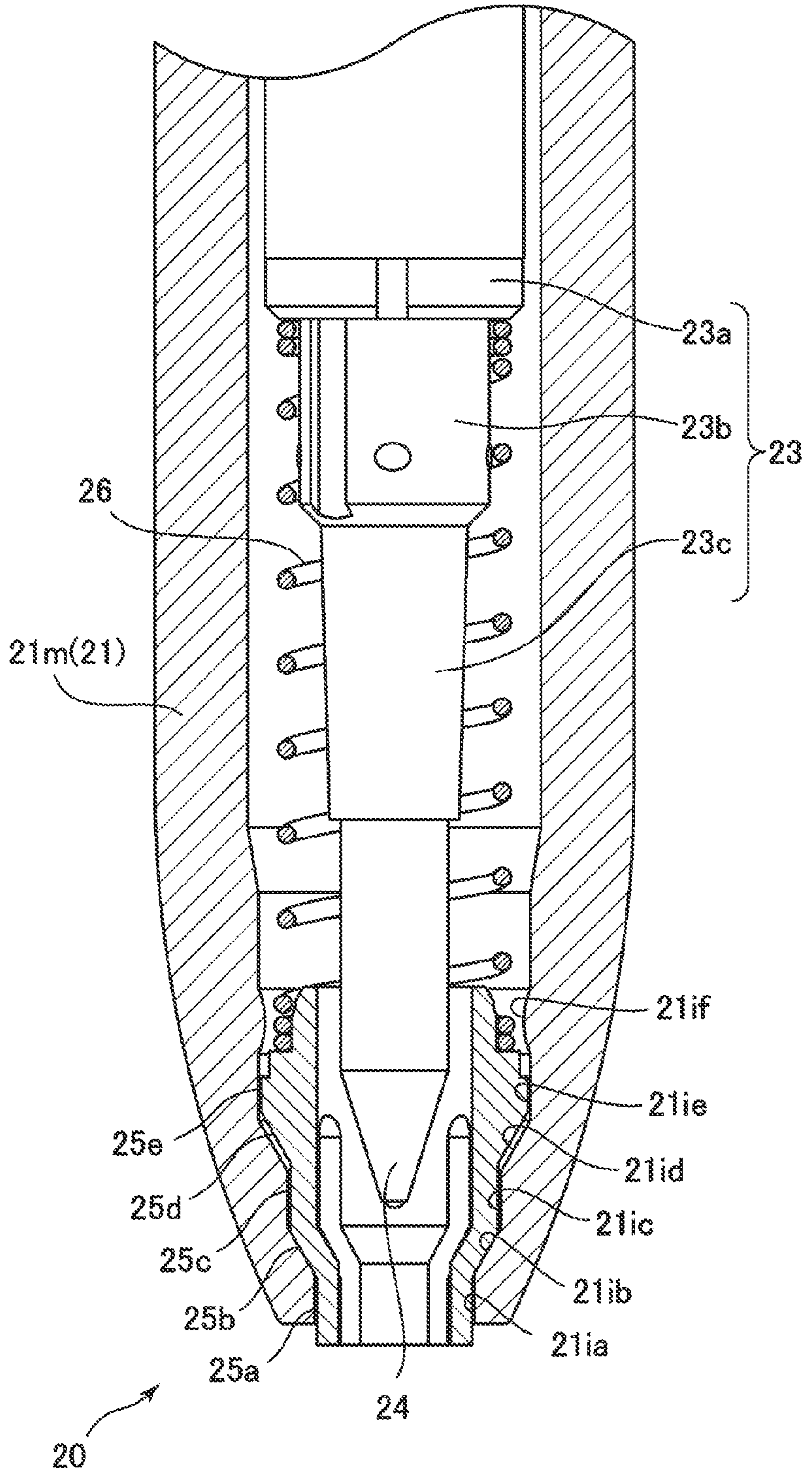
FIG. 7 is a schematic longitudinal section view showing a projectable and retractable writing tool according to a second embodiment of the present invention, under a state wherein a tip (writing element) has not been projected.

FIG. 7 is a schematic longitudinal section view showing a projectable and retractable writing tool 20 according to a second embodiment of the present invention, under a state wherein a tip 24 (writing element) has not been projected.

Figure 8:
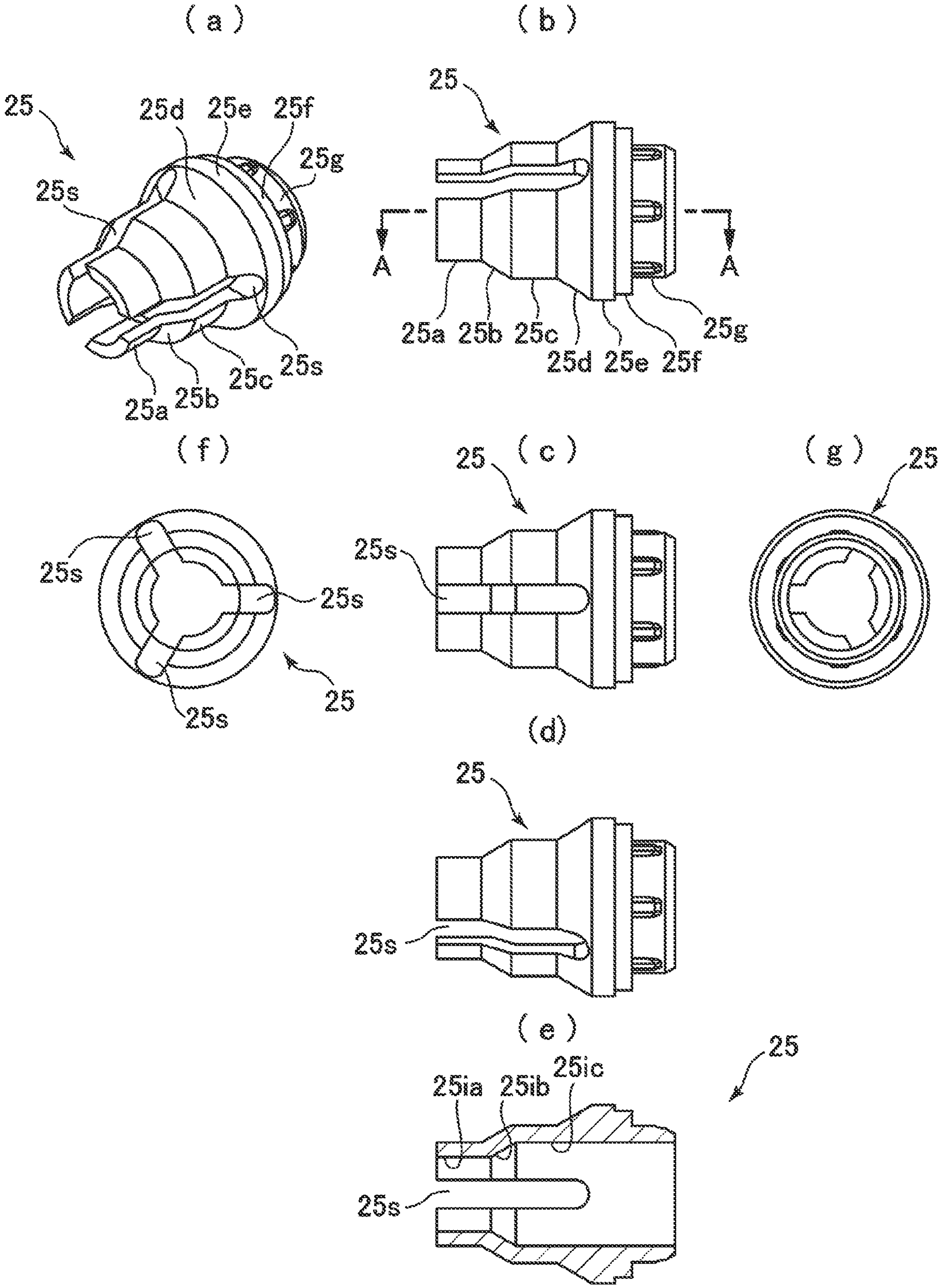
FIG. 8(*a*) is a perspective view of an annular member of the projectable and retractable writing tool shown in FIG. 7.

In addition, FIG. 8(*a*) is a perspective view of an annular member 25 of the projectable and retractable writing tool 20 shown in FIG. 7, FIG. 8(*b*) is a plan view of the annular member 25 shown in FIG. 8(*a*), FIG. 8(*c*) is a side view of the annular member 25 shown in FIG. 8(*a*), FIG. 8(*d*) is a bottom view of the annular member 25 shown in FIG. 8(*a*), FIG. 8(*e*) is a section view taken along line A-A of FIG. 8(*b*), FIG. 8(*f*) is a front view (a view seen from the leading edge side) of the annular member 25 shown in FIG. 8(*a*), and FIG. 8(*g*) is a rear view of the annular member 25 shown in FIG. 8(*a*).

As shown in FIGS. 7 and 8, the projectable and retractable writing tool 20 according to the second embodiment is different from the projectable and retractable writing tool 10 according to the first embodiment in configuration of the annular member 25 and configuration of the inner periphery surface of the front portion 21*m* of the shaft cylinder 21.

As well as the projectable and retractable writing tool 10 according to the first embodiment, A tip holder 23, which is movable in an axial direction of the shaft cylinder 21, is contained in an inside of the shaft cylinder 21. A tip 24 as a writing element is fixed to a front end of the tip holder 23. The tip 24 is projectable and retractable through the opening of the shaft cylinder 21 in conjunction with a movement of the tip holder 23.

As shown in FIG. 7, the tip holder 23 includes: a proximal portion 23*a*, a first collar portion 23*b* and a second collar portion 23*c*, in this order from a proximal side thereof toward a distal side thereof. In the present embodiment, each of the proximal portion 23*a* and the first collar portion 23*b* has a cylindrical shape, and the second collar portion 23*c* has a frustoconical shape. The relationship between their cross-sectional diameters is as follows: the proximal portion 23*a*>the first collar portion 23*b*>the second collar portion 23*c*.

In the present embodiment, as shown in FIG. 7, an annular member 25 is loosely fitted onto an inner periphery of the opening of the shaft cylinder 21 to be movable in an axial direction of the shaft cylinder 21 with respect to the shaft cylinder 21. A front end of the annular member 25 is located more forward than a front end of the shaft cylinder 21. On a rear side of the annular member 25, an outer diameter thereof and an inner diameter thereof are enlarged, so that the enlarged portion of the annular member 25 covers the tip 24 (whose diameter is Φ 2.5) in a non-contact manner.

In addition, the annular member 25 is fixed to a front end of a coil spring 26 (an example of an elastic member). The coil spring 26 surrounds the second collar portion 23*c* of the tip holder 23 and the tip 24 in a loosely fitted state (with a slight gap). A rear end of the coil spring 26 is always pressed by (not fixed to) the proximal portion 23*a* of the tip holder 23. Thereby, the coil spring 26 connects the tip holder 23 and the annular member 25 such that the tip holder 23 and the annular member 25 are movable relatively to each other. In addition, the annular member 25 is movable in the axial direction of the shaft cylinder 21 with respect to the shaft cylinder 21, in conjunction with a movement of the tip holder 23 and thus in conjunction with expansion and contraction of the coil spring 26.

The annular member 25 is made of resin (for example, polyacetal, polypropylene or polyethylene) or made of metal (for example, brass).

In addition, as shown in FIGS. 8(*a*) to 8(*g*), an outer periphery surface of the annular member 25 includes: a small outer diameter cylindrical surface 25*a* (Φ 3.6 mm, an axial length thereof being 1.6 mm); a first frustoconical outer surface 25*b* (an axial length thereof being 1 mm) as a contact surface having a tapered shape; a medium outer diameter cylindrical surface 25*c* (Φ 4.8 mm, an axial length thereof being 1.6 mm); a second frustoconical outer surface 25*d* (an axial length thereof being 1.2 mm) as a contact surface having a tapered shape; a first large outer diameter cylindrical surface 25*e* (Φ 6.2 mm, an axial length thereof being 0.8 mm); a second large outer diameter cylindrical surface 25*f* (Φ 5.8 mm, an axial length thereof being 0.6 mm); and a coil spring fitting cylindrical surface 25*g* (Φ 4.75 mm, an axial length thereof being 1 mm); in this order from a front side thereof. With reference to FIG. 7, in the present embodiment, the front end of the coil spring 26 is fixed (fittedly fixed) on the coil spring fitting cylindrical surface 25*g*.

In addition, as shown in FIG. 8(*e*), an inner periphery surface of the annular member 25 includes: a small inner diameter cylindrical surface 25*ia* (Φ 2.6 mm, an axial length thereof being 1.9 mm); a first frustoconical inner surface 25*ib* (an axial length thereof being 0.9 mm); and a large inner diameter cylindrical surface 25*ic* 3.6 mm, an axial length thereof being 5.6 mm); in this order from a front side thereof.

In addition, the annular member 25 of the present embodiment is provided with three slits (cutout elements) 25*s* as a cutout. As shown in FIGS. 8(*a*) to 8(*e*), the three slits 25*s* are arranged at regular intervals (by every 120 degrees) in a circumferential direction of the annular member 25. Each of the three slits 25*s* has a width of 1 mm, and extends from a front end of the annular member 25 to a substantially rear end of the second frustoconical outer surface 25*d* in an axial direction of the annular member (an axial maximum length thereof being 5.3 mm).

Thus, when a load is received by the first frustoconical outer surface 25*b* (contact surface), an inner diameter of the annular member 25 is configured to be reduced flexibly, and when the load is released, the inner diameter of the annular member 25 is configured to be elastically returned to an original dimension thereof.

On the other hand, an inner periphery surface of the shaft cylinder 21 in the vicinity of the opening thereof includes: a small inner diameter cylindrical surface 21*ia* (Φ 3.7 mm, an axial length thereof being 1.2 mm); a first frustoconical inner surface 21*ib* (an axial length thereof being 1.1 mm) as a guide surface having a tapered shape; a medium inner diameter cylindrical surface 21*ic* (Φ 4.95 mm, an axial length thereof being 1.3 mm); a second frustoconical inner surface 21*id* (an axial length thereof being 1.2 mm) as a guide surface having a tapered shape; a large inner diameter cylindrical surface 21*ie* (Φ 6.3 mm, an axial length thereof being 1.5 mm); and an annular protrusion 21*if* (a minimum aperture diameter thereof being Φ 6 mm) as a regulatory element; in this order from a front side thereof.

Thus, in conjunction with a movement of the tip holder 23 toward a front end side thereof, the first frustoconical outer surface 25*b* (contact surface) is configured to receive a load from the first frustoconical inner surface 21*ib* (guide surface).

Herein, the coil spring 26 of the present embodiment has also a function of automatically retracting the tip holder 23 when a retracting operation for the tip 24 (for example, a sliding operation of an operational part provided on a lateral surface of the writing tool in order to release a locking mechanism that can maintain a projected state of the tip 24) is carried out. That is to say, the coil spring 26 is configured to function as a knock spring. (An operation load thereof is about 50 gf to 300 gf (about 0.49 N to 2.94 N). For example, an operation load from a state not in use (FIG. 7) is 67 gf, an operation load at a full stroke state (not shown) is 285 gf, and an operation load from a state for writing (not shown) is 225 gf. A spring constant thereof is 0.23 N/mm.)

The projectable and retractable writing tool 20 as described above operates as follows.

When not in use, the tip 24 (writing element) of the projectable and retractable writing tool 20 is retracted as shown in FIG. 7. In this state, a length of the coil spring 26 in an axial direction thereof is 17 mm, and the inner diameter of the annular member 25 is not reduced. The small inner diameter cylindrical surface 25*ia* of the annular member 25 remains Φ 2.6 mm (>the outer diameter of the tip 24).

When a projecting operation for the tip 24 (for example, a sliding operation of an operational part provided on a lateral surface of the writing tool) is carried out, via the coil spring 26, the annular member 25 is moved forward and pressed toward the front side of the inside surface of the shaft cylinder 21. Then, the first frustoconical outer surface 25*b* (contact surface) receives a load from the first frustoconical inner surface 21*ib* (guide surface), and thus the inner diameter of the annular member 25 is reduced due to existence of the three slits 25*s* of the annular member 25.

The reduced inner diameter is adapted to correspond to the outer diameter of the tip 24. That is to say, the reduced minimum inner diameter (for example, about 2.35 mm to 2.45 mm) is of such a size that it allows a smooth sliding of the tip 24 (for example, Φ 2.5 mm) in a axial direction thereof while achieving an effective anti-vibration effect of the tip 24 in a radial direction thereof. In addition, even if the outer diameter of the tip 24 is smaller than Φ 2.5 mm (for example, Φ 2.4 mm) or larger than Φ 2.5 mm (for example, Φ 2.6 mm), the same (the same-sized) annular member 25 can achieve a similar effective anti-vibration effect. That is to say, the projectable and retractable writing tool 20 of the present embodiment is compatible to different types of refills having different refill diameters with regard to the anti-vibration effect, which can improve convenience for a user.

When the projecting operation for the tip 24 (for example, the sliding operation of the operational part provided on the lateral surface of the writing tool) is completed, a position of the tip holder 23 is locked, and thus a projected state of the tip 24 is maintained until a retracting operation for the tip 24 is carried out thereafter. In this state, the length of the coil spring 26 in the axial direction thereof is 9.9 mm (shortened by 10.1 mm), and the reduced inner diameter of the annular member 25 is maintained by a restoring force of the coil spring 26. Thereby, the tip 24 can be grasped in a rattling-free (play-free) manner.

Herein, since the tip holder 23 and the annular member 25 are connected via the coil spring 26 such that the tip holder 23 and the annular member 25 are movable relatively to each other, it can be assured that the tip 24 is effectively grasped in a rattling-free (play-free) manner even if no high-precision dimension management is applied to a degree of reduction of the inner diameter of the annular member 25 or the like.

Thereafter, when a retracting operation for the tip 24 (for example, another sliding operation of the operational part provided on the lateral surface of the writing tool) is carried out, for example a locking mechanism not shown is released. Then, by means of an action (restoring force) of the coil spring 26, the tip 24 is returned to the retracted state shown in FIG. 7.

During a transition returning to the retracted state shown in FIG. 7, since the tip holder 23 is moved toward a rear side thereof, the load received by the first frustoconical outer surface 25*b* (contact surface) from the first frustoconical inner surface 21*ib* disappears. Thereby, the inner diameter of the annular member 25 that has been reduced is returned to an original dimension thereof.

In addition, during the above course of the projecting operation and the retracting operation for the tip 24, the contact surface of the annular member 25 (the first frustoconical outer surface 25*b*) and the guide surface of the shaft cylinder 21 (the first frustoconical inner surface 21*ib*) are always in contact with each other.

As described above, according to the projectable and retractable writing tool 20 of the present embodiment as well, when the contact surface ((the first frustoconical outer surface 25*b*) of the annular member 25 receives the load from the guide surface (the first frustoconical inner surface 21*ib*) of the shaft cylinder 21 in conjunction with the movement of the tip holder 23 toward the front end side, the inner diameter of the annular member 25 is reduced due to the existence of the slits 25*s* of the annular member 25. In this manner, the shaft cylinder 21 and the annular member 25 cooperate with each other such that the tip 24 can be grasped in a rattling-free (play-free) manner. Furthermore, since the tip holder 23 and the annular member 25 are connected via the coil spring 26 such that the tip holder 23 and the annular member 25 are movable relatively to each other, it can be assured that the tip 24 can be effectively grasped in a rattling-free (play-free) manner even if no high-precision dimension management is applied to a degree of reduction of the inner diameter of the annular member 25 or the like.

In addition, according to the projectable and retractable writing tool 20 of the present embodiment as well, since the three slits 25*s* as a cutout are arranged at regular intervals in a circumferential direction of the annular member 25 and each slit 25*s* extends in the axial direction of the annular member 25, the inner diameter of the annular member 25 can be reduced in a circumferentially well-balanced manner.

In addition, the contact surface of the annular member 25 (the first frustoconical outer surface 25*b*) and the guide surface of the shaft cylinder 21 (the first frustoconical inner surface 21*ib*) are a frustoconical outer surface and a frustoconical inner surface which correspond to each other. Thus, the contact surface of the annular member 25 can receive the load in a circumferentially well-balanced manner, so that the inner diameter of the annular member 25 can be reduced in a circumferentially well-balanced manner.

In addition, it is possible to adjust elasticity (easiness of reduction of the inner diameter) of the annular member 25 by suitably changing the number of the slits 25*s*, the sizes of the slits 25*s* and/or the shapes of the slits 25*s*. In addition, it is also possible to adjust elasticity (easiness of reduction of the inner diameter) of the annular member 25 by changing a material and/or a thickness of the annular member 25.

In addition, according to the projectable and retractable writing tool 20 of the present embodiment as well, the annular protrusion 21*if* is provided in the inner periphery surface of the shaft cylinder 21 in such a manner that the movement limit of the annular member 25 on the rear side thereof is defined. Thereby, an excessive movement (in particular, a dropout) of the annular member 25 on the rear side thereof can be effectively prevented.

In addition, according to the projectable and retractable writing tool 20 of the present embodiment as well, a grasping portion of the annular member 25 that can grasp the tip 24 (a portion having the reduced minimum inner diameter) is located more forward than the contact surface (the first frustoconical outer surface 25*b*) of the annular member 25 (there is no grasping portion located radially inward of the contact surface). According to this feature, the tip 24 can be grasped on the more forward side, and thus the tip 24 can be grasped more effectively in a rattling-free (play-free) manner.

In addition, according to the projectable and retractable writing tool 20 of the present embodiment as well, the rear end of each slit 25*s* is located more forward than the coil spring 26. According to this feature, even if the annular member 25 is deflected due to existence of the slits 25*s*, it is possible to maintain a stable connection between the coil spring 26 and the annular member 25.

In addition, according to the projectable and retractable writing tool 20 of the present embodiment as well, the contact surface of the annular member 25 (the first frustoconical outer surface 25*b*) and the guide surface of the shaft cylinder 21 (the first frustoconical inner surface 21*ib*) are always in contact with each other. According to this feature, it is avoided that the contact surface of the annular member 25 and the guide surface of the shaft cylinder 21 repeatedly contact with and separate from each other every time the projecting or retracting operation for the tip 24 is carried out. Therefore, the projecting or retracting operation is stable, which offers a smooth feeling of operation (no discomfort) to the user.

In addition, according to the projectable and retractable writing tool 20 of the present embodiment as well, the annular member 25 is projected from the opening of the shaft cylinder 21 in a front direction thereof. According to this feature, the tip 24 can be grasped with a longer axial range, and thus it can be assured that the tip 24 is grasped more effectively in a rattling-free (play-free) manner. In addition, the feature that a part (annular member 25) for achieving an anti-vibration effect for the projectable and retractable writing tool 20 is provided can be visually appealed to users. Furthermore, with respect to appearance in the vicinity of the front end of the projectable and retractable writing tool 20 under the state wherein the tip 24 has been projected, a smooth shape can continue from a rear side toward a tip end, which can improve aesthetics thereof.

In addition, according to the projectable and retractable writing tool 20 of the present embodiment as well, a projection amount (length) of the annular member 25 from the opening of the shaft cylinder 21 in the front direction is smaller than a movable range of the annular member 25 in the axial direction. According to this feature, even when the annular member 25 is pushed to be retracted into the opening of the shaft cylinder 21, the annular member 25 is still within the movable range in the axial direction, and thus it can be effectively prevented that the annular member 25 is undesirably dropped out or the like.

In addition, in the projectable and retractable writing tool 20 of the present embodiment as well, it is preferable that a knock operation part for the projecting or retracting operation of the tip 24 or a rear portion of the shaft cylinder 21 is provided with a soft material member (rubbing member) for a thermochromic writing tool. When the conventional structure is adopted for a thermochromic writing tool, the tip (or the tip holder) may rattle due to vibration at the time of rubbing a written brushstroke, which may result in fear of generating noise. However, according to the structure of the present embodiment, there is no such fear. Thus, it is recommendable that the structure of the present embodiment is adopted for a thermochromic writing tool.

Third Embodiment

Figure 9:
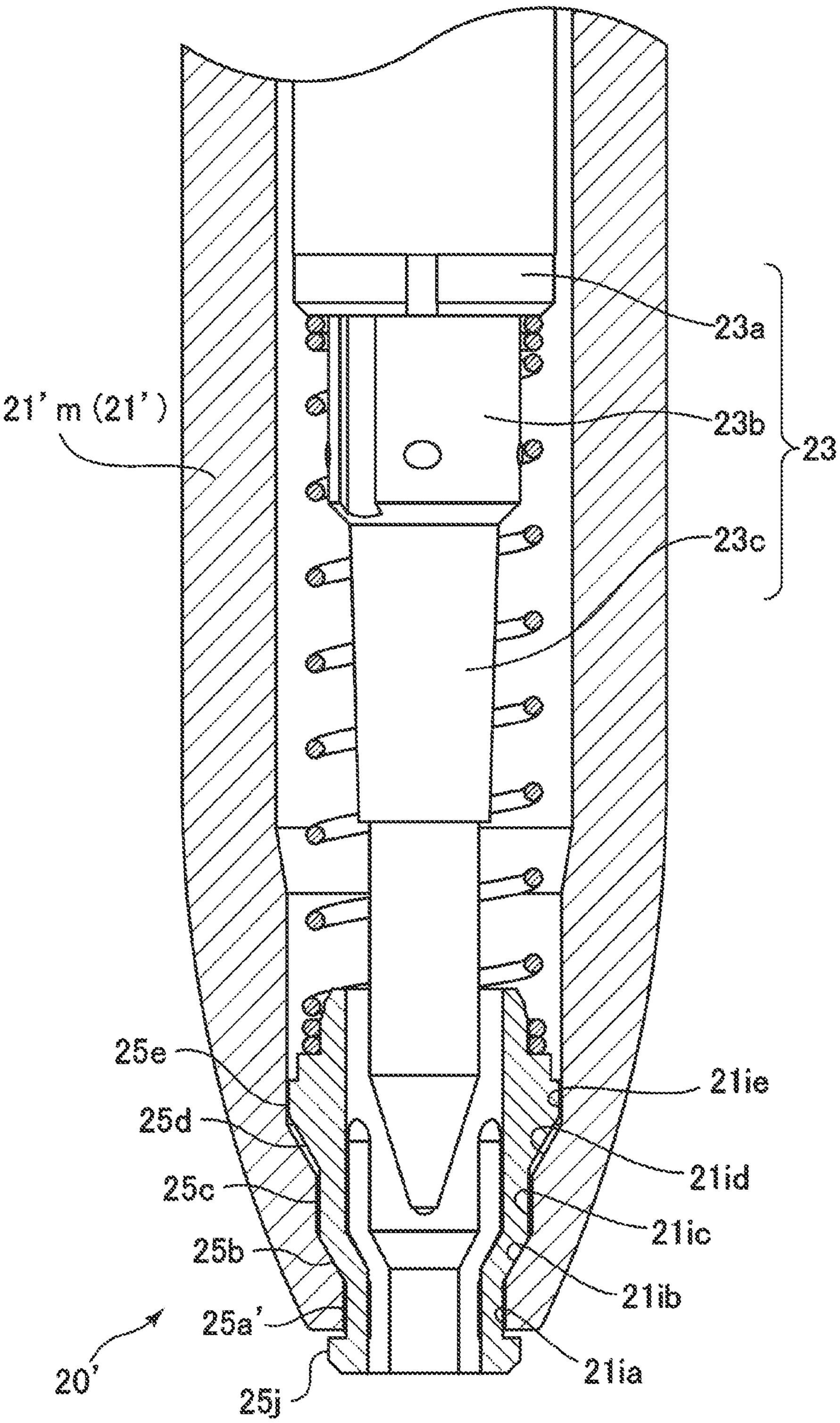
FIG. 9 is a schematic longitudinal section view showing a projectable and retractable writing tool according to a third embodiment of the present invention, under a state wherein a tip (writing element) has not been projected.

FIG. 9 is a schematic longitudinal section view showing a projectable and retractable writing tool 20' according to a third embodiment of the present invention, under a state wherein a tip 24 (writing element) has not been projected.

Figure 10:
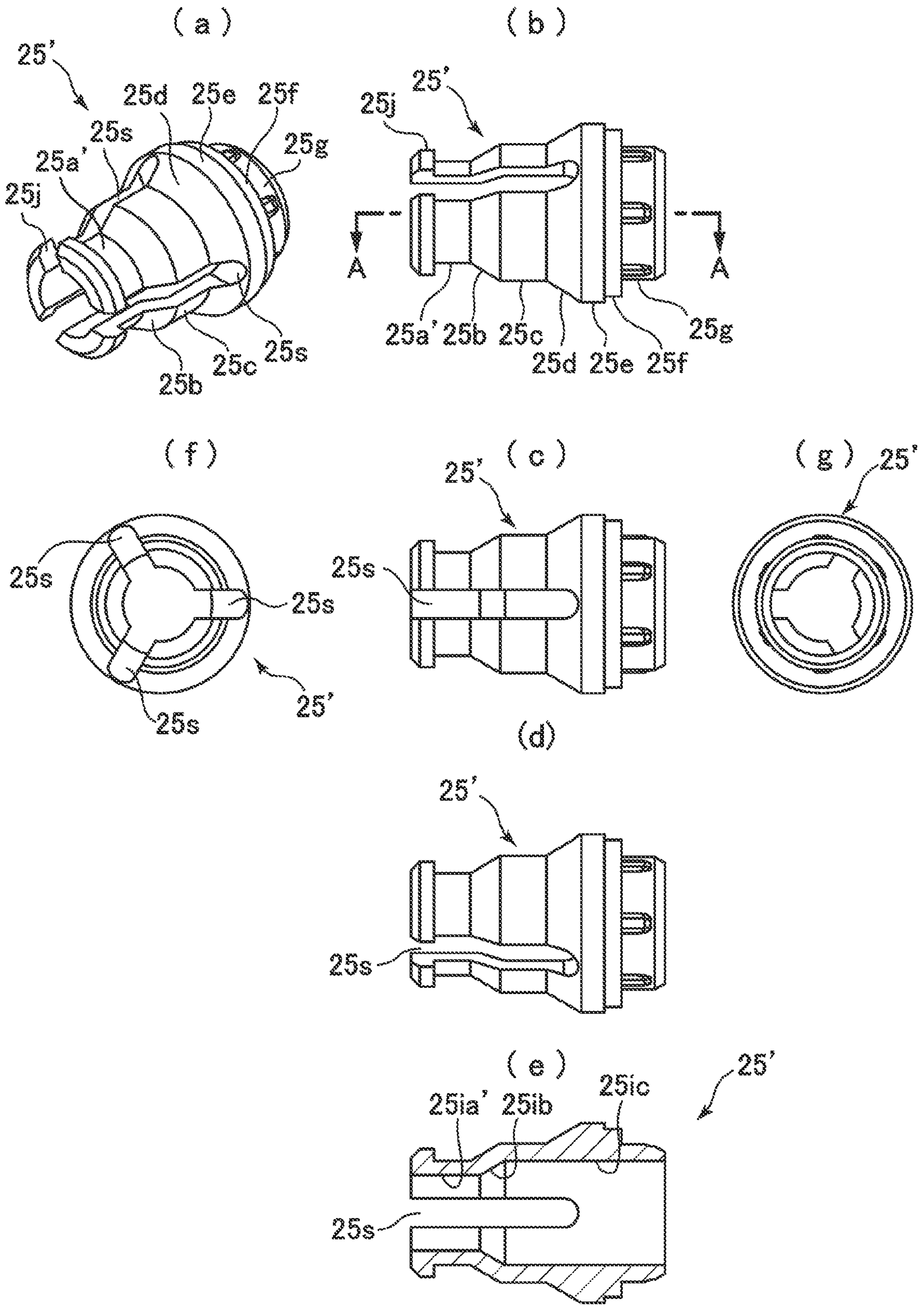
FIG. 10(*a*) is a perspective view of an annular member of the projectable and retractable writing tool shown in FIG. 9.
Figure 11:
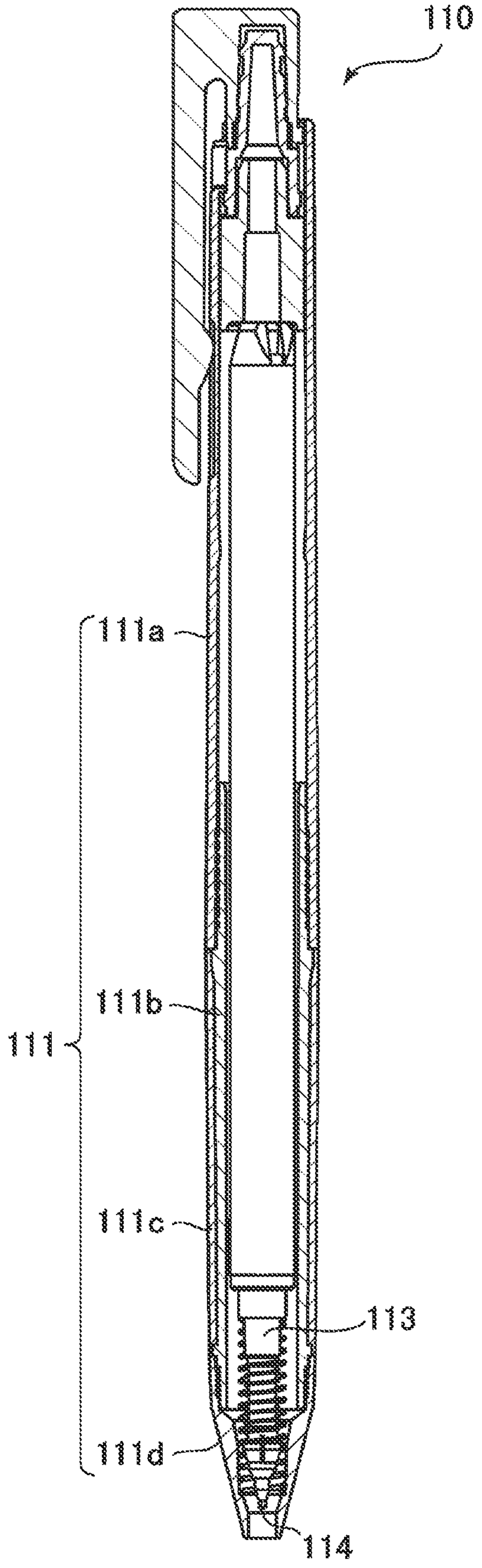
FIG. 11 is a schematic longitudinal section view showing a projectable and retractable writing tool according to the first type of Patent Document 4, under a state wherein a tip (writing element) has not been projected.
Figure 12:
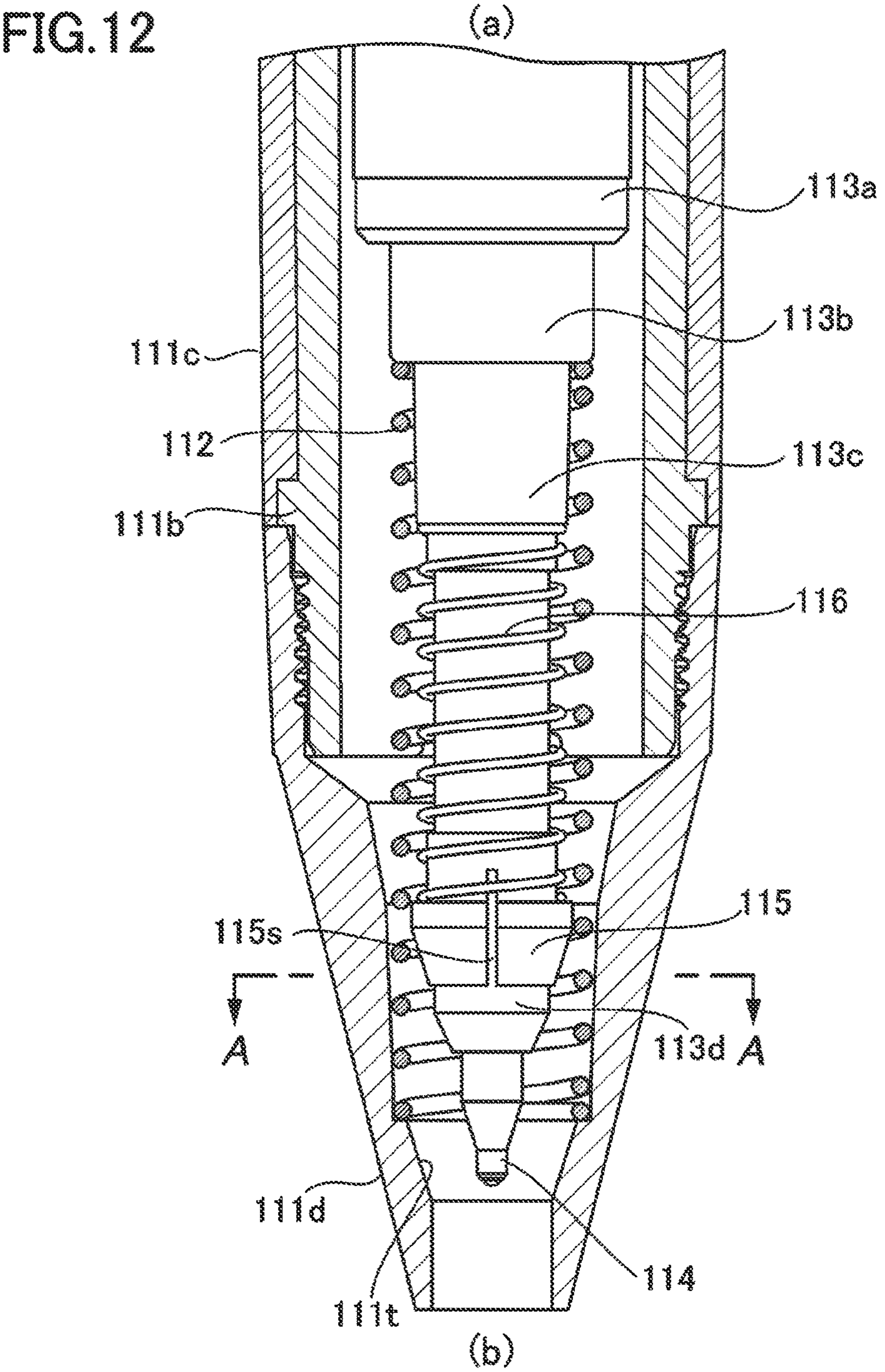
FIG. 12(*a*) is an enlarged longitudinal section view of a leading edge portion of the projectable and retractable writing tool according to the first type of Patent Document 4.
Figure 12:
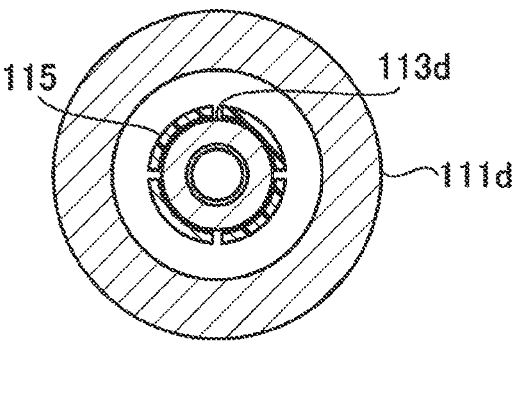
Figure 13:
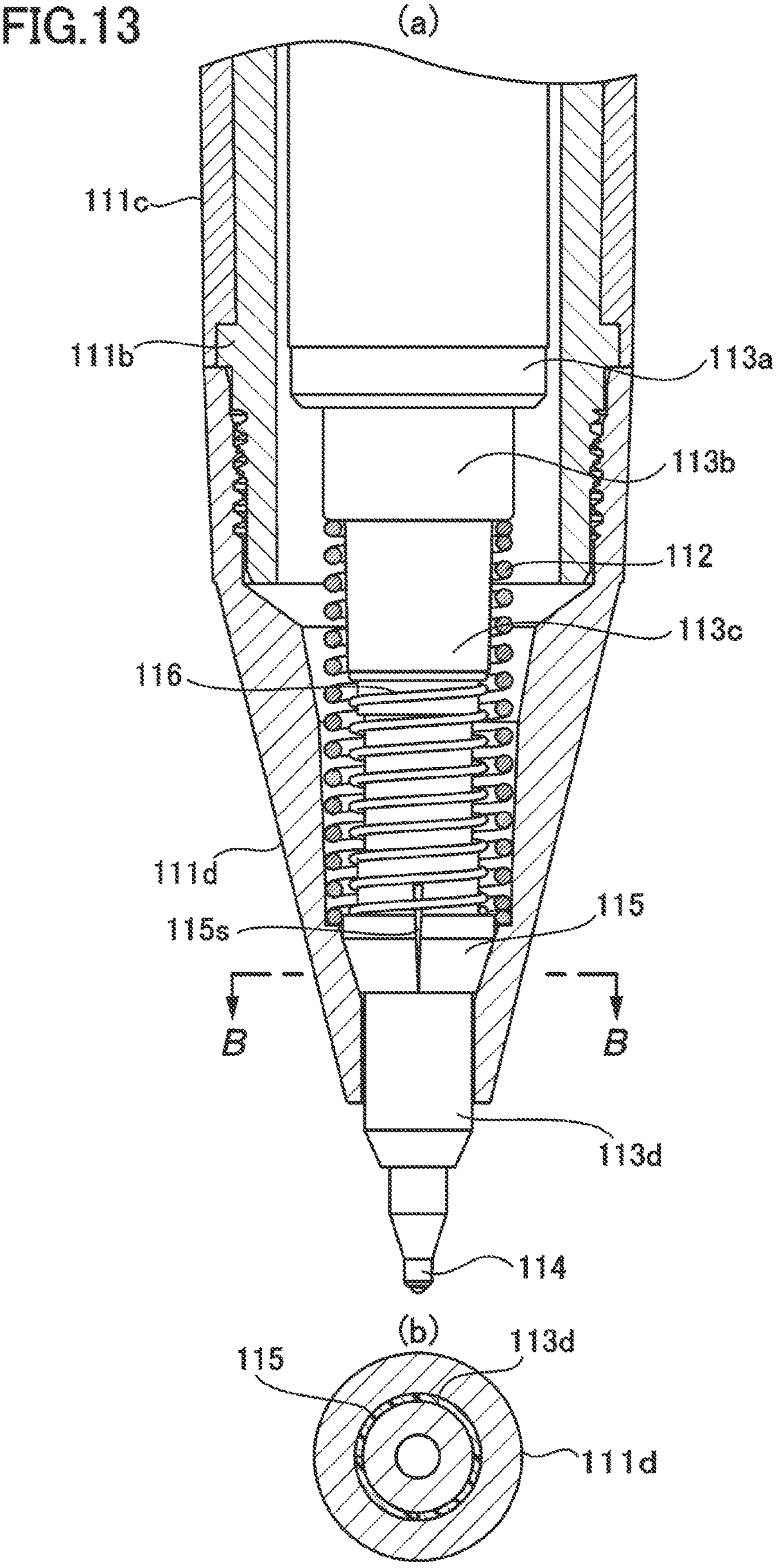
FIG. 13(*a*) is an enlarged longitudinal section view of the leading edge portion of the projectable and retractable writing tool according to the first type of Patent Document 4, under a state wherein the tip (writing element) has been projected.
Figure 14:
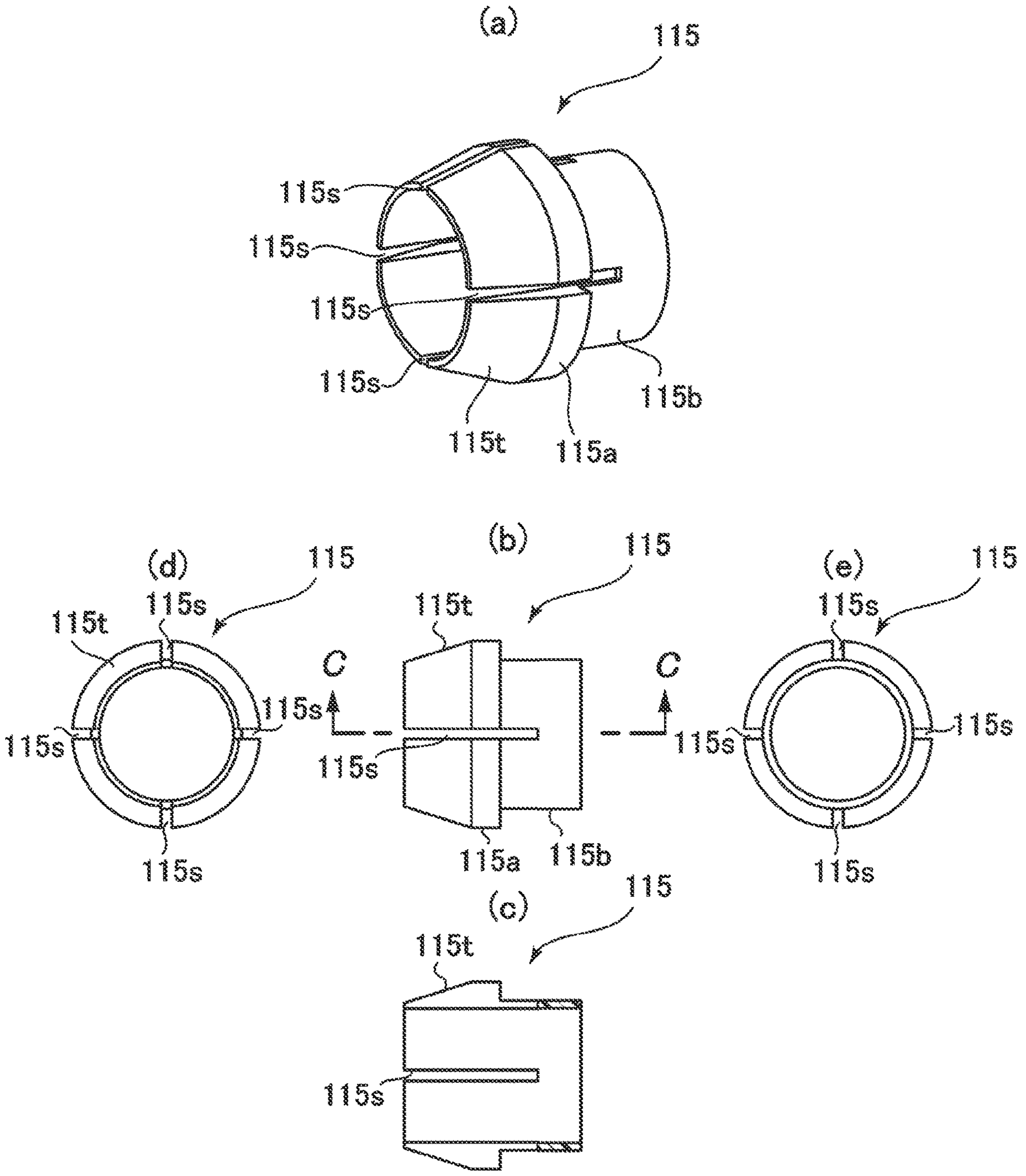
FIG. 14(*a*) is a perspective view of an annular member of the projectable and retractable writing tool according to the first type of Patent Document 4.
Figure 15:
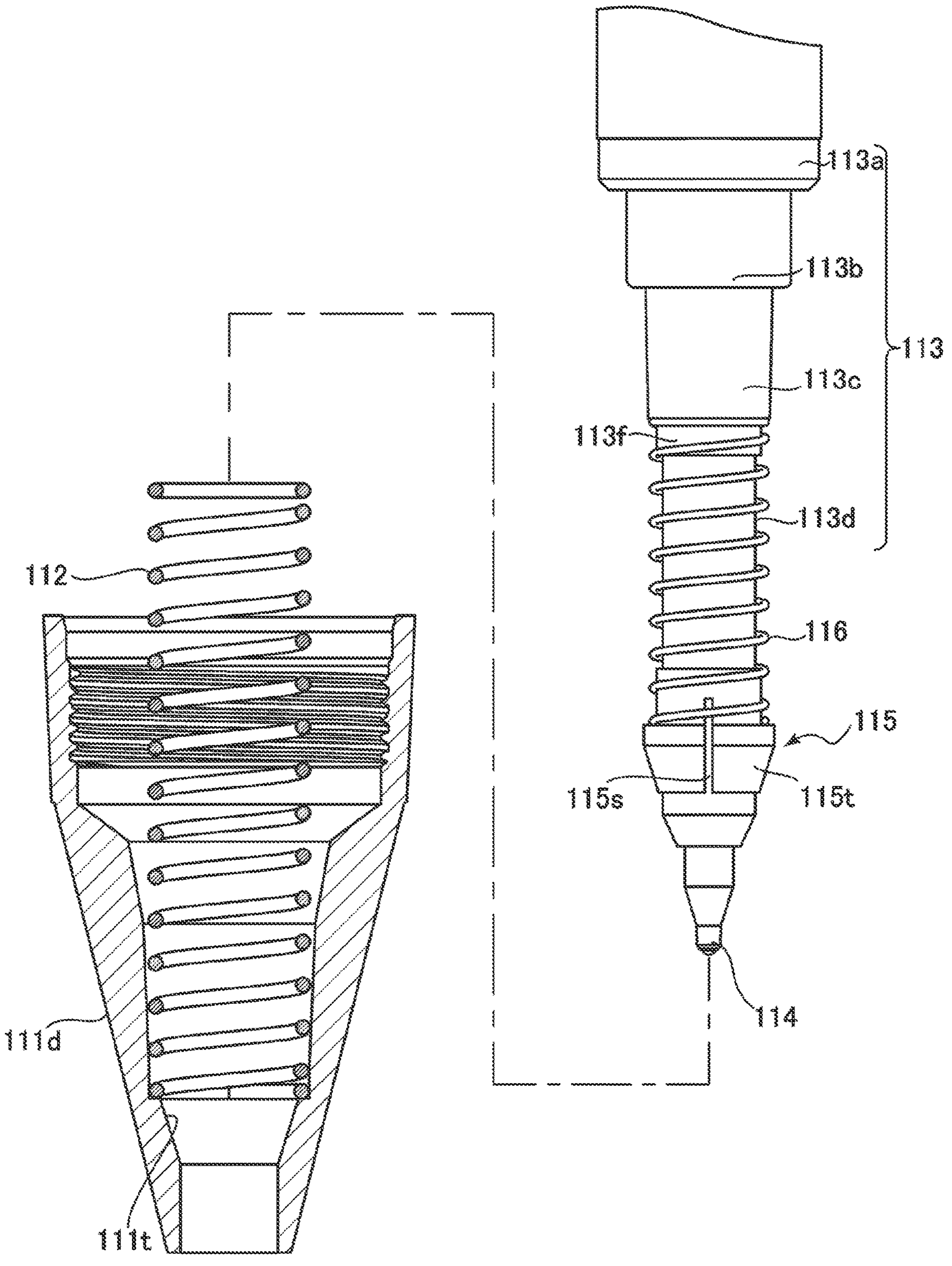
Figure 16:
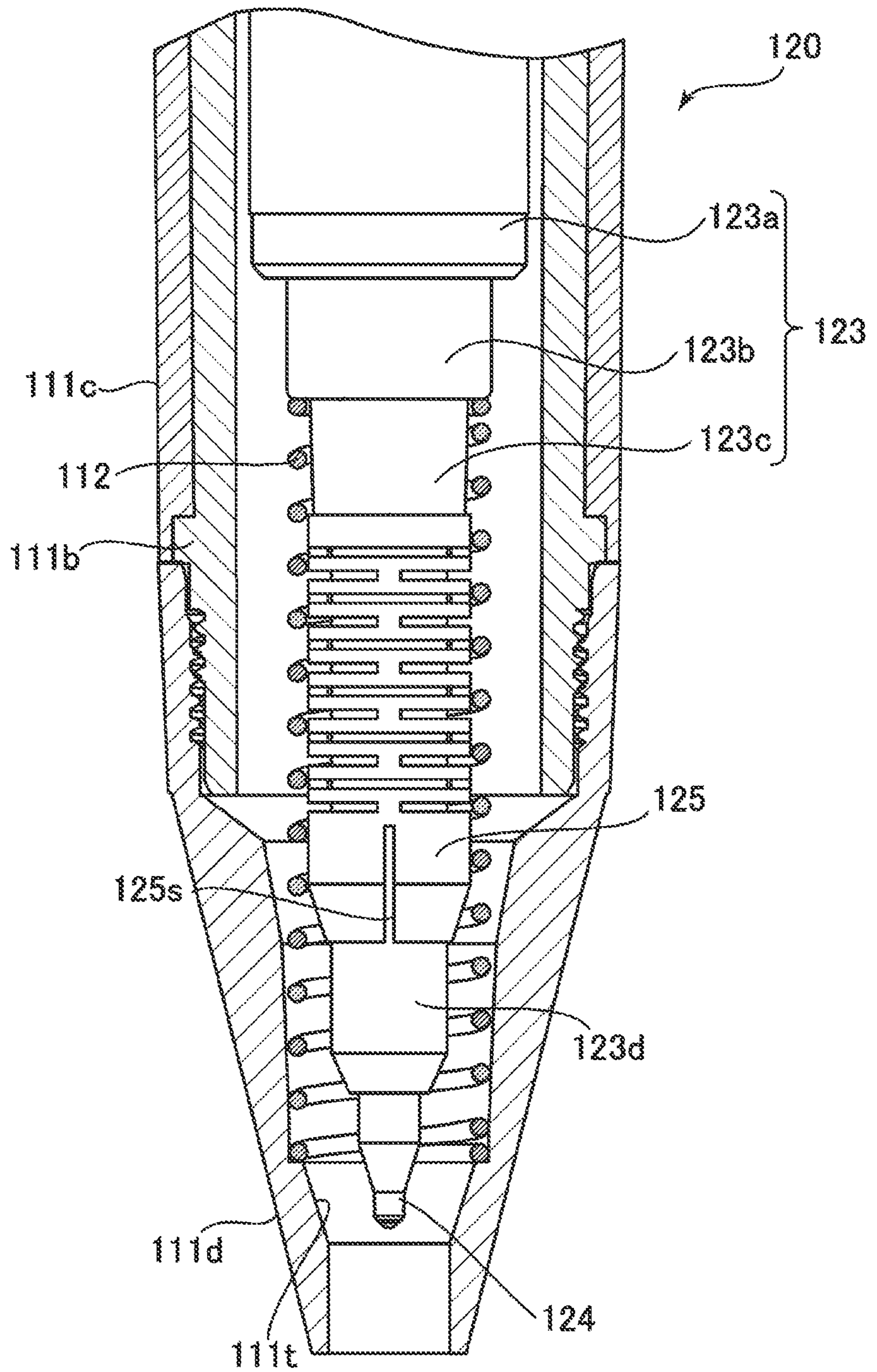
FIG. 16 is an enlarged longitudinal section view of a leading edge portion of the projectable and retractable writing tool according to the second type of Patent Document 4.
Figure 17:
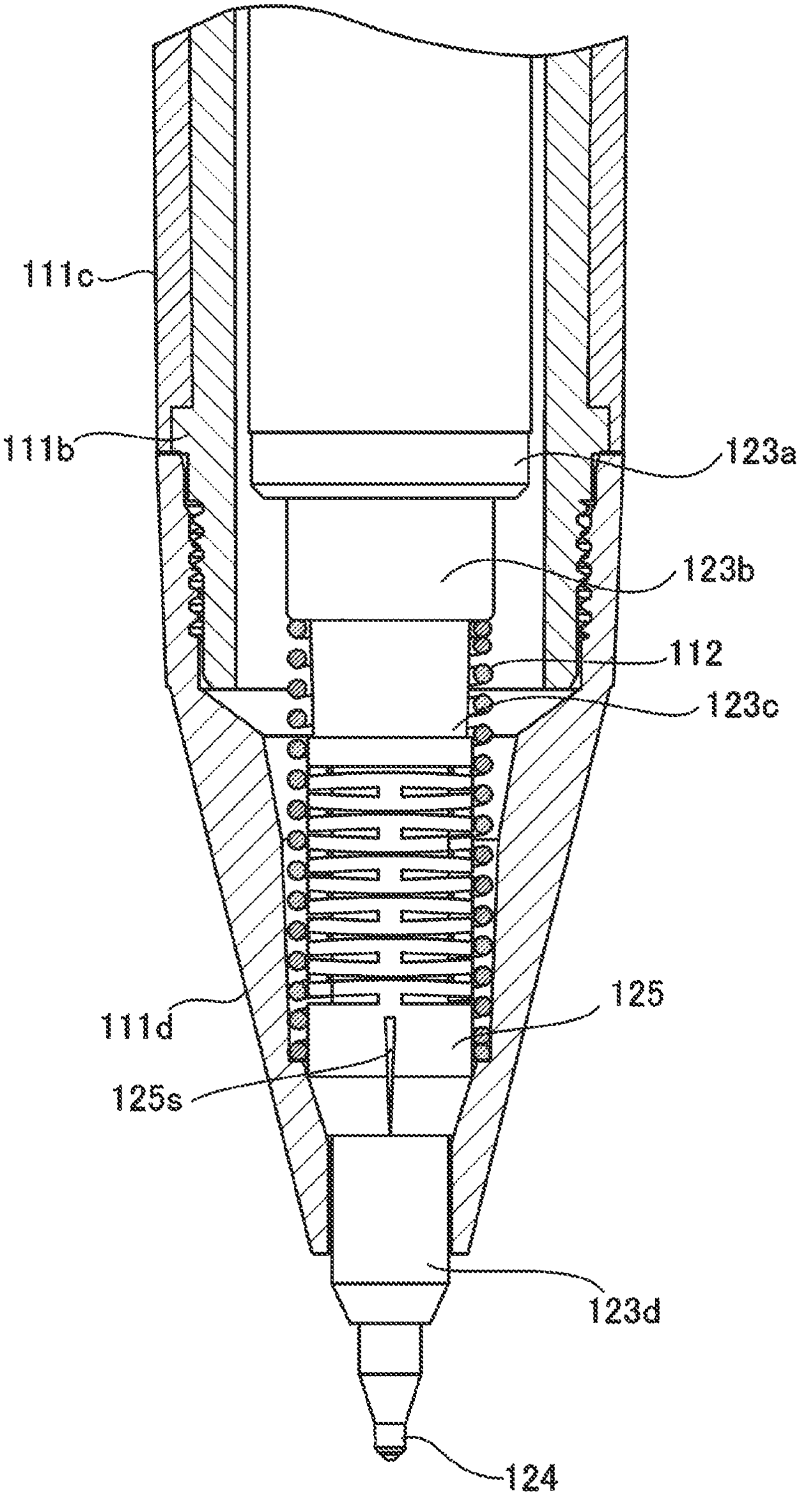
FIG. 17 is an enlarged longitudinal section view of the leading edge portion of the projectable and retractable writing tool according to the second type of Patent Document 4, under a state wherein the tip (writing element) has been projected.
Figure 18:
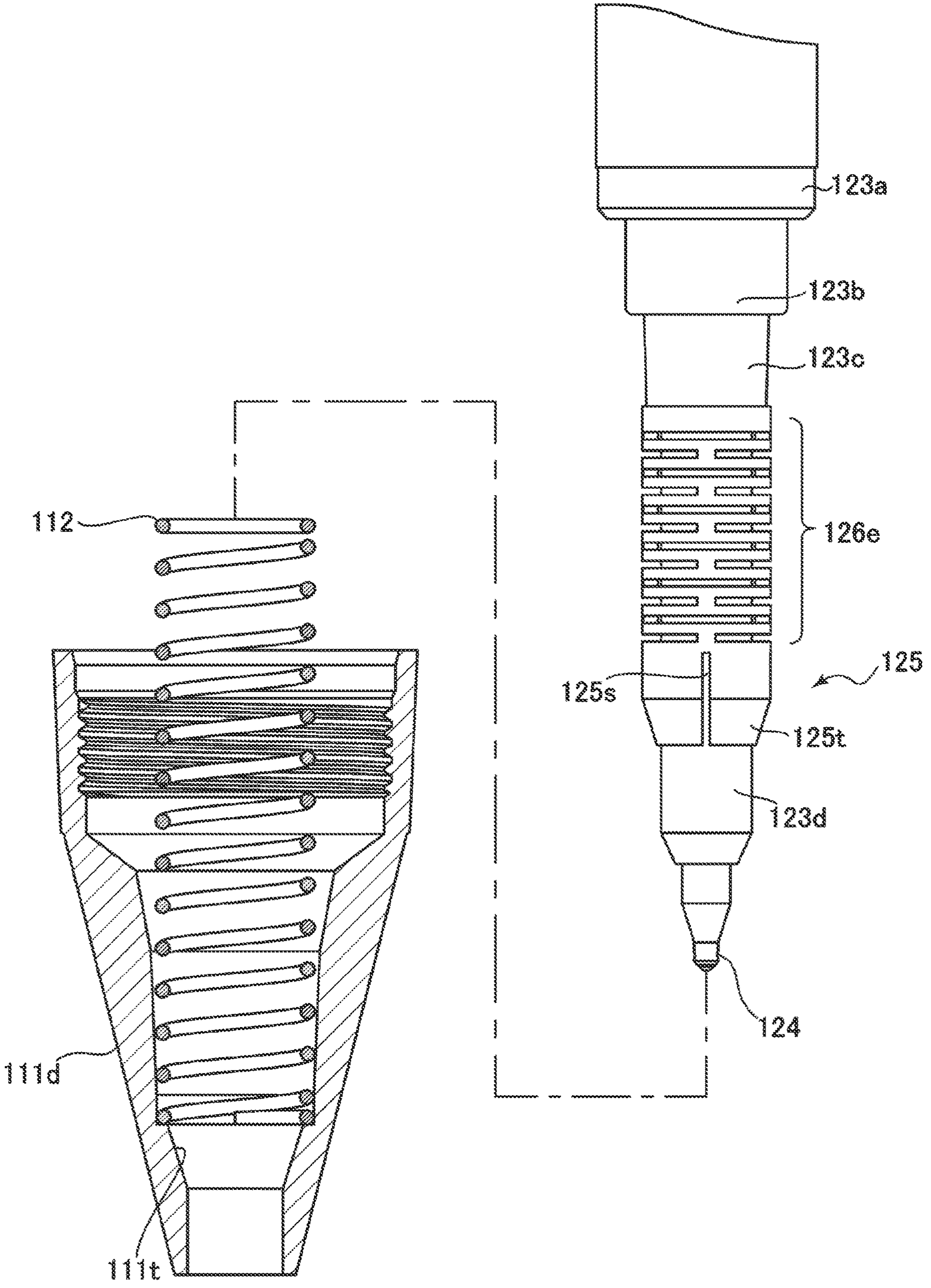
Figure 19:
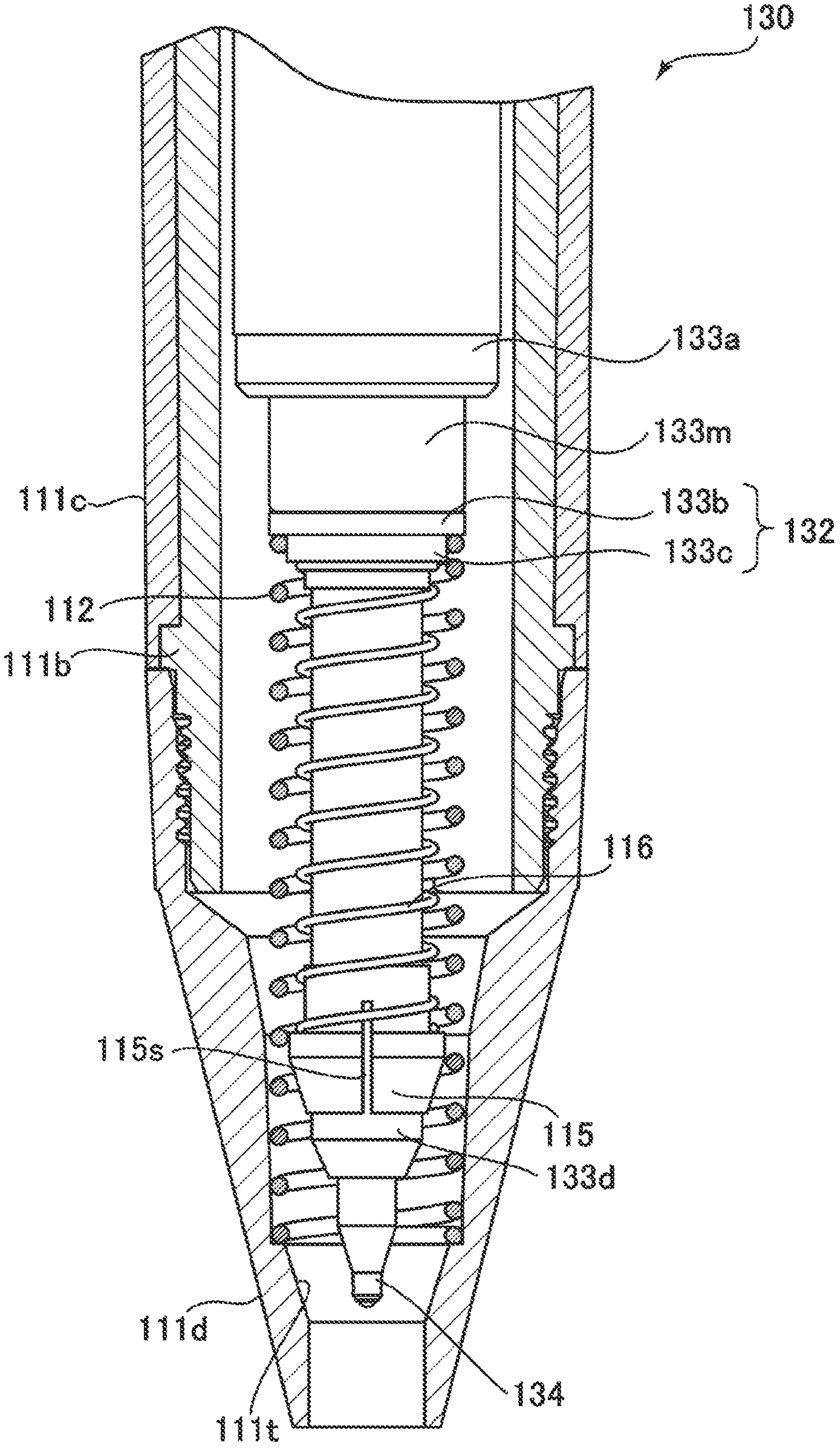
FIG. 19 is an enlarged longitudinal section view of a leading edge portion of the projectable and retractable writing tool according to the third type of Patent Document 4.
Figure 20:
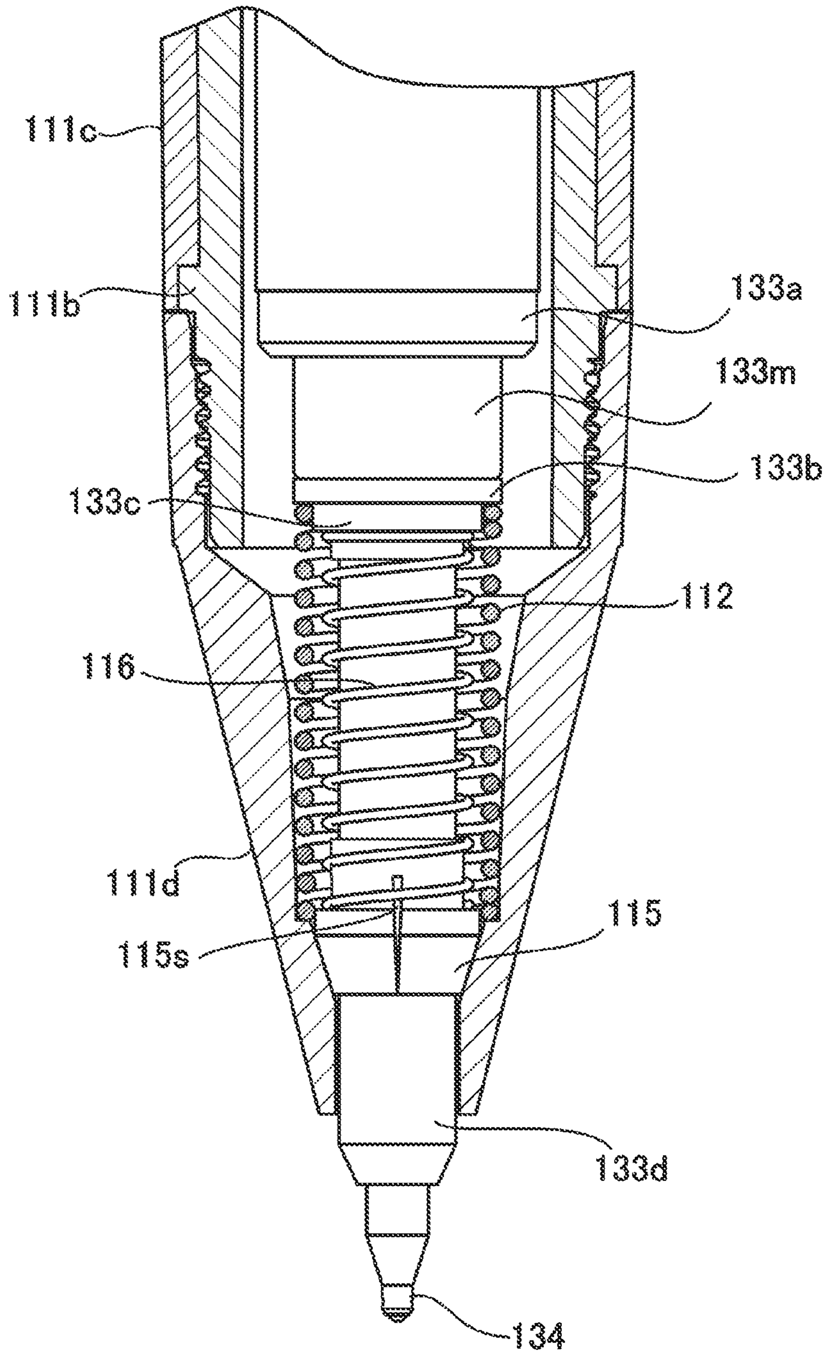
FIG. 20 is an enlarged longitudinal section view of the leading edge portion of the projectable and retractable writing tool according to the third type of Patent Document 4, under a state wherein the tip (writing element) has been projected.
Figure 21:
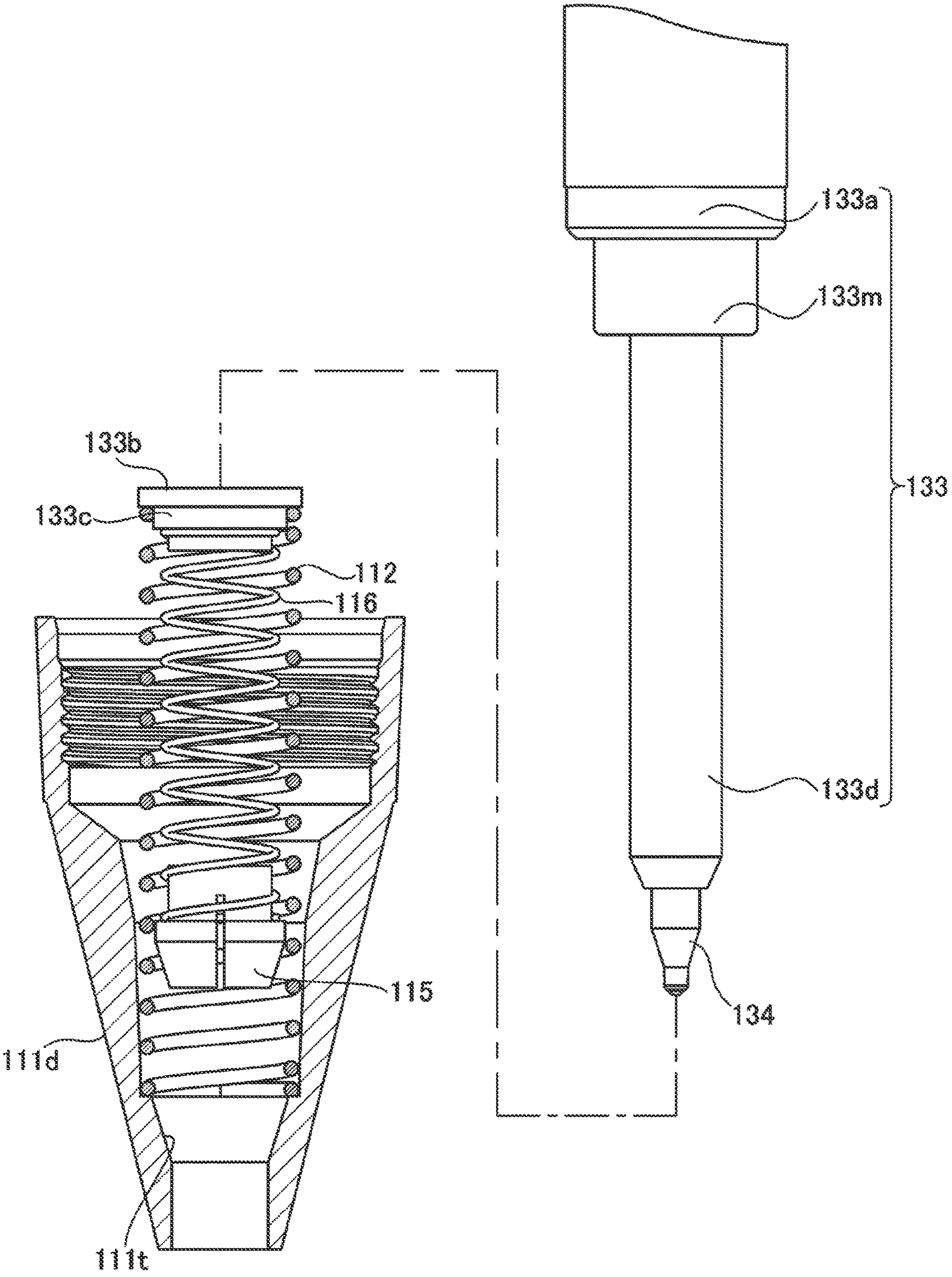
Figure 22:
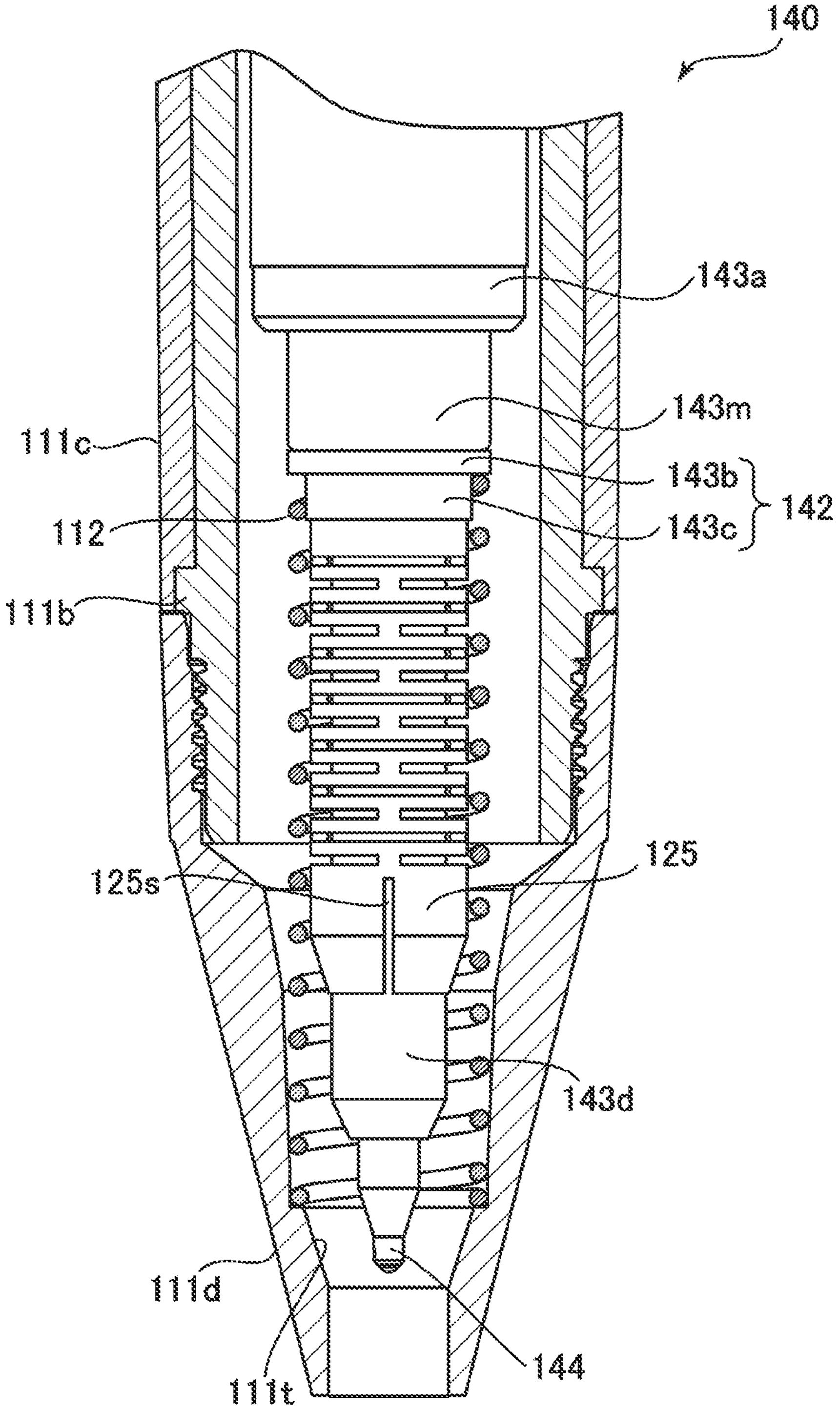
FIG. 22 is an enlarged longitudinal section view of a leading edge portion of the projectable and retractable writing tool according to the fourth type of Patent Document 4.
Figure 23:
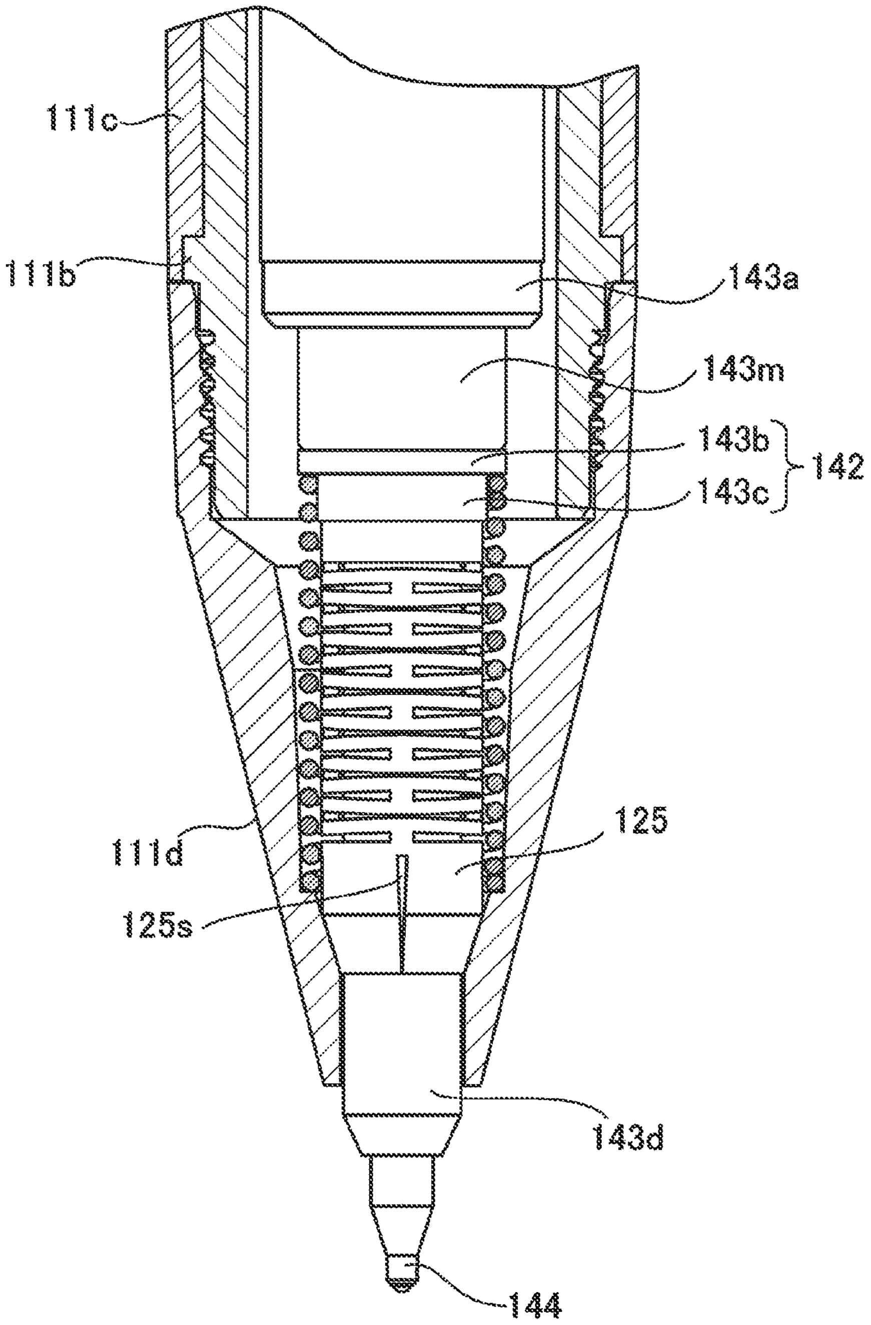
FIG. 23 is an enlarged longitudinal section view of the leading edge portion of the projectable and retractable writing tool according to the fourth type of Patent Document 4, under a state wherein the tip (writing element) has been projected.
Figure 24:
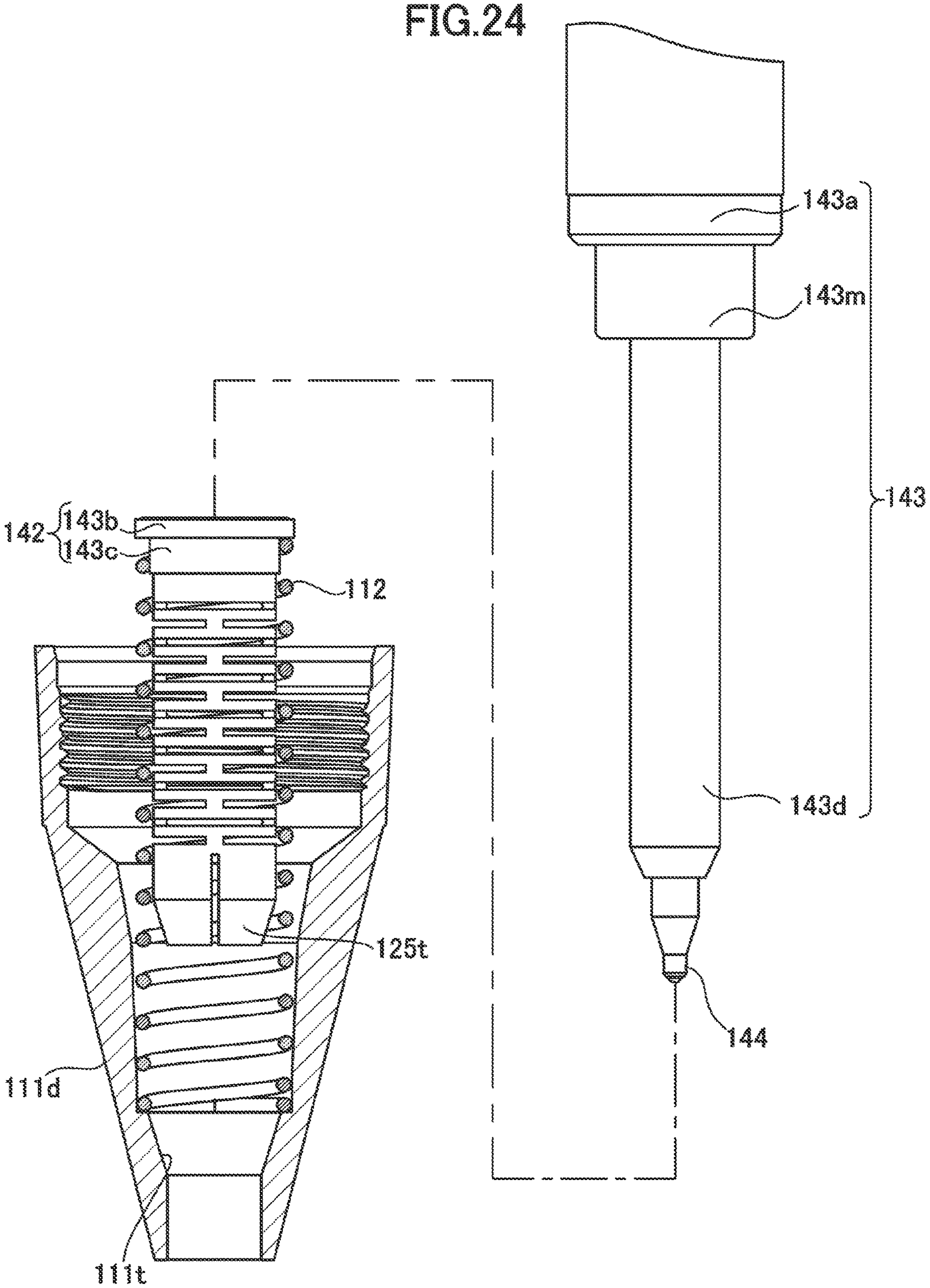

In addition, FIG. 10(*a*) is a perspective view of an annular member 25' of the projectable and retractable writing tool 20' shown in FIG. 9, FIG. 10(*b*) is a plan view of the annular member 25' shown in FIG. 10(*a*), FIG. 10(*c*) is a side view of the annular member 25' shown in FIG. 10(*a*), FIG. 10(*d*) is a bottom view of the annular member 25' shown in FIG. 10(*a*), FIG. 10(*e*) is a section view taken along line A-A of FIG. 10(*c*), FIG. 10(*f*) is a front view (a view seen from the leading edge side) of the annular member 25' shown in FIG. 10(*a*), and FIG. 10(*g*) is a rear view of the annular member 25' shown in FIG. 10(*a*).

As shown in FIGS. 9 and 10, the projectable and retractable writing tool 20' according to the third embodiment is slightly different from the projectable and retractable writing tool 20 according to the second embodiment in configuration of the annular member 25' and configuration of the inner periphery surface of the front portion 21*m*' of the shaft cylinder 21'.

Specifically, as shown in FIGS. 10(*a*) to 10(*g*), a length of the small outer diameter cylindrical surface 25*a*' of the annular member 25' in the axial direction is slightly shortened (Φ 3.6 mm, an axial length thereof being 1.3 mm), a flange portion 25*j* (Φ 4.4 mm, an axial length thereof being 0.8 mm) is provided more forward than the small outer diameter cylindrical surface 25*a*', and a length of the small inner diameter cylindrical surface 25*ia*' in the axial direction is slightly lengthened (Φ 2.6 mm, an axial length thereof being 2.38 mm).

In the present embodiment, the flange portion 25*j* is configured to function as a stopper element for defining a movement limit of the annular member 25' on a rear side thereof. Thus, no annular protrusion is provided on the inner periphery surface of the shaft cylinder 21'.

According to the projectable and retractable writing tool 20' of the third embodiment, substantially the same functions and effects are achieved as according to the projectable and retractable writing tool 20 of the second embodiment.

<Supplemental Explanation of Refill>

The projectable and retractable writing tool 10 of the first embodiment is a writing tool including: the shaft cylinder 11; a refill (writing body) contained in the shaft cylinder 11; and a projection and retraction mechanism that causes a tip 14 of the refill to project from and retract within the opening of the shaft cylinder 11.

Figure 25:
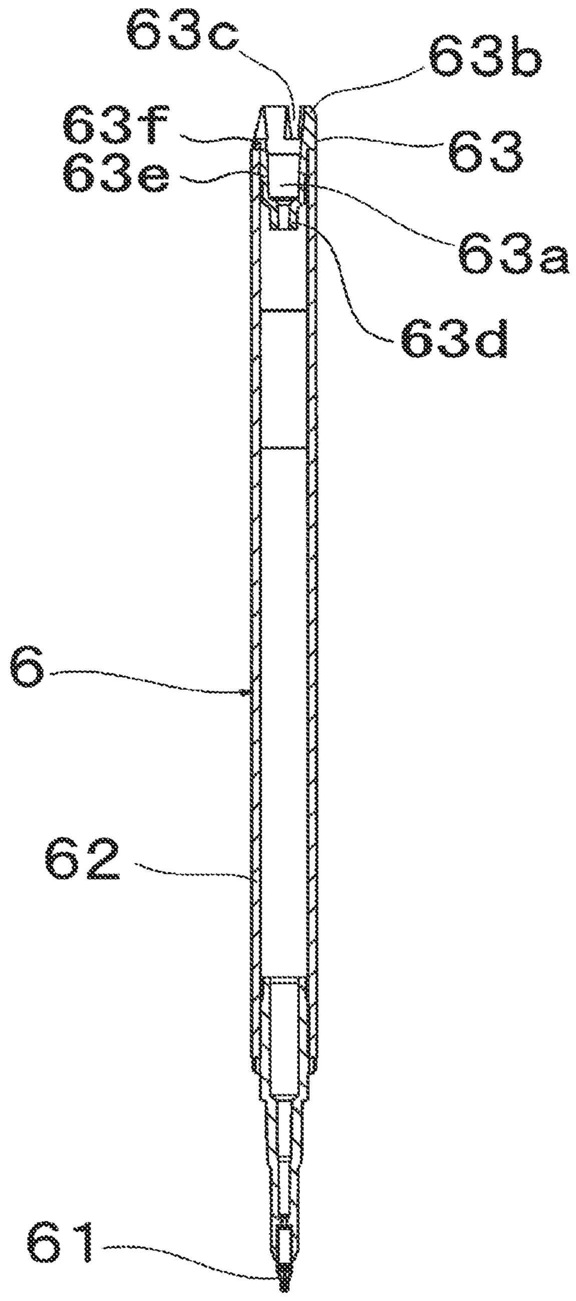
FIG. 25 is a longitudinal section view of a refill.
Figure 26:
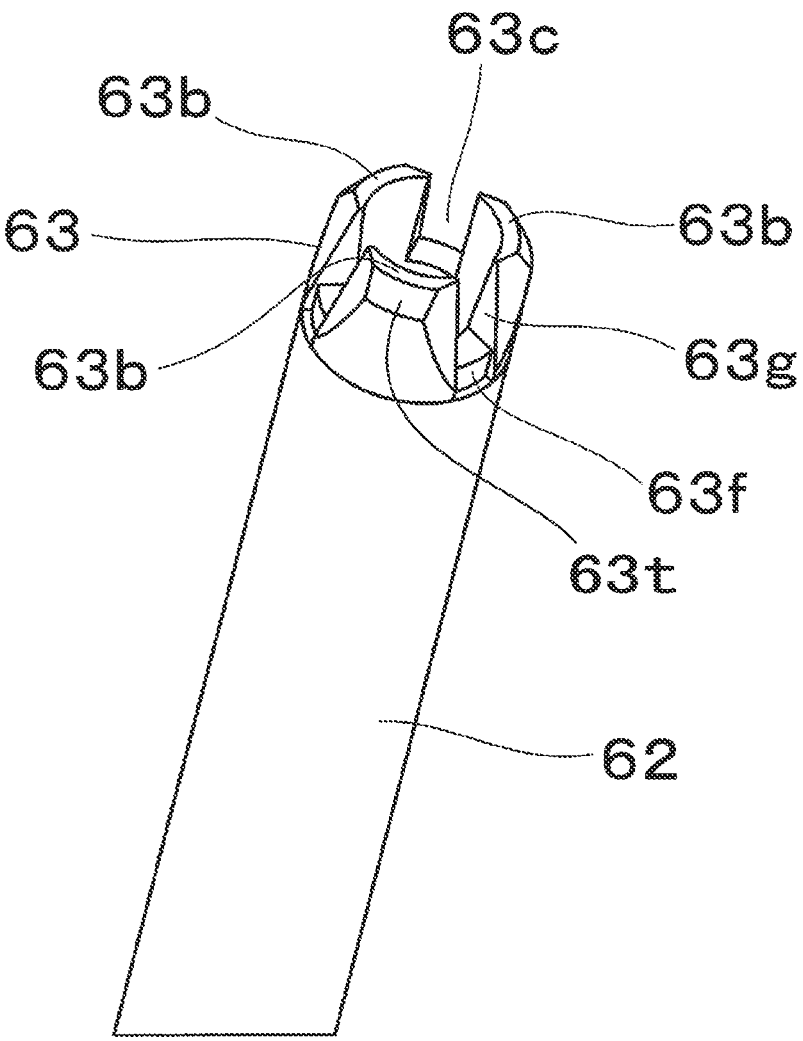
FIG. 26 is a perspective view of a rear end portion of the refill.
Figure 27:
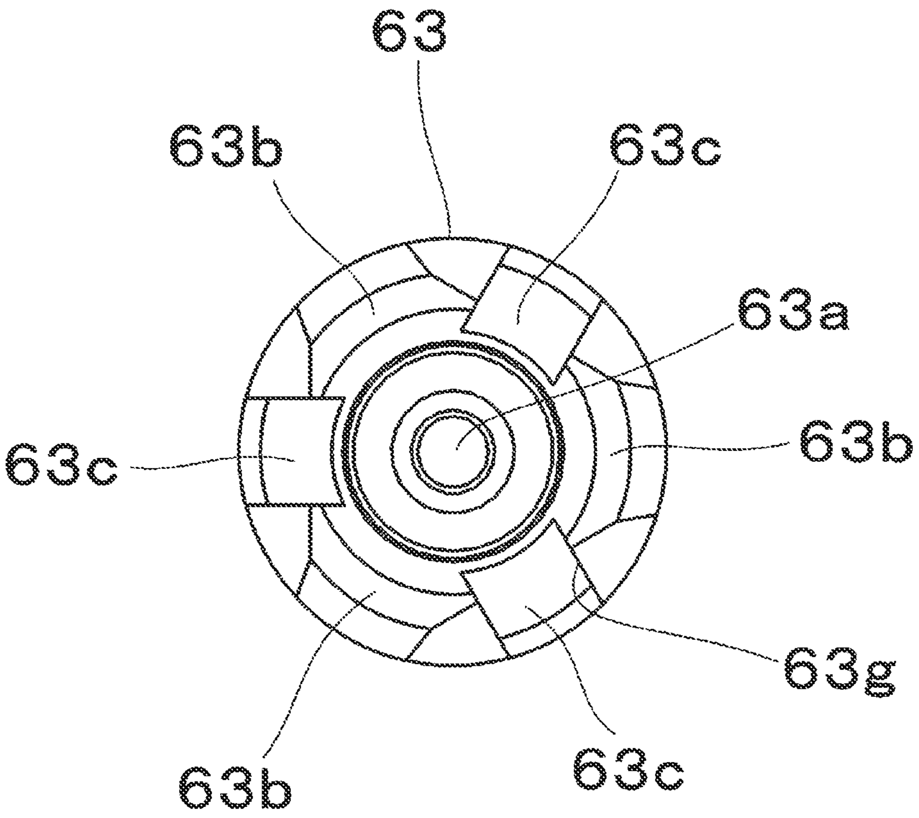
FIG. 27 is a plan view of the rear end portion of the refill.

An example of refill is supplementary explained with reference to FIGS. 25 to 27. With reference to FIG. 25, the refill 6 includes: a pen tip 61 (tip 14); an ink containing tube 62 having a front end opening into which the pen tip 61 is press-fitted; an thermochromic ink filled in the ink containing tube 62; a follower (for example, high viscosity fluid) filled adjacent to a rear end of the thermochromic ink in such a manner that the follower moves forward as the thermochromic ink is consumed; and a tail plug 63 attached to a rear end opening of the ink containing tube 62. The tail plug 63 is provided with an air hole 63*a* that opens toward a rear end thereof. The air hole 63*a* can communicate the inside of the ink containing tube 62 and the outside thereof.

For example, the pen tip 61 has a structure consisting of only a ball point pen tip made of metal, which holds a ball at a front end thereof in a rotatable manner, or a structure consisting of a combination of such a ball point pen tip and a pen tip holder made of a synthetic resin, which holds a rear outer surface of the ball point pen tip. A spring configured to press forward the ball at the front end is contained in an inside of the pen tip 61. For example, the spring has a structure wherein a rod part is provided at a front end of a compression coil spring and a front end of the rod part contacts with a rear surface of the ball. When the ball is not used for writing, the ball sealingly contacts with an inwardly-facing front-edge inner surface of a front end of the ball point pen tip. Thereby, ink leakage and ink evaporation from the front end of the pen tip 61 is prevented.

<Supplemental Explanation of Rear End Portion of Shaft Cylinder 11>

Figure 28:
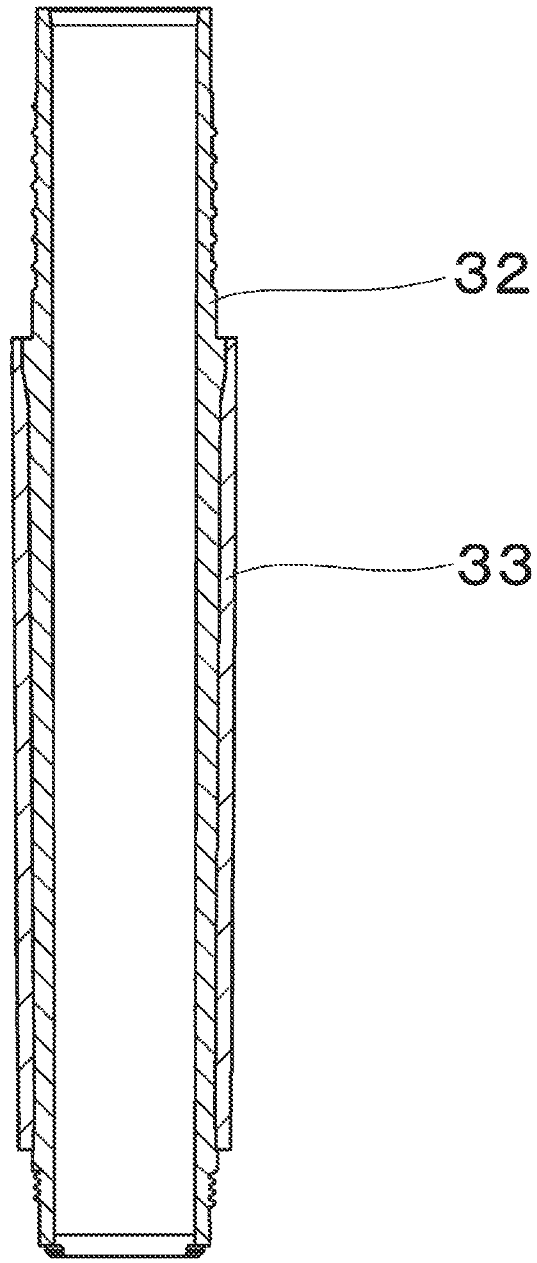
FIG. 28 is a longitudinal section view of a front shaft of a shaft cylinder by way of example.
Figure 29:
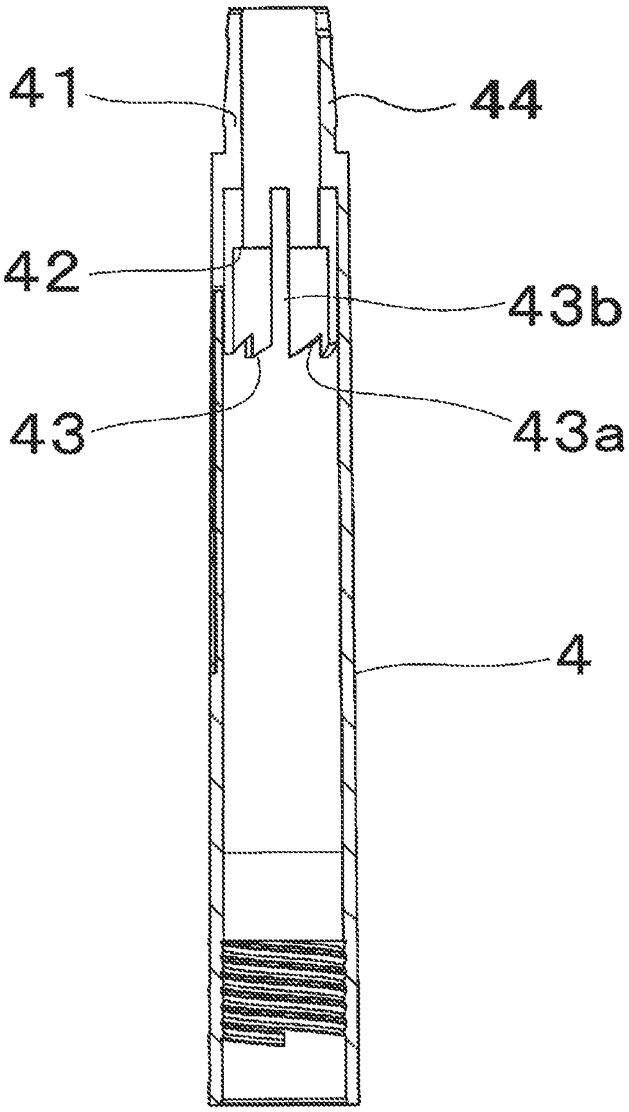
FIG. 29 is a longitudinal section view of an intermediate shaft of the shaft cylinder by way of example.
Figure 30:
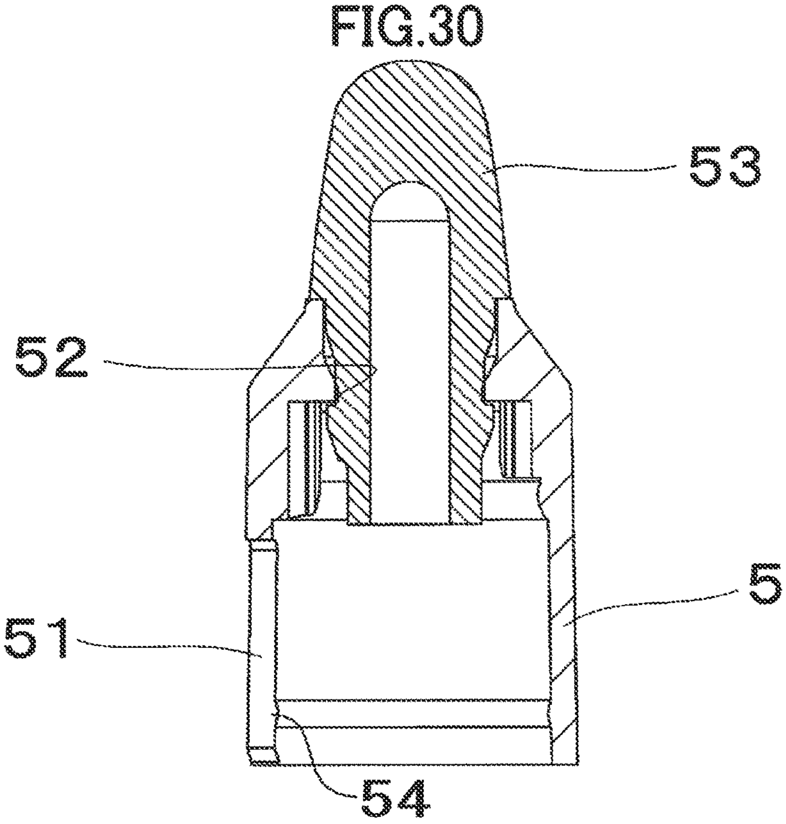
FIG. 30 is a longitudinal section view of a rear shaft of the shaft cylinder by way of example.

For example, the shaft cylinder 11 of the present embodiment consists of: a front shaft 3 having a tapered cylindrical shape (see FIG. 28); an intermediate shaft 4 connected to a rear end portion of the front shaft 3 and having a cylindrical shape (see FIG. 29); and a rear shaft 5 connected to a rear end portion of the intermediate shaft 4 and having a cylindrical shape (see FIG. 30).

For example, as shown in FIG. 30, an attachment hole 52 may be formed through a rear end portion of the rear shaft 5 in a front and rear direction, and a friction part 53 made of an elastic material may be press-fitted into the attachment hole 52. Thereby, the friction part 53 may be fixed to an outer surface of the rear end portion of the rear shaft 5. In addition, an inward protrusion 54 may be integrally formed on an inner surface of the rear shaft 5.

The elastic material for forming the friction part 53 is preferably an elastic synthetic resin (rubber, elastomer), for example, a silicone resin, an SBS resin (styrene-butadiene-styrene copolymer), a SEBS resin (styrene-ethylene-butylene-styrene copolymer), a fluorine-based resin, a chloroprene resin, a nitrile resin, a polyester resin, an ethylene propylene diene rubber (EPDM), or a mixture of two or more rubber elastic materials, or a mixture of a rubber elastic material and a synthetic resin, or the like.

Preferably, the elastic synthetic resin constituting the friction part 53 is not an easy-to-wear elastic material (for example, an eraser or the like), but a hard-to-wear elastic material which generates almost no wear debris (for example, eraser shavings) when friction occurs. In addition, the friction part 53 may be provided on an outer surface at a rear end portion of the shaft cylinder 11 in various manners. For example, the friction part 53 made of an elastic material may be provided on the outer surface of the rear end portion of the shaft cylinder 11 or on the outer surface of the rear end portion of the rear shaft 5, by a press-fitting, an engagement, a threadedly engagement, a fitting, an adhesion, a two-color molding, or the like. Furthermore, the entire shaft cylinder 11 or the entire rear shaft 5 may be integrally made of an elastic material.

<Supplemental Explanation of Knock Member 8>

Figure 31:
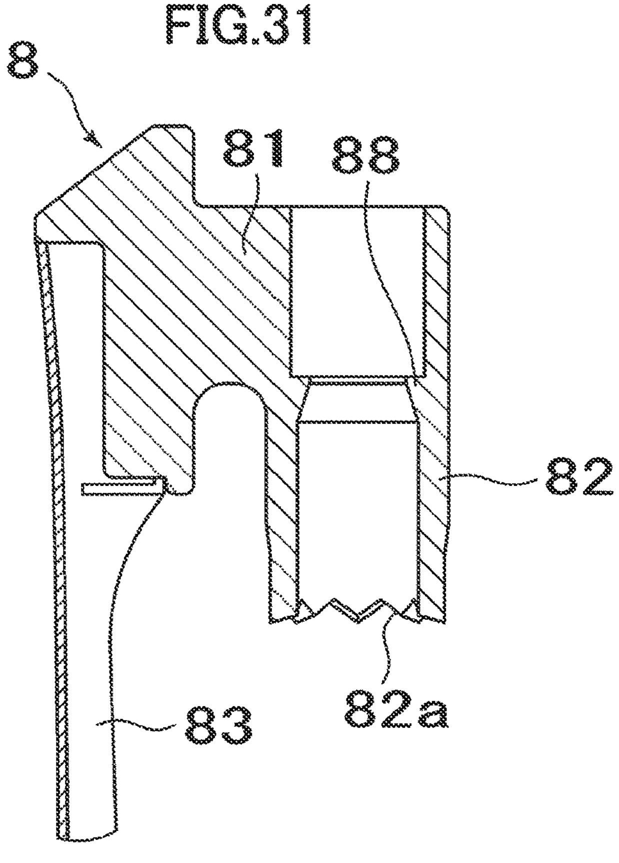
FIG. 31 is a longitudinal section view of a knock member.
Figure 32:
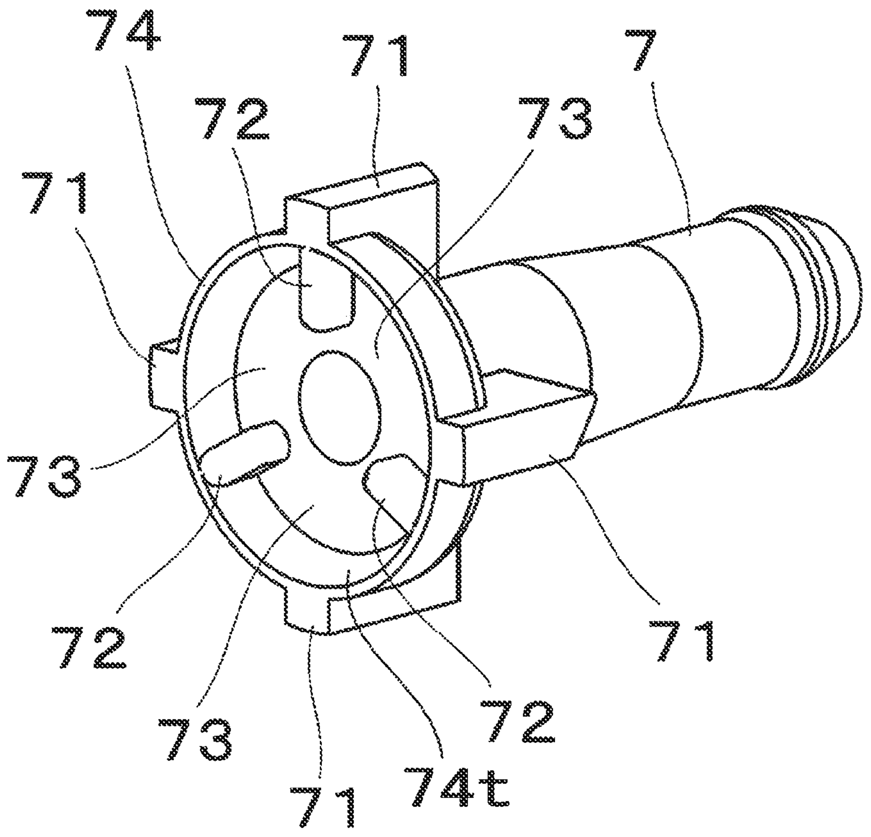
FIG. 32 is a perspective view of a projection and retraction rotating member.
Figure 33:
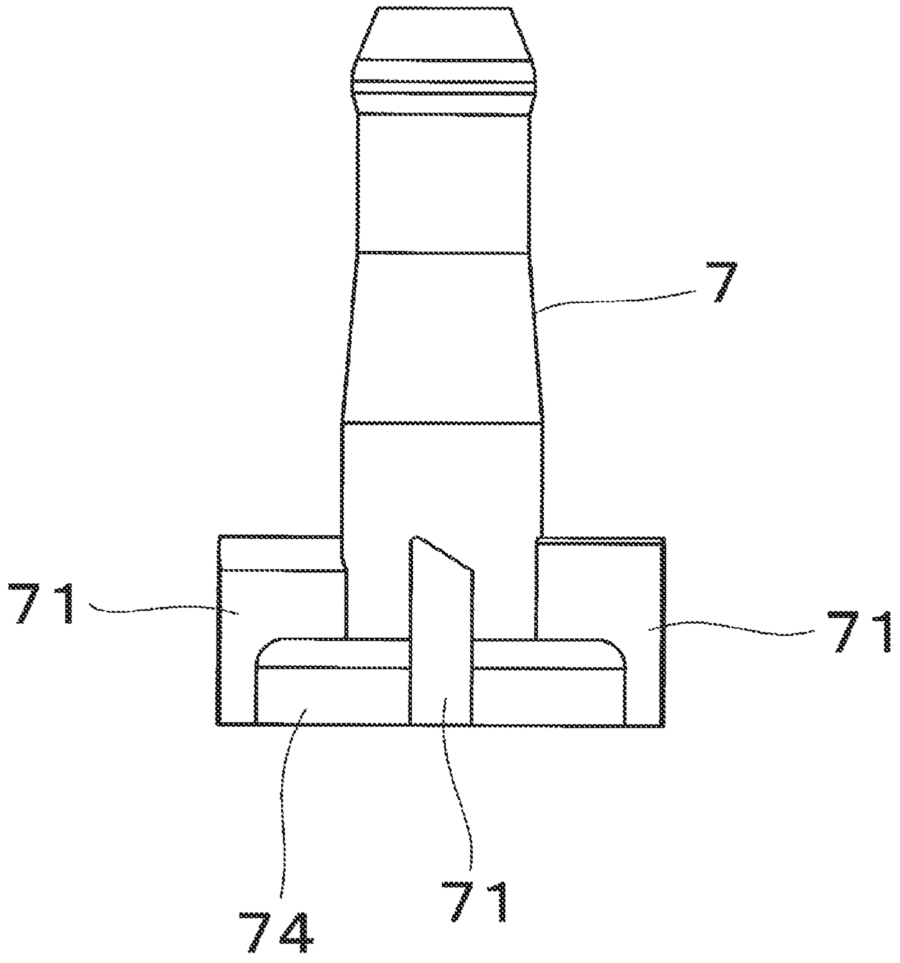
FIG. 33 is a front view of the projection and retraction rotating member.
Figure 34:
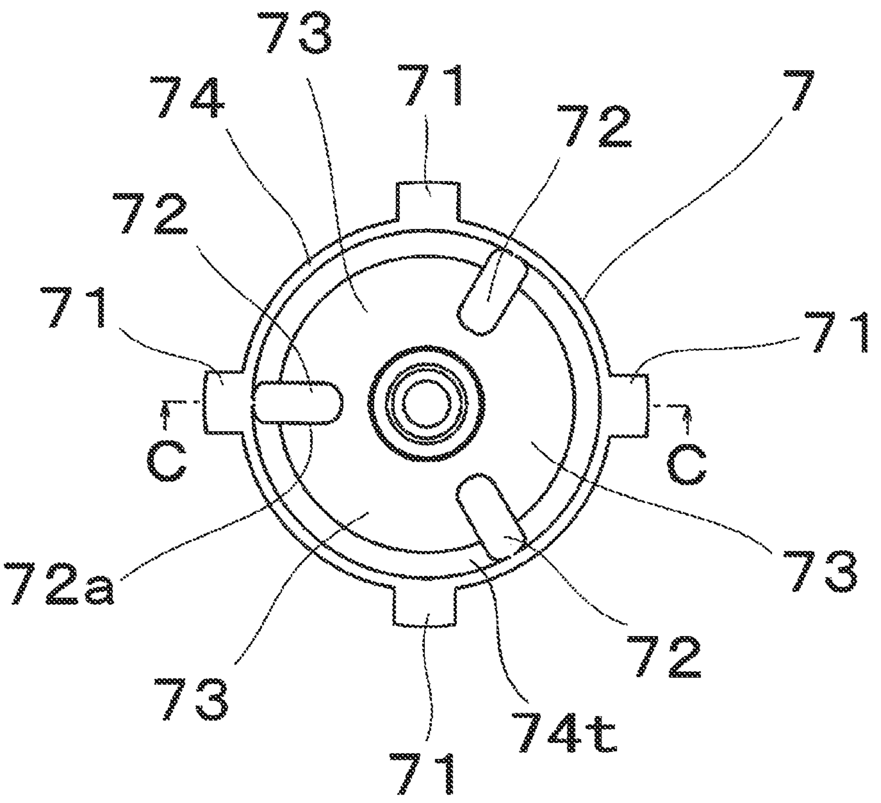
FIG. 34 is a bottom view of the projection and retraction rotating member.
Figure 35:
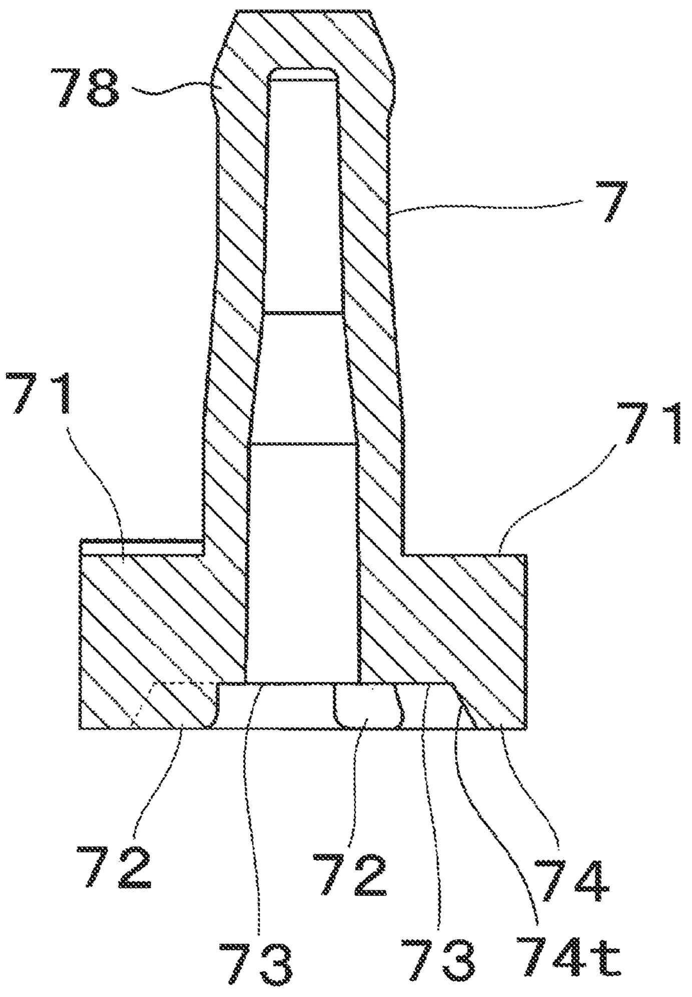
FIG. 35 is a section view taken along line C-C of FIG. 32.

With reference to FIG. 31, a clip 83 extending in a front and rear direction may be fixed to the knock member 8. A ball part may be projected from a back surface of the clip 83. For example, the knock member 8 consists of: a base part 81 fixed to a rear end portion of the clip 83; and a cylindrical shaft part 82 integrally connected to the base part 81 and extending forward form the base part 81.

For example, the knock member 8 is obtained by a molded body made of a synthetic resin (for example, a polycarbonate resin). For example, the clip 83 is obtained from a molded body made of a synthetic resin (for example, a polycarbonate resin) or a metallic material (for example, stainless steel). The knock member 8 and the clip 83 may be integrally made of a synthetic resin.

As shown in FIG. 31, a plurality of cam teeth 82*a* configured to engage with rear ends of ridges 71 of a projection and retraction rotating member 7 (see FIGS. 32 to 35) may be integrally formed at a front end of the shaft part 82.

Regarding how to assemble the knock member 8, the base part 81 of the knock member 8 is inserted into the first elongated hole 41 of the intermediate shaft 4 from the rear end (opened part) of the first elongated hole 41 while the shaft part 82 of the knock member 8 is inserted into the intermediate shaft 4. Subsequently, In order that the first elongated hole 41 of the intermediate shaft 4 and the second elongated hole 51 of the rear shaft 5 are radially communicated with each other (radially overlapped), while the inner surface of the rear shaft 5 is fitted onto the outer surface of the reduced diameter part of the intermediate shaft 4, the base part 81 of the knock member 8 is inserted into the second elongated hole 51 of the rear shaft 5 from the front end (opened part) of the second elongated hole 51. Thereby, the intermediate shaft 4 and the rear shaft 5 are connected (the outward protrusion 44 of the intermediate shaft 4 and the inward protrusion 54 of the rear shaft 5 are engaged after riding over each other), and the slide hole extending in the front and rear direction is formed by the first elongated hole 41 and the second elongated hole 51, and the knock member 8 is in a state of projecting radially outward from the slide hole. The knock member 8 is slidable in the front and rear direction along the slide hole.

The rear shaft 5, whose rear end is fixed to the friction part 53, is connected to the rear end portion of the intermediate shaft 4, so that the friction part 53 is always fixed to the rear end of the shaft cylinder 11. In addition, the front shaft 3 and the intermediate shaft 4 are detachably threadedly engaged with each other, so that the refill 6 is replaceable at any time.

<Supplemental Explanation of Projection and Retraction Mechanism>

The projection and retraction mechanism of the present embodiment is a side-slide type projection and retraction mechanism using a rotating cam mechanism, which includes: the knock member 8 as described above; the projection and retraction rotating member 7 configured to move in the front and rear direction to cause the pen tip 61 to project from or retract within the opening of the shaft cylinder 11 and configured to cause the refill 6 (and thus pen tip 61) to rotate, every time the knock member 8 is moved forward; the cam part 43 as described above which is provided in the shaft cylinder 11 and is able to engage or disengage with the projection and retraction rotating member 7 depending on a position of the knock member 8; and a knock spring 12 (for example, a compression coil spring) provided in the shaft cylinder 11 and configured to bias the refill 6 rearward.

The projection and retraction mechanism of the present embodiment is a double-knock type projection and retraction mechanism in which the knock member 8 is operated (pressed) to move (slide) forward both for a pen tip projection operation and for a pet tip retraction operation.

<Supplemental Explanation of Thermochromic Ink>

In the present embodiment, it is preferable that the thermochromic Ink is a reversible thermochromic ink. As the reversible thermochromic ink, there are various types, which includes: a heat-decoloring type that decolorizes by heating from a color-developing state; a color-memory holding type that alternately holds a color-developing state or a decoloring state in a specific temperature range; or a heat-coloring type that colorizes (color-develops) by heating from a decoloring state and returns to the decoloring state by cooling from the color-developing state. These types may be used individually or in combination.

As a coloring material contained in the reversible thermochromic ink, for example, a reversible thermochromic pigment is preferably used, in which a reversible thermochromic composition is encapsulated in a microcapsule, the reversible thermochromic composition including at least the following three essential components: (a) an electron-donating color-developing organic compound; (b) an electron-accepting compound; and (c) a reaction medium that determines an occurrence temperature of a reaction (color reaction) in which the above two components are chemically linked.

<Supplemental Explanation of Rotation of Refill 6>

As described above, according to the present embodiment, every time the knock member 8 is moved forward, the refill 6 (and thus the pen tip 61) is rotated while the pen tip 61 is moved in the front and rear direction to project or retract through the opening of the shaft cylinder 11. Such a writing tool, whose pen tip 61 is rotated, is popular in the market because wear of the pen tip 61 can be equalized.

Figure 36:
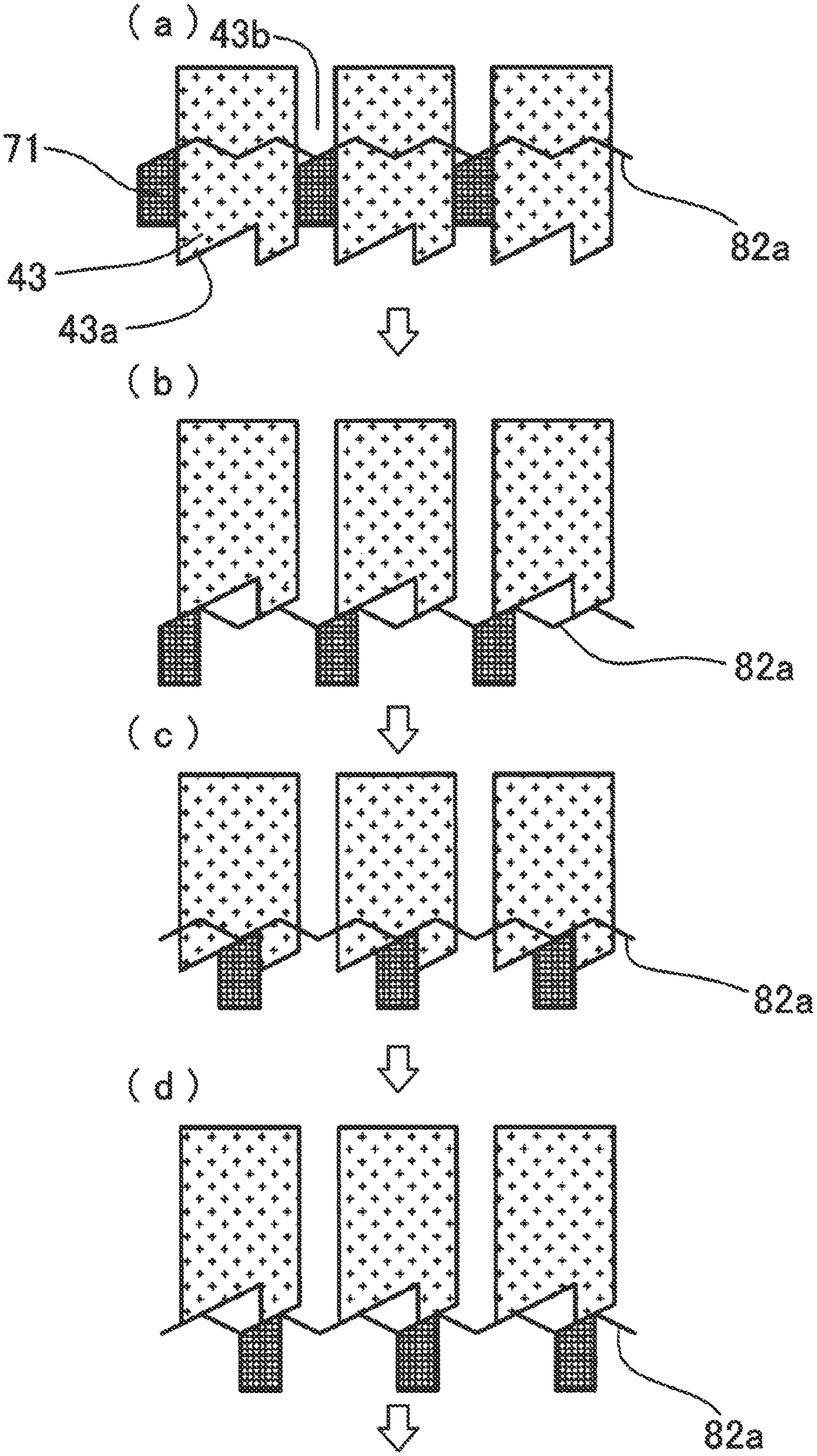
FIG. 36 is a schematic view for explaining a principle of a rotating cam mechanism.

FIG. 36 is a schematic view for explaining a principle of the rotating cam mechanism. With reference to FIG. 36, from a pen tip retraction state (see FIG. 36(*a*)), when the knock member 8 is operated (pressed) to move (slide) forward against a rearward biasing force of a spring body (not shown), the ridges 71 of the projection and retraction rotating member 7, which have been engaged with the cam teeth 82*a* at the front end of the shaft part 82 of the knock member 8, are pressed forward by the cam teeth 82*a*. The ridges 71 of the projection and retraction rotating member 7 are moved forward along the cam grooves 43*b*.

When the ridges 71 of the projection and retraction rotating member 7 are moved forward, the projection and retraction rotating member 7 presses the refill 6 forward according to abutment relationship between the abutment parts 73 and the projection pieces 63*b* of the tail plug 63. Then, the pen tip 61 is projected outward from the opening of the shaft cylinder 11.

At the deepest position of the knocking operation of the knock member 8, the rear ends of the ridges 71 get out of the cam grooves 43*b*, and move (fall) into the bottoms of the cam teeth 82*a* of the knock member 8. Thereby, the projection and retraction rotating member 7 slightly rotates circumferentially (see FIG. 36(*b*)).

Subsequently, when the knock member 8 is returned to an original position thereof by the rearward biasing force of the spring body, the rear ends of the ridges 71 move (fall) into bottoms of the cam teeth 43*a* of the cam part 43. Thereby, the projection and retraction rotating member 7 further rotates circumferentially (see FIG. 36(*c*)). In addition, the rear ends of the ridges 71 stay in the bottoms of the cam teeth 43*a* of the cam part 43, so that a pen tip projection state is maintained.

Next, from the pen tip projection state (see FIG. 36(*c*)), when the knock member 8 is operated (pressed) to move (slide) forward, the ridges 71 of the projection and retraction rotating member 7 are again engaged with the cam teeth 82*a* at the front end of the shaft part 82 of the knock member 8, and are pressed forward by the cam teeth 82*a*.

At the deepest position of the knocking operation of the knock member 8, the rear ends of the ridges 71 ride over tops (teeth) of the cam teeth 43*a* of the cam part 43, and move (fall) into the bottoms of the cam teeth 82*a* of the knock member 8. Thereby, the projection and retraction rotating member 7 slightly rotates circumferentially (see FIG. 36(*d*)). Subsequently, when the knock member 8 is returned to the original position thereof by the rearward biasing force of the spring body, the ridges 71 are guided into the cam grooves 43*a*, so that the pen tip retraction state is maintained (see FIG. 36(*a*)).

Figure 37:
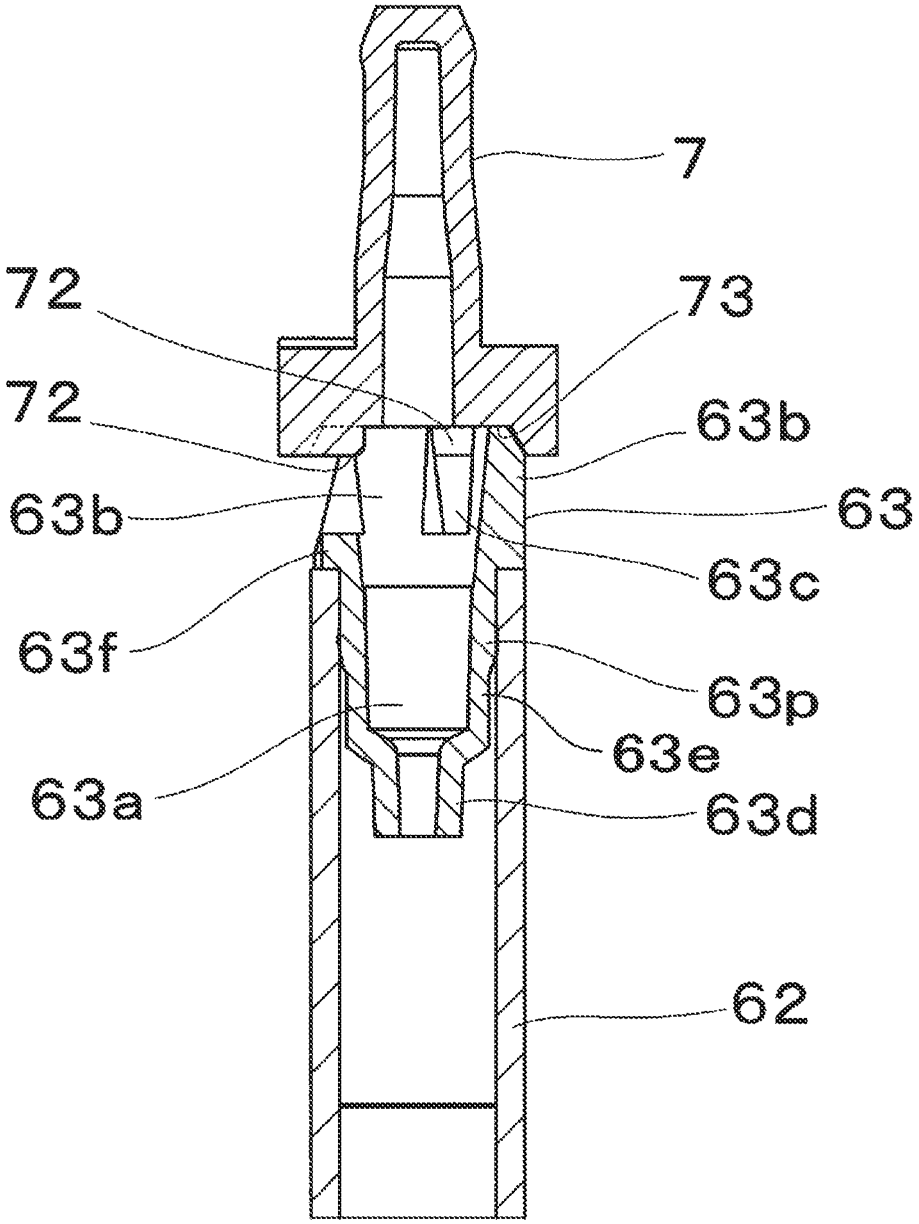
FIG. 37 is a longitudinal section view showing an abutment state between the projection and retraction rotating member and the rear end of the refill.
Figure 38:
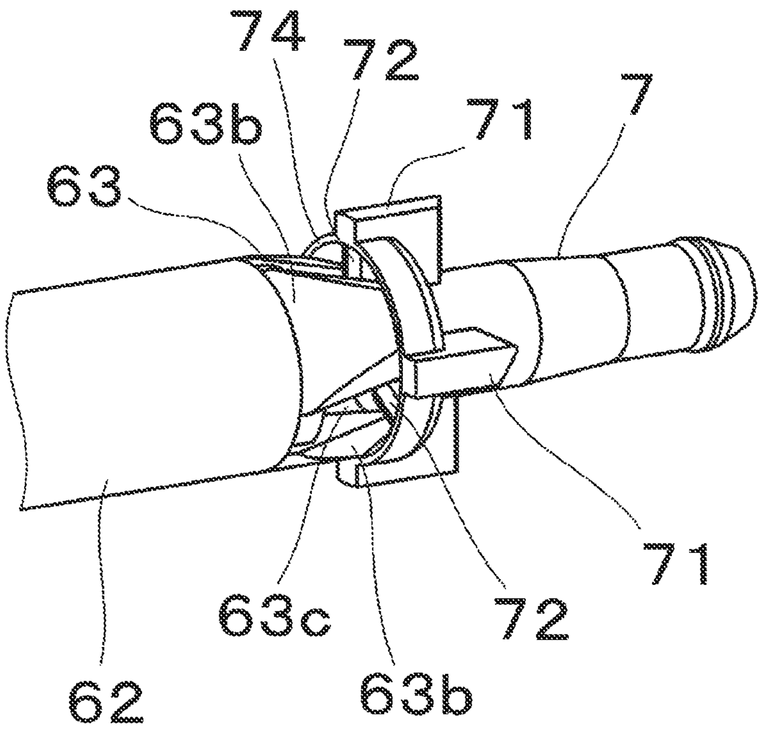
FIG. 38 is a perspective view showing the abutment state between the projection and retraction rotating member and the rear end of the refill.

The abutment state between the projection pieces 63*b* of the tail plug 63 and the abutment parts 73 of the projection and retraction rotating member 7 is shown in FIGS. 37 and 38.

The abutment parts 73 on the front surface of the projection and retraction rotating member 7 abut on the projection pieces 63*b* of the tail plug 63 at the rear end of the refill 6, while the plurality of protrusion parts 72 on the front surface of the projection and retraction rotating member 7 are inserted into the plurality of gaps 63*c* between the projection pieces 63*b* of the tail plug 63 at the rear end of the refill 6 so that the protrusion parts 72 are circumferentially engaged with the projection pieces 63*b*. Thereby, when the projection and retraction rotating member 7 rotates circumferentially, the refill 6 also rotates circumferentially.

As described above, according to the present embodiment, the abutment parts 73 on the front surface of the projection and retraction rotating member 7 are configured to cause the tail plug 63 at the rear end of the refill 6 to rotate. However, any other way of transferring a rotational force from the projection and retraction rotating member 7 to another portion of the refill 6 may be adopted. For example, a plurality of projection pieces may be integrally formed on the rear end of the refill 6 without being provided with the tail plug 63.

<Supplemental Explanation of Rotation of Annular Member 15, 25, 25'>

When the refill 6 is rotated with respect to the shaft cylinder 11, 21 by a pressing operation of the knock member 8, the annular member 15, 25, 25' connected to the refill 6 via the coil spring 16, 26 is also rotated with respect to the shaft cylinder 11, 21.

Herein, the front end of the coil spring 16, 26 is fixed to the annular member 15, 25, 25. Thus, the front end of the coil spring 16, 26 does not slide on the inside surface of the annular member 15, 25, 25' so that there is no fear of the front end of the coil spring 16, 26 damaging the annular member 15, 25, 25'. In addition, when the annular member 15, 25, 25' connected to the refill 6 via the coil spring 16, 26 is rotated with respect to the shaft cylinder 11, 21, the refill 6 and the coil spring 16, 26 are integrally rotated. Thus, the rear end of the coil spring 16, 26 does not slide on the tip holder 13, 23 so that there is no fear of the rear end of the coil spring 16, 26 damaging the tip holder 13, 23. In addition, since the refill 6, the annular member 15, 25, 25' and the coil spring 16, 26 are integrally rotated, there is no fear of obstruction against a smooth rotation of the refill 6 (and thus the pressing operation of the knock member 8). Furthermore, the rotation of the annular member 15, 25, 25' can be visually recognized, thereby the user can be offered a visual fun.

<Rotational Direction of Refill 6 and Winding Direction of Coil Spring 16, 26'>

According to the above explained embodiments, the rotational direction of the refill 6 is clockwise as seen from the rear end side. On the other hand, the winding direction of the coil spring 16, 26 is anticlockwise (that is to say, the coil spring 16, 26 has a left-handed helix (extends anticlockwise from a volute tongue: see FIG. 2)).

However, if the rotational direction of the refill 6 and the winding direction of the coil spring 16, 26 are the same, when the refill 6 is rotated, he tip holder 13, 23 (a coil spring abutment portion thereof) can push the rear end of the coil spring 16, 26, so that the connection between the tip holder 13, 23 and the coil spring 16, 26 may be strengthened (for example, it might be as if they got engaged with each other), which may advantageously facilitate to transfer a rotational force of the refill 6 to the annular member 15, 25, 25'.

Figure 39:
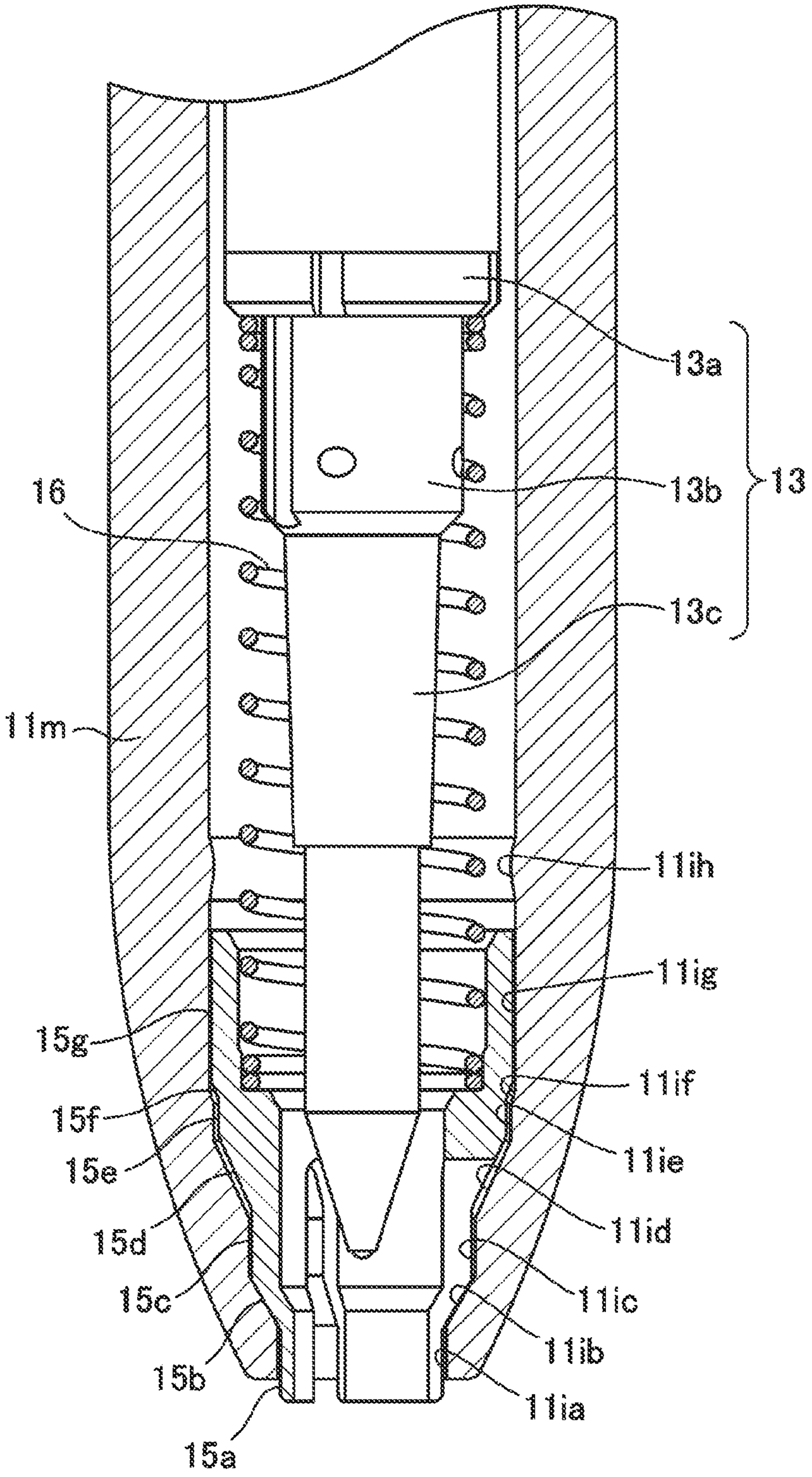
FIG. 39 is a view corresponding to FIG. 2, but wherein the coil spring is wound in the opposite direction.

FIG. 39 is a view corresponding to FIG. 2, but wherein the winding direction of the coil spring 16 is opposite from that in FIG. 2.

It is also preferable that the coil spring abutment portion of the tip holder 13, 23 is provided with a concave and/or convex portion or the like which may strengthen its connection with the rear end of the coil spring 16, 26.

<Round Chamber of Inner Periphery Surface of Annular Member 15, 25, 25'>

As explained with reference to FIG. 3(*e*), the inner periphery surface of the annular member 15 includes: the small inner diameter cylindrical surface 15*ia*; the first frustoconical inner surface 15*ib*; the medium inner diameter cylindrical surface 15*ic*; the second frustoconical inner surface 15*id*; the square cylinder surface 15*ie*; the large inner diameter cylindrical surface 15*if*; and the third frustoconical outer surface 15*ig*; in this order from the front side thereof. Herein, a round chamfer may be provided at a transition area (boundary) between the small inner diameter cylindrical surface 15*ia* and the first frustoconical inner surface 15*ib*. In this case, when the tip 14 is inserted into the small inner diameter cylindrical surface 15*ia*, there is less fear of being caught by the boundary, so that the insertion can be achieved more smoothly.

Similarly, as explained with reference to FIG. 8(*e*), the inner periphery surface of the annular member 25 includes: the small inner diameter cylindrical surface 25*ia*; the first frustoconical inner surface 25*ib*; and the large inner diameter cylindrical surface 25*ic*; in this order from the front side thereof. Herein, a round chamfer may be provided at a transition area (boundary) between the small inner diameter cylindrical surface 25*ia* and the first frustoconical inner surface 25*ib*. In this case, when the tip 24 is inserted into the small inner diameter cylindrical surface 25*ia*, there is less fear of being caught by the boundary, so that the insertion can be achieved more smoothly.

Similarly, as explained with reference to FIG. 10(*e*), the inner periphery surface of the annular member 25' includes: the small inner diameter cylindrical surface 25*ia*'; the first frustoconical inner surface 25*ib*; and the large inner diameter cylindrical surface 25*ic*; in this order from the front side thereof. Herein, a round chamfer may be provided at a transition area (boundary) between the small inner diameter cylindrical surface 25*ia*' and the first frustoconical inner surface 25*ib*. In this case, when the tip 24 is inserted into the small inner diameter cylindrical surface 25*ia*', there is less fear of being caught by the boundary, so that the insertion can be achieved more smoothly.

Figure 40:
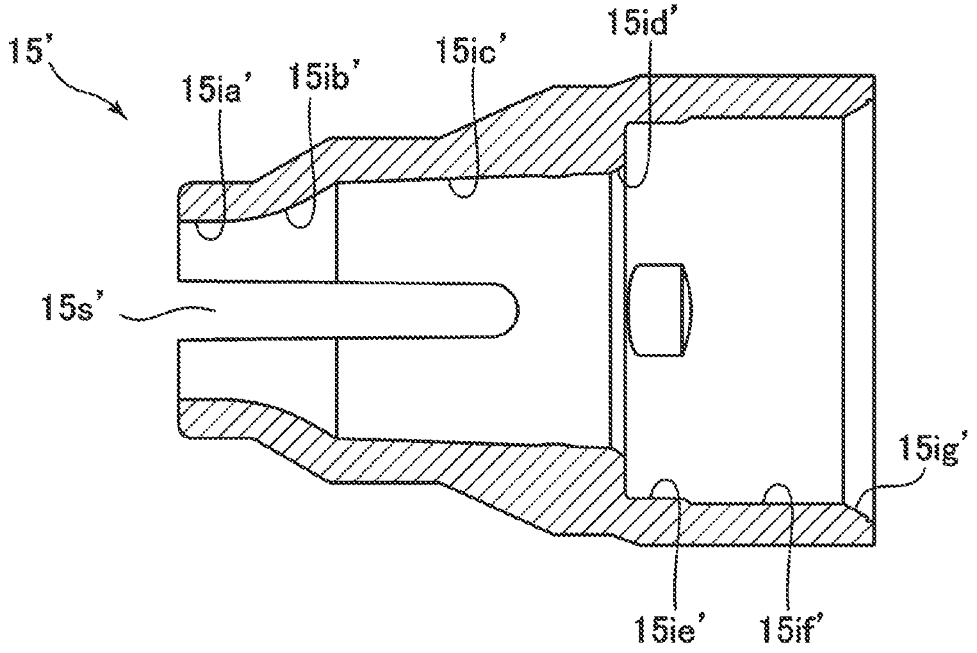
FIG. 40 is a view corresponding to FIG. 3(*e*), but wherein the first frustoconical inner surface is replaced with a round chamfer.

Furthermore, as shown in FIG. 40, instead of providing the first frustoconical inner surface 15*ib* of FIG. 3(*e*), a small inner diameter cylindrical surface 15*ia*' and a medium inner diameter cylindrical surface 15*ic*' may be connected by a round chamfer 15*ib*' (the first frustoconical inner surface 15*ib* may be replaced with such a round chamfer 15*ib*'). In this case too, when the tip 14 is inserted into the small inner diameter cylindrical surface 15*ia*', there is less fear of being caught, so that the insertion can be achieved more smoothly. In the modified example shown in FIG. 40, an inner periphery surface of the annular member 15' includes: the small inner diameter cylindrical surface 15*ia*'; the round chamfer 15*ib*'; the medium inner diameter cylindrical surface 15*ic*'; a second frustoconical inner surface 15*id*'; a square cylinder surface a large inner diameter cylindrical surface 15*if*'; and a third frustoconical outer surface 15*ig*'; in this order from a front side thereof. The annular member 15' is provided with three slits 15*s*' as a cutout.

Similarly, although illustration is omitted, instead of providing the first frustoconical inner surface 25*ib* of FIG. 8(*e*), the small inner diameter cylindrical surface 25*ia* and the large inner diameter cylindrical surface 25*ic* may be connected by a round chamfer (the first frustoconical inner surface 25*ib* may be replaced with such a round chamfer). In this case too, when the tip 24 is inserted into the small inner diameter cylindrical surface 25*ia*, there is less fear of being caught, so that the insertion can be achieved more smoothly.

Similarly, although illustration is omitted, instead of providing the first frustoconical inner surface 25*ib* of FIG. 10(*e*), the small inner diameter cylindrical surface 25*ia*' and the large inner diameter cylindrical surface 25*ic* may be connected by a round chamfer (the first frustoconical inner surface 25*ib* may be replaced with such a round chamfer). In this case too, when the tip 24 is inserted into the small inner diameter cylindrical surface 25*ia*', there is less fear of being caught, so that the insertion can be achieved more smoothly.

<Another Manner of Cutout>

According to the above explained embodiments, the slits 15*s*, 15*s*', 25*s* (cutout elements) are provided as a cutout. That is to say, the cutout is formed to penetrate the annular member 15, 15', 25, 25' from the inner periphery side thereof to the outer periphery side thereof.

However, the cutout is not limited to such a manner, but may be formed as a thin wall portion thinner than its surroundings (wherein a portion of the thickness is removed). For example, a thin wall portion may be left at an area corresponding to each of the slits 15*s*, 15*s*', 25*s*.

Figure 41:
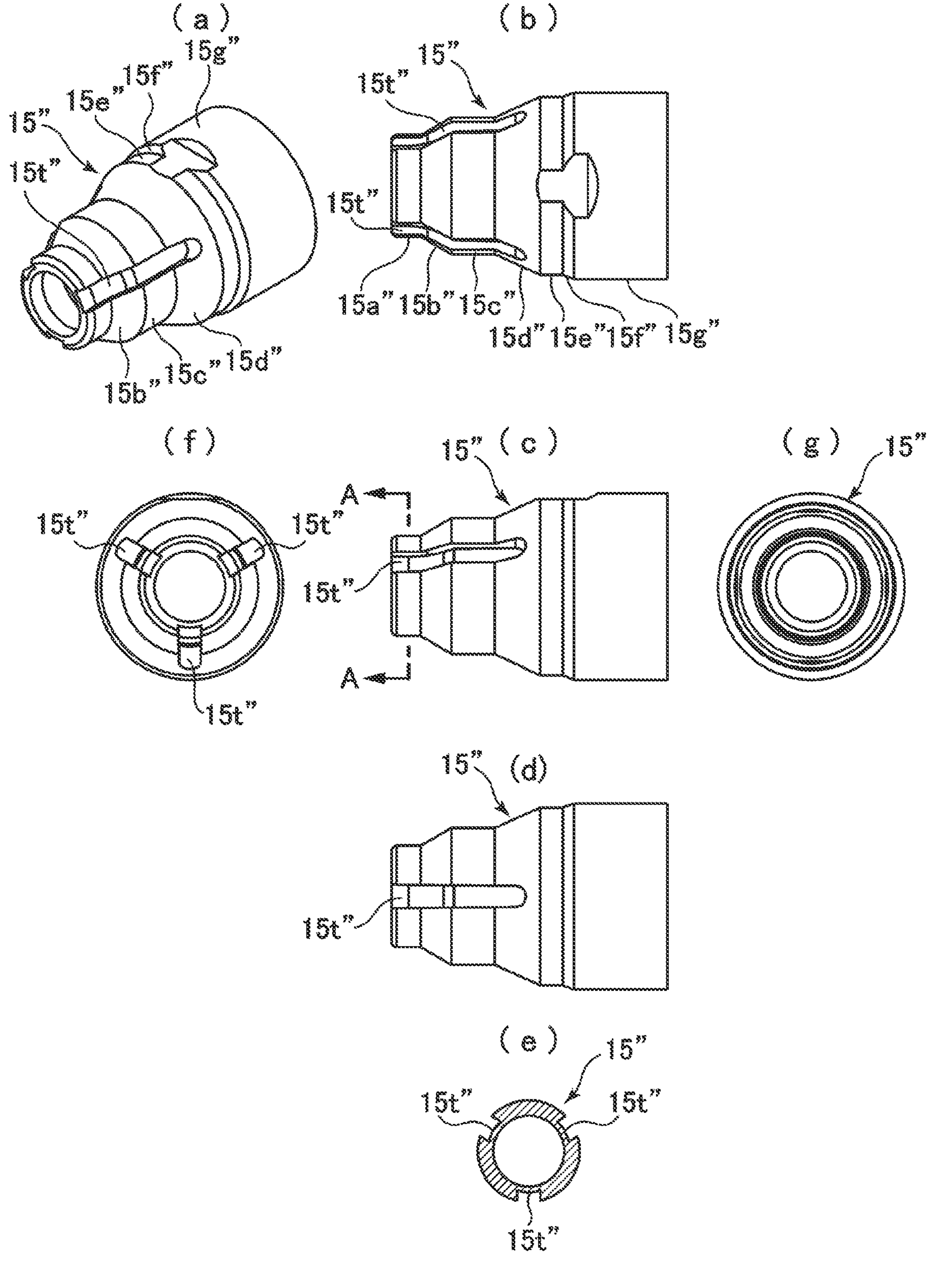
FIG. 41(*a*) is a perspective view of an annular member of a modified example of the projectable and retractable writing tool.

FIG. 41(*a*) is a perspective view of an annular member 15" of such a modified example, FIG. 41(*b*) is a plan view of the annular member 15" shown in FIG. 41(*a*), FIG. 41(*c*) is a side view of the annular member 15" shown in FIG. 41(*a*), FIG. 41(*d*) is a bottom view of the annular member 15" shown in FIG. 41(*a*), FIG. 41(*e*) is a section view taken along line A-A of FIG. 41(*c*), FIG. 41(*f*) is a front view (a view seen from the leading edge side) of the annular member 15" shown in FIG. 41(*a*), and FIG. 41(*g*) is a rear view of the annular member 15" shown in FIG. 41(*a*).

As shown in FIGS. 41(*a*) to 41(*g*), an outer periphery surface of the annular member 15" includes: a small outer diameter cylindrical surface 15*a*"; a first frustoconical outer surface 15*b*" as a contact surface having a tapered shape; a medium outer diameter cylindrical surface 15*c*"; a second frustoconical outer surface 15*d*" as a contact surface having a tapered shape; a first large outer diameter cylindrical surface 15*e*"; a third frustoconical outer surface 15*f*" as a contact surface having a tapered shape; and a second large outer diameter cylindrical surface 15*g*"; in this order from a front side thereof.

In addition, the annular member 15" of the modified example is provided with three thin wall portions (cutout elements) 15*t*" as a cutout. As shown in FIGS. 41(*a*) to 41(*g*), the three thin wall portions 15*t*" are arranged at positions corresponding to the three slits 15*s* of FIGS. 3(*a*) to 3(*g*), i.e., at regular intervals (by every 120 degrees) in a circumferential direction of the annular member 15". Each of the three thin wall portions 15*t*" has a width of 0.8 m and a thickness of 0.2 mm, and extends from a front end of the annular member 15" to a substantially center of the second frustoconical outer surface 15*d*" in an axial direction of the annular member 15" (an axial maximum length thereof being 5.5 mm).

According to the modified example as well, when a load is received by the first frustoconical outer surface 15*b*" (contact surface), an inner diameter of the annular member 15" can be reduced flexibly, and when the load is released, the inner diameter of the annular member 15" can be elastically returned to an original dimension thereof.

EXPLANATION OF SIGN

10 projectable and retractable writing tool
11 shaft cylinder
11*ia* small inner diameter cylindrical surface
11*ib* first frustoconical inner surface
11*ic* medium inner diameter cylindrical surface
11*id* second frustoconical inner surface
11*ie* first large inner diameter cylindrical surface
11*if* third frustoconical inner surface
11*ig* second large inner diameter cylindrical surface
11*ih* annular protrusion
11*m* front portion
11*r* rear portion
13 tip holder
13*a* proximal portion
13*b* first collar portion
13*c* second collar portion
14 tip
15 annular member
15*a* small outer diameter cylindrical portion
15*b* first frustoconical outer surface
15*c* medium outer diameter cylindrical surface
15*d* second frustoconical outer surface
15*e* first large outer diameter cylindrical surface
15*f* third frustoconical outer surface
15*g* second large outer diameter cylindrical surface
15*ia* small inner diameter cylindrical surface
15*ib* first frustoconical inner surface
15*ic* medium inner diameter cylindrical surface
15*id* second frustoconical inner surface
15*ie* square cylinder surface
15*if* large inner diameter cylindrical surface
15*ig* third frustoconical outer surface
15*s* slit
15' annular member
15*ia*' small inner diameter cylindrical surface
15*ib*' round chamfer
15*ic*' medium inner diameter cylindrical surface
15*id*' second frustoconical inner surface
15*ie*' square cylinder surface
15*if*' large inner diameter cylindrical surface
15*ig*' third frustoconical outer surface
15*s*' slit
15" annular member
15*a*" small outer diameter cylindrical portion
15*b*" first frustoconical outer surface
15*c*" medium outer diameter cylindrical surface
15*d*" second frustoconical outer surface
15*e*" first large outer diameter cylindrical surface
15*f*" third frustoconical outer surface
15*g*" second large outer diameter cylindrical surface
15*t*" thin wall portion
16 coil spring
20 projectable and retractable writing tool
20' projectable and retractable writing tool
21 shaft cylinder
21' shaft cylinder
21*ia* small inner diameter cylindrical surface
21*ib* first frustoconical inner surface
21*ic* medium inner diameter cylindrical surface
21*id* second frustoconical inner surface
21*ie* large inner diameter cylindrical surface
21*if* annular protrusion
21*m* front portion
21*m*' front portion
23 tip holder
23*a* proximal portion
23*b* first collar portion
23*c* second collar portion
24 tip
25 annular member
25' annular member
25*a* small outer diameter cylindrical portion
25*a*' small outer diameter cylindrical portion
25*b* first frustoconical outer surface
25*c* medium outer diameter cylindrical surface
25*d* second frustoconical outer surface
25*e* first large outer diameter cylindrical surface
25*f* second large outer diameter cylindrical surface
25*g* coil spring fitting cylindrical surface
25*j* flange portion
25*ia* small inner diameter cylindrical surface
25*ia*' small inner diameter cylindrical surface
25*ib* first frustoconical inner surface
25*ic* large inner diameter cylindrical surface
3 front shaft
32 main body
33 holding part
4 intermediate shaft
41 first elongated hole
42 step part
43 cam part
43*a* cam tooth
43*b* cam groove
44 outward protrusion
5 rear shaft
51 second elongated hole
52 attachment hole
53 friction part
54 inward protrusion
6 refill (writing body)
61 pen tip
62 ink containing tube
63 tail plug
63*a* air hole
63*b* projection piece
63*c* gap
63*d* smaller diameter part
63*e* larger diameter part
63*f* flange part
63*g* engagement surface
63*p* outward protrusion
63*t* auxiliary tapered portion

7 projection and retraction rotating member
71 ridge
72 protrusion part
72*a* engagement surface
73 abutment part
74 annular auxiliary protrusion part
74*t* auxiliary abutment surface
78 outward protrusion
8 knock member
81 base part
82 shaft part
82*a* cam tooth
83 clip
88 inward protrusion
110 projectable and retractable writing tool
111 shaft cylinder
111*a* rear portion
111*b* inner cylindrical portion
111*c* front portion
111*d* mouthpiece portion
111*t* guide surface
112 second coil spring
113 tip holder
113*a* proximal portion
113*b* first collar portion
113*c* second collar portion
113*d* distal portion
113*f* spring fixation assisting portion
114 tip
115 annular member
115*a* large outer diameter cylindrical portion
115*b* small outer diameter cylindrical portion
115*s* slit
115*t* contact surface
116 coil spring
120 projectable and retractable writing tool
123 tip holder
123*a* proximal portion
123*b* first collar portion
123*c* second collar portion
123*d* distal portion
124 tip
125 annular member
125*s* slit
125*t* contact surface
126*e* resin spring part
130 projectable and retractable writing tool
132 collar member
133 tip holder
133*a* proximal portion
133*b* first collar portion
133*c* second collar portion
133*d* distal portion
133*m* intermediate collar portion
134 tip
140 projectable and retractable writing tool
142 collar member
143 tip holder
143*a* proximal portion
143*b* first collar portion
143*c* second collar portion
143*d* distal portion
143*m* intermediate collar portion
144 tip

What is claimed is:

1. A projectable and retractable writing tool comprising:

a shaft cylinder having an opening at a front end thereof, a tip holder contained in an inside of the shaft cylinder and movable in an axial direction of the shaft cylinder, a tip fixed to a front end of the tip holder to be projectable and retractable through the opening of the shaft cylinder in conjunction with a movement of the tip holder, an annular member loosely fitted onto an inner periphery of the opening of the shaft cylinder to be movable in an axial direction of the shaft cylinder with respect to the shaft cylinder, and an elastic member capable of connecting the tip holder and the annular member such that the tip holder and the annular member are movable relatively to each other, wherein a contact surface is formed on at least a part of an outer periphery of the annular member, the contact surface being configured to come into contact with a part of an inside surface of the shaft cylinder in conjunction with a movement of the tip holder toward a front end side thereof, a cutout is formed at a part of the annular member such that an inner diameter of the annular member is reduced when a load is received by the contact surface, a guide surface is formed on the part of the inside surface of the shaft cylinder, the guide surface being configured to come into contact with the contact surface in conjunction with the movement of the tip holder toward the front end side, and the contact surface is configured to receive the load from the guide surface in conjunction with the movement of the tip holder toward the front end side.

2. The projectable and retractable writing tool according to claim 1, further comprising a stopper element provided on the shaft cylinder and/or the annular member and configured to define a movement limit of the annular member on a rear side thereof.

3. The projectable and retractable writing tool according to claim 1, wherein the cutout is a plurality of cutout elements arranged at regular intervals in a circumferential direction of the annular member, and each of the plurality of cutout elements is a slit extending in an axial direction of the annular member.

4. The projectable and retractable writing tool according to claim 1, wherein the contact surface has a tapered shape toward the front end side, and the guide surface also has a tapered shape toward the front end side.

5. The projectable and retractable writing tool according to claim 4, wherein the contact surface has a frustoconical surface.

6. The projectable and retractable writing tool according to claim 1, wherein the elastic member is a coil spring.

7. The projectable and retractable writing tool according to claim 1, wherein the annular member and the elastic member are fixed to each other, the elastic member is capable of connecting to an annular collar of the tip holder, and the elastic member is also capable of moving away from the annular collar of the tip holder.

8. The projectable and retractable writing tool according to claim 1, wherein the contact surface and the guide surface are always in contact with each other.

9. The projectable and retractable writing tool according to claim 1, wherein the annular member is projected from the opening of the shaft cylinder in a front direction thereof.

10. The projectable and retractable writing tool according to claim 1, wherein an operation part for a projecting or retracting operation of the tip or a rear portion of the shaft cylinder is provided with a soft material member.

11. The projectable and retractable writing tool according to claim 1, further comprising a knock member provided in a slidable manner in a front and rear direction with respect to the shaft cylinder, wherein the tip is configured to be moved in a front and rear direction to be projected from or retracted into the opening of the shaft cylinder alternately whenever the knock member is moved in a front direction thereof, and the annular member is configured to be rotated with respect to the shaft cylinder whenever the knock member is moved in the front direction thereof.

12. A shaft cylinder for a projectable and retractable writing tool, the shaft cylinder being capable of containing a tip holder such that the tip holder is movable in an axial direction, a tip being fixed to a front end of the tip holder, the shaft cylinder having an opening at a front end thereof, through which the tip is projectable and retractable in conjunction with a movement of the tip holder, the shaft cylinder comprising, an annular member loosely fitted onto an inner periphery of the opening of the shaft cylinder to be movable in an axial direction of the shaft cylinder with respect to the shaft cylinder, and an elastic member capable of connecting the tip holder and the annular member such that the tip holder and the annular member are movable relatively to each other, wherein a contact surface is formed on at least a part of an outer periphery of the annular member, the contact surface being configured to come into contact with a part of the inside surface of the shaft cylinder in conjunction with the movement of the tip holder toward the front end side, a cutout is formed at a part of the annular member such that an inner diameter of the annular member is reduced when a load is received by the contact surface, a guide surface is formed on the part of the inside surface of the shaft cylinder, the guide surface being configured to come into contact with the contact surface in conjunction with the movement of the tip holder toward the front end side, and the contact surface is configured to receive the load from the guide surface in conjunction with the movement of the tip holder toward the front end side.

13. The shaft cylinder for a projectable and retractable writing tool according to claim 12, further comprising a stopper element provided on the shaft cylinder and/or the annular member and configured to define a movement limit of the annular member on a rear side thereof.

14. The shaft cylinder for a projectable and retractable writing tool according to claim 12, wherein the cutout is a plurality of cutout elements arranged at regular intervals in a circumferential direction of the annular member, and each of the plurality of cutout elements is a slit extending in an axial direction of the annular member.

15. The shaft cylinder for a projectable and retractable writing tool according to claim 12, wherein the contact surface has a tapered shape toward the front end side, and the guide surface also has a tapered shape toward the front end side.

16. The shaft cylinder for a projectable and retractable writing tool according to claim 15, wherein the contact surface has a frustoconical surface.

17. The shaft cylinder for a projectable and retractable writing tool according to claim 12, wherein the elastic member is a coil spring.

18. The shaft cylinder for a projectable and retractable writing tool according to claim 12, wherein the annular member and the elastic member are fixed to each other, the elastic member is capable of connecting to an annular collar of the tip holder, and the elastic member is also capable of moving away from the annular collar of the tip holder.

19. The shaft cylinder for a projectable and retractable writing tool according to claim 12, wherein the contact surface and the guide surface are always in contact with each other.

20. The shaft cylinder for a projectable and retractable writing tool according to claim 12, wherein the annular member is projected from the opening of the shaft cylinder in a front direction thereof.

21. The shaft cylinder for a projectable and retractable writing tool according to claim 12, wherein an operation part for a projecting or retracting operation of the tip or a rear portion of the shaft cylinder is provided with a soft material member.

22. The shaft cylinder for a projectable and retractable writing tool according to claim 12, further comprising a knock member provided in a slidable manner in a front and rear direction with respect to the shaft cylinder, wherein the tip is capable of being moved in a front and rear direction to be projected from or retracted into the opening of the shaft cylinder alternately whenever the knock member is moved in a front direction thereof, and the annular member is configured to be rotated with respect to the shaft cylinder whenever the knock member is moved in the front direction thereof.

* * * * *